(12) United States Patent
Morse et al.

(10) Patent No.: US 7,392,208 B2
(45) Date of Patent: *Jun. 24, 2008

(54) ELECTRONIC PROPERTY VIEWING METHOD AND COMPUTER-READABLE MEDIUM FOR PROVIDING VIRTUAL TOURS VIA A PUBLIC COMMUNICATIONS NETWORK

(75) Inventors: Stacy J Morse, Nine Mile Falls, WA (US); Anne M. Morse, Nine Mile Falls, WA (US); Eugene H. Dierks, III, Spokane, WA (US)

(73) Assignee: Home Debut, Inc., Spokane, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/984,378

(22) Filed: Nov. 8, 2004

(65) Prior Publication Data

US 2005/0187832 A1  Aug. 25, 2005

Related U.S. Application Data

(63) Continuation of application No. 09/425,833, filed on Oct. 21, 1999, now Pat. No. 6,839,880.

(51) Int. Cl.
G06Q 30/00 (2006.01)
G06Q 17/30 (2006.01)
(52) U.S. Cl. .......................................... 705/26; 705/27
(58) Field of Classification Search .................. 705/26, 705/27, 1
See application file for complete search history.

(56) References Cited

U.S. PATENT DOCUMENTS

| 5,736,977 | A | 4/1998 | Hughes |
|---|---|---|---|
| 5,794,216 | A | 8/1998 | Brown |
| 6,253,216 | B1 | 6/2001 | Sutcliffe et al. |
| 6,321,202 | B1 | 11/2001 | Raveis, Jr. |
| 6,330,575 | B1 | 12/2001 | Moore et al. |
| 6,517,353 | B1 * | 2/2003 | Jones .......................... 434/252 |
| 6,563,529 | B1 | 5/2003 | Jongerius |
| 6,594,633 | B1 | 7/2003 | Broerman |
| 6,633,875 | B2 | 10/2003 | Brady |
| 6,678,663 | B1 | 1/2004 | Mayo |

(Continued)

OTHER PUBLICATIONS

"Online House Hunting Walk From Room to Room on Virtual-Reality Tours," David Dekok, The Sunday Patriot, Harrisburg, Pa, Aug. 15, 1999, p. H.01.*

(Continued)

*Primary Examiner*—Jeffrey A. Smith
*Assistant Examiner*—Kalyan Deshpande
(74) *Attorney, Agent, or Firm*—Sheppard, Mullin, Richter & Hampton LLP

(57) ABSTRACT

Disclosed is an electronic real property viewing system for providing virtual tours of real property units via a public communications network such as the internet. The electronic property viewing system includes a system for affiliates to create their own virtual tours in real time by uploading photographs into a template, resulting in both movable and still photographs with accompanying data sets. Another embodiment of this invention involves the exchange of the creation and/or maintenance of such virtual tour available on a public communications network for occupation time units in the real property units.

12 Claims, 72 Drawing Sheets

U.S. PATENT DOCUMENTS

2003/0083957 A1* 5/2003 Olefson ................... 705/27

OTHER PUBLICATIONS http://web.archive.org/web/1990429142544/http://realtor.com, Apr. 29, 1999, pp. 1-14.*

Realtor.com website, http://web.archive.org/web/19990429142544/http://realtor.com (hereinafter Realtor.com), Apr. 29, 1999, pp. 1-14.

David Dekok, Online House Hunting/Walk from Room to Room on Virtual-Reality Tours Aug. 15, 1999, 3 pgs., Harrisburg, PA.

* cited by examiner

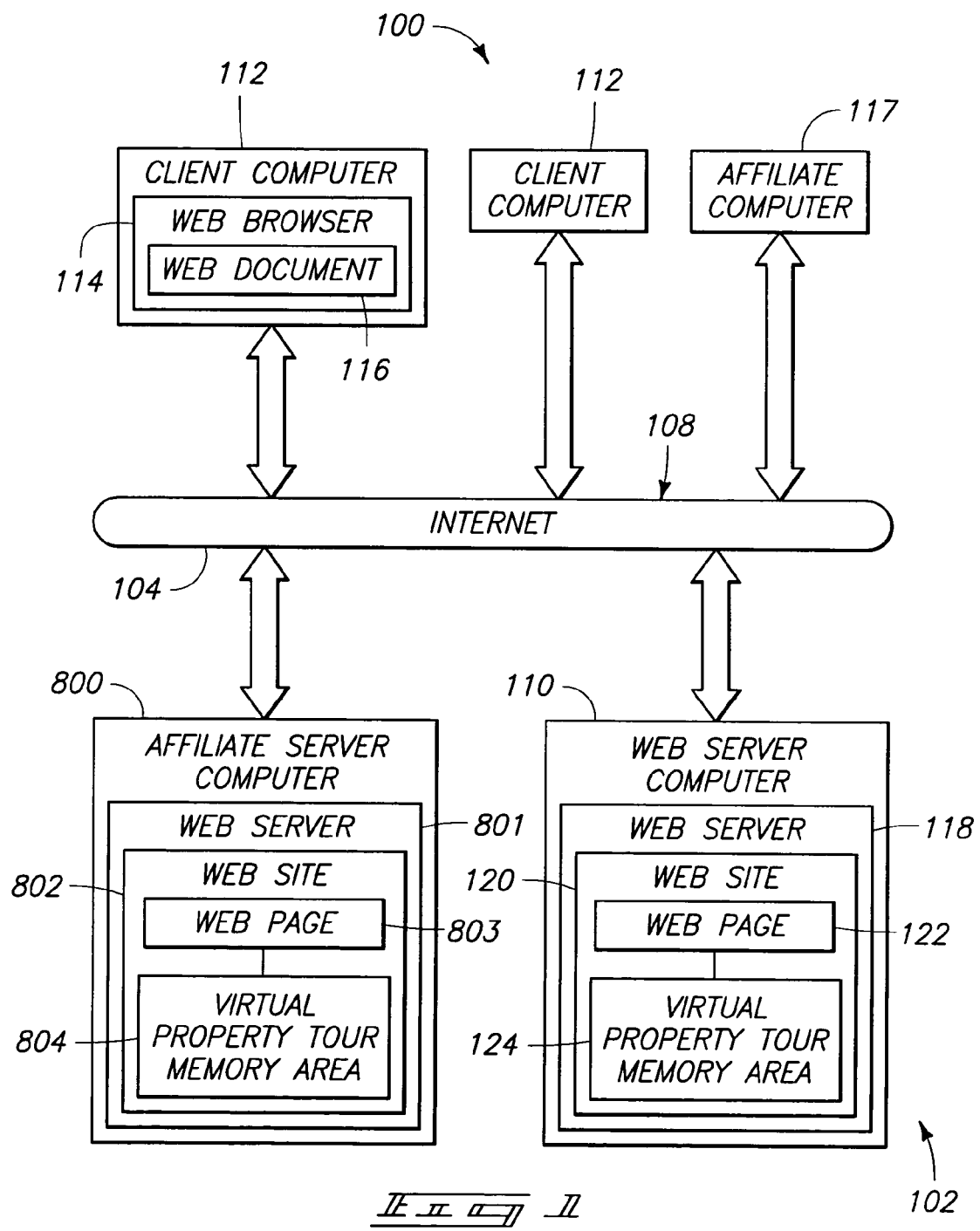

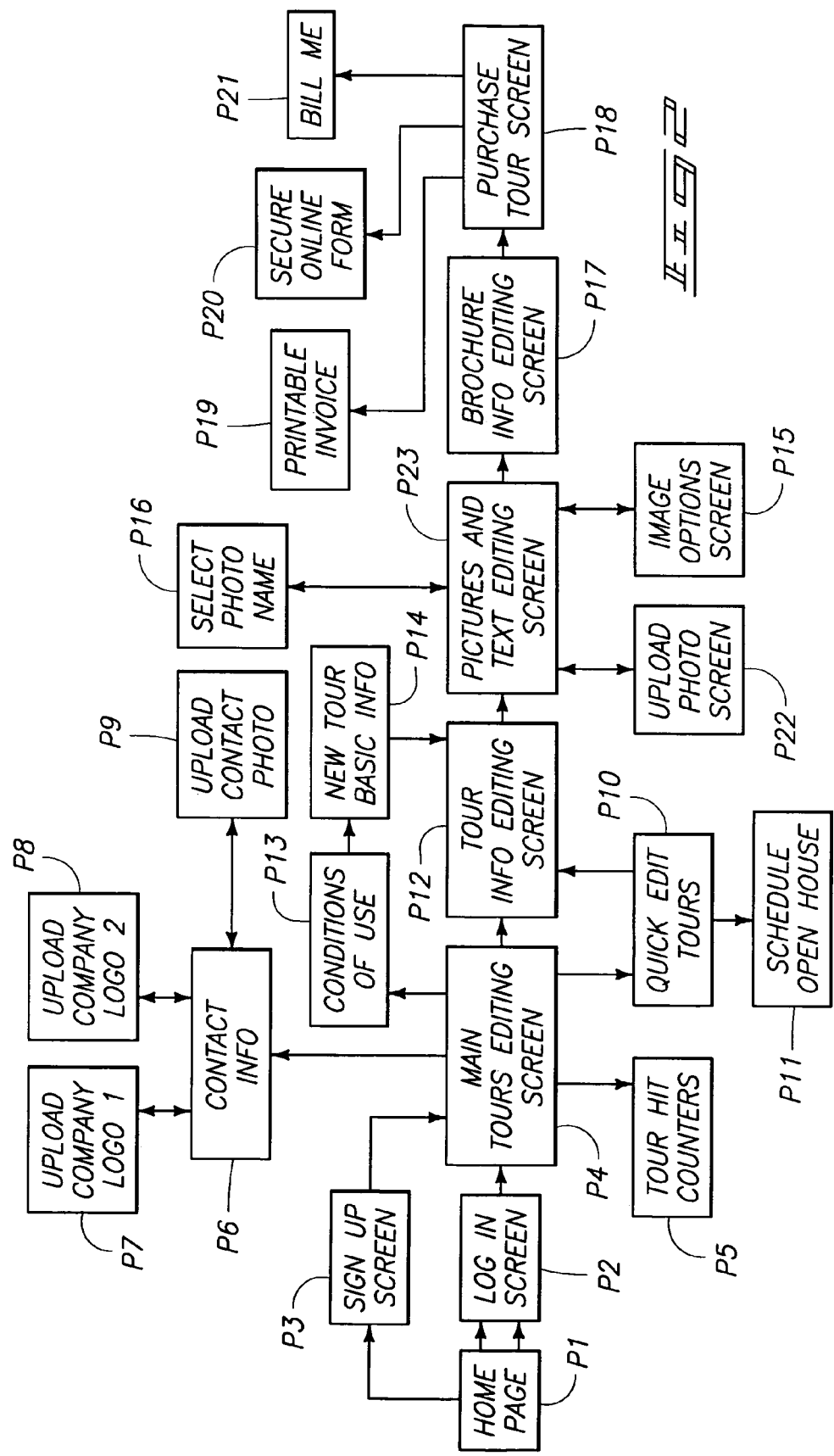

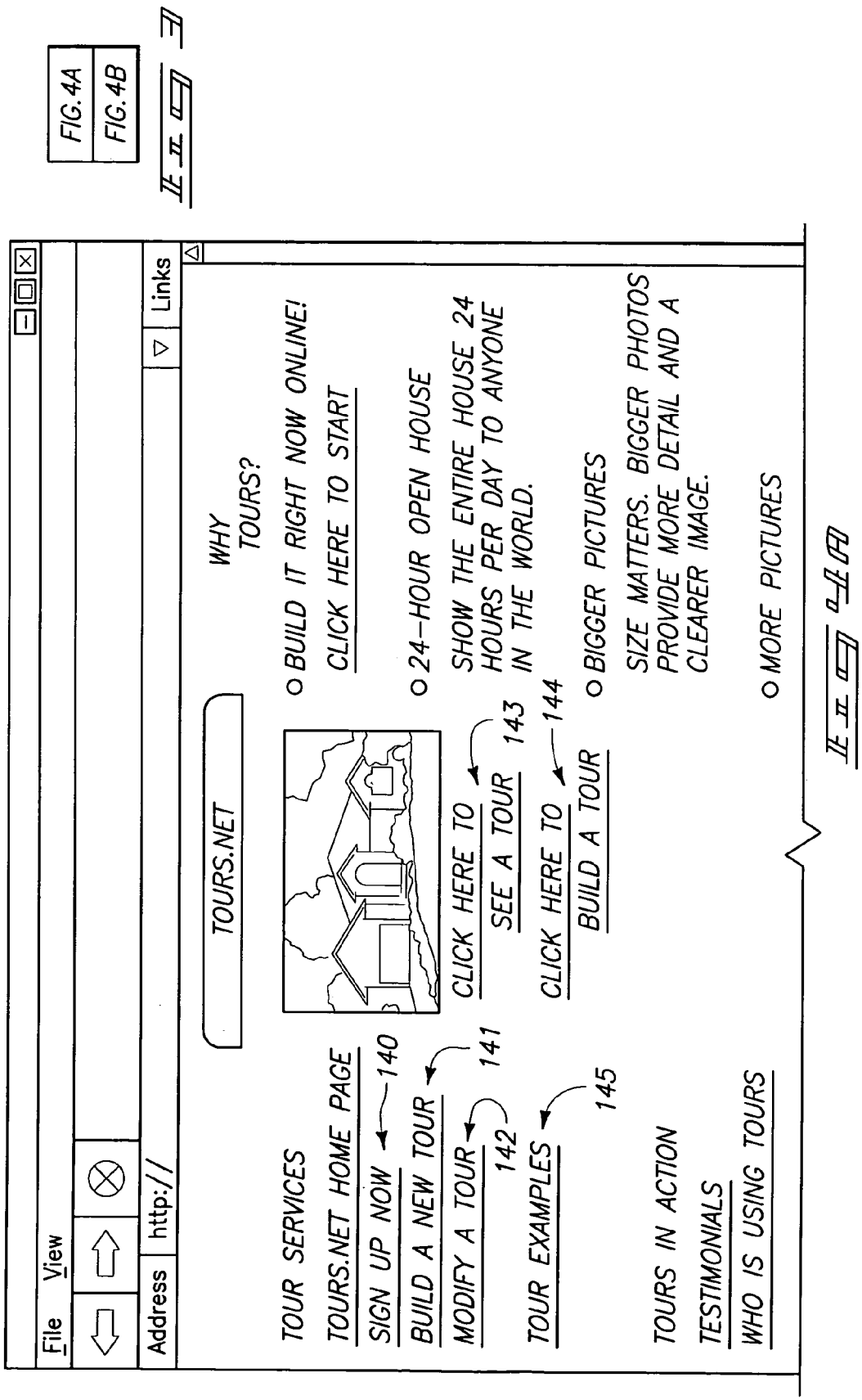

FIG. 4B

I NEED HELP
WHY TOURS...
TOUR FAQ
VIEWING DIFFICULTIES
CONTACT US
COMMENTS/SUGGESTIONS
ABOUT TOURS.NET

TOUR BY NUMBER
TYPE YOUR TOUR#:
[    ] GO

GO FURTHER INSIDE BY SHOWING UP TO 16 PHOTOS. BRING CONSUMERS CLOSER TO HOME.

○ STILL & PANORAMIC PHOTOS
USE THE SHOT THAT MAKES SENSE. COMBINE STILL PHOTOS AND PANORAMAS FOR THE BEST POSSIBLE EFFECT.

○ GET ONLINE EXPOSURE

○ UP FRONT PRICING
ONLY $39.95 PUTS YOUR PROPERTY ONLINE IN THE FEATURE-RICH ENVIRONMENT OF A TOUR.

90 MILLION AMERICANS HAVE ACCESS TO THE INTERNET

"TOURS.NET IS SO USER FRIENDLY AND JUST KEEPS GETTING BETTER."
-LONA DYER, GRI

TOURS.NET ○ SPOKANE, WA ○ PHONE (123)456-7890 ○ WEBMASTER@TOURS.NET ○

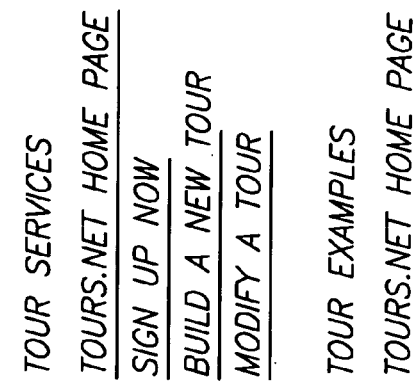
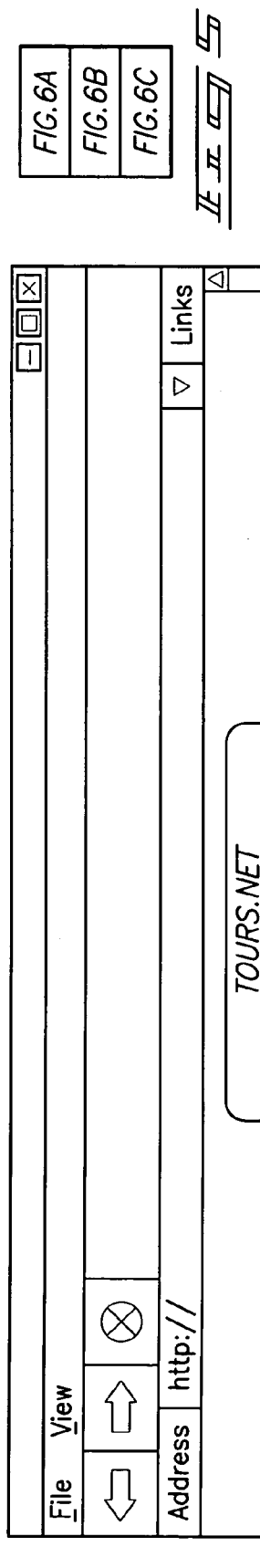
FIG. 6A

I NEED HELP
WHY TOURS...
TOUR FAQ
VIEWING DIFFICULTIES

CONTACT US
COMMENTS/SUGGESTIONS
ABOUT TOURS.NET

TOUR BY NUMBER
TYPE YOUR TOUR#:
[    ] [GO]

YOUR WEB ADDRESS:
YOUR OFFICE/COMPANY NAME:
YOUR OFFICE ADDRESS:
YOUR OFFICE CITY:
YOUR OFFICE STATE: [ALABAMA ▷]
YOUR OFFICE ZIP:
YOUR FAX NUMBER:
YOUR BILLING ADDRESS:
YOUR BILLING CITY:
YOUR BILLING STATE: [ALABAMA ▷]
YOUR BILLING ZIP:
A PASSWORD:
RE-ENTER PASSWORD:
PLEASE MAKE A NOTE OF YOUR PASSWORD

FIG. 6B

CONDITIONS OF USE

IN ORDER TO KEEP OUR WEBSITE IN "TOP-NOTCH" CONDITION, WE HAVE A VERY HIGH LEVEL OF EXPECTATION FOR THE QUALITY OF INFORMATION THAT YOU POST HERE. WE RESERVE THE RIGHT TO MODIFY, EDIT OR DECLINE TO ACTIVATE TOURS THAT CONTAIN ANY OF THE FOLLOWING:

- VULGAR OR QUESTIONABLE LANGUAGE
- ANY THING THAT MAY BE ILLEGAL ACCORDING TO STATE OR FEDERAL LAWS
- IMPROPER GRAMMAR OR SPELLING IN THE TEXT (PLEASE RUN ALL OF YOUR TEXT THROUGH SOME SPELL CHECK SOFTWARE)
- VERY POOR PICTURE QUALITY (LIGHTING, RESOLUTION, ECT.)
- POORLY PLANNED PHOTOS (GARBAGE CANS IN FRONT OF THE HOUSE, DIRTY DISHES IN SINK, PEOPLE IN THE PHOTO ETC.)

THAT MAY SEEM A LITTLE HARSH, BUT INFORMATION THAT IS PRESENTED WELL, SELLS A HOME. IF YOU ARE HAVING TROUBLE, OR THINK ANY ELEMENT OF YOUR TOUR MAY BE CONSIDERED QUESTIONABLE, JUST GIVE US A CALL, OR DROP US AN EMAIL AT SALES@TOURS.NET.

| I AGREE TO THESE TERMS |—151

TOURS.NET ○ SPOKANE, WA ○ PHONE (123)456-7890 ○ WEBMASTER@TOURS.NET ○

FIG. 6L

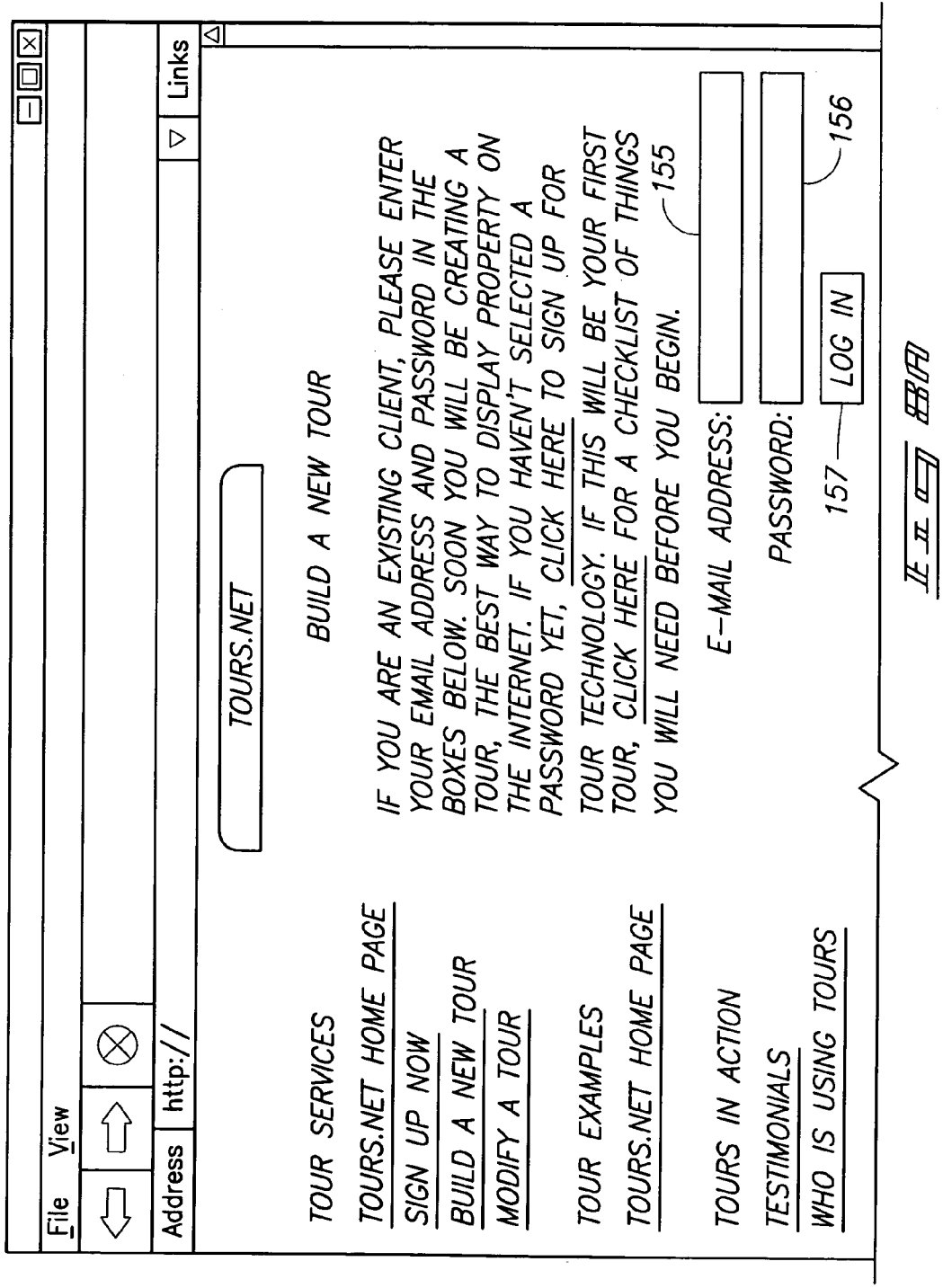

I NEED HELP
WHY TOURS...
TOUR FAQ
VIEWING DIFFICULTIES

CONTACT US
COMMENTS/SUGGESTIONS
ABOUT TOURS.NET

TOUR BY NUMBER
TYPE YOUR TOUR#:
[     ] GO

OTHER LINKS OF INTEREST
○ CLICK HERE TO SIGN UP AS A NEW AGENT
○ CLICK HERE IF YOU CANT REMEMBER YOUR PASSWORD
○ CLICK HERE TO MODIFY A TOUR
○ CLICK HERE FOR A LIST OF THINGS YOU WILL NEED TO BUILD A NEW TOUR

TOURS.NET ○ SPOKANE, WA ○ PHONE (123)456-7890 ○ WEBMASTER@TOURS.NET ○

I NEED HELP

WHY TOURS...

TOUR FAQ

VIEWING DIFFICULTIES

CONTACT US

COMMENTS/SUGGESTIONS

ABOUT TOURS.NET

TOUR BY NUMBER

TYPE YOUR TOUR#: [    ] GO

OTHER LINKS OF INTEREST
○ CLICK HERE TO SIGN UP AS A NEW AGENT
○ CLICK HERE IF YOU CANT REMEMBER YOUR PASSWORD
○ CLICK HERE TO MODIFY A TOUR
○ CLICK HERE FOR A LIST OF THINGS YOU WILL NEED TO BUILD A NEW TOUR

TOURS.NET ○ SPOKANE, WA ○ PHONE (123)456-7890 ○ WEBMASTER@TOURS.NET ○

FIG. 10B

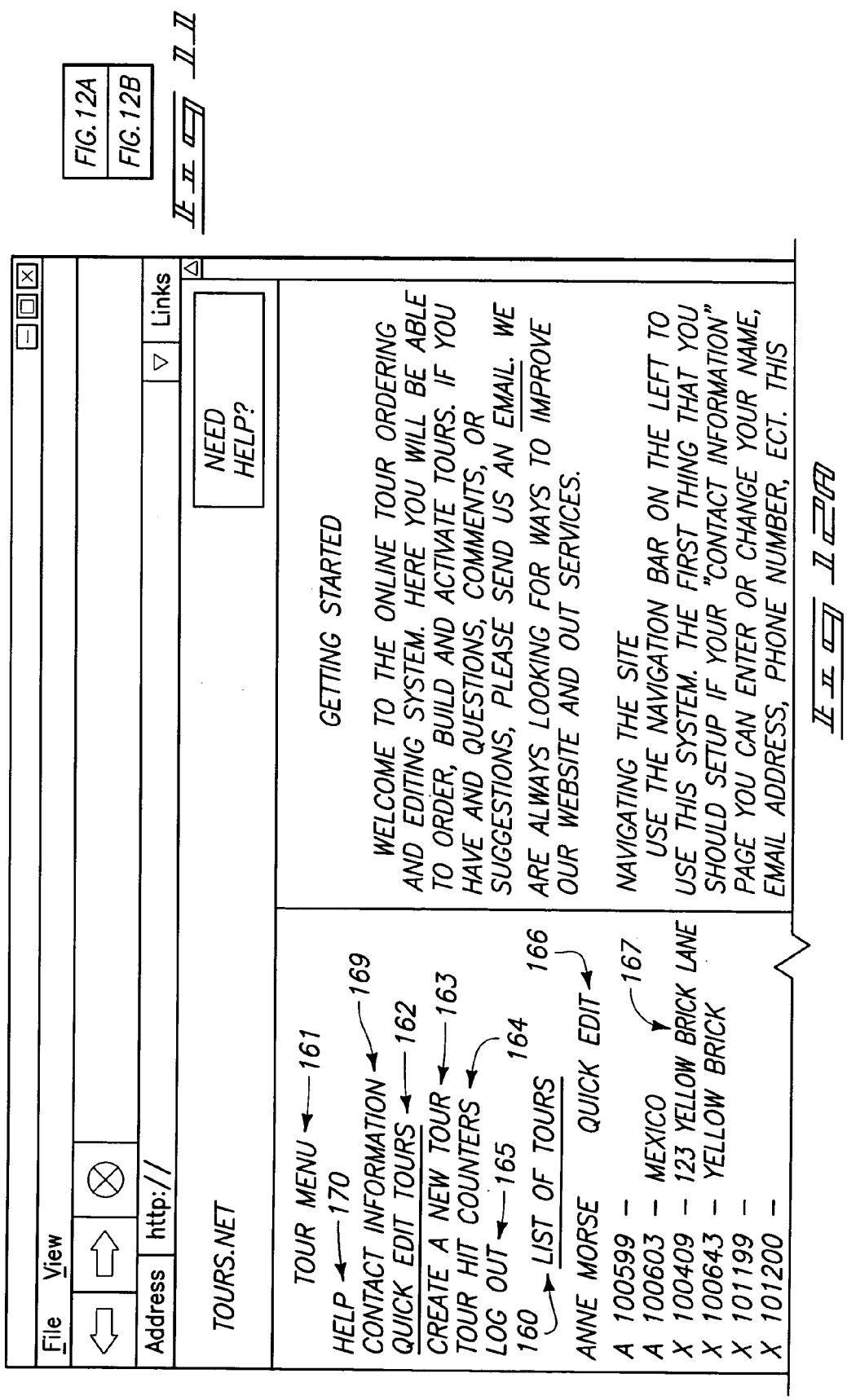

X 100980 —
X 101201 —
X 101215 —
X 101527 —
X 102461 —

A = ACTIVE TOUR
X = INACTIVE TOUR  ← 168

INFORMATION IS DISPLAYED WITH EVERY TOUR THAT YOUR BUILD. PRICE CHANGES CAN BE PERFORMED AND TOURS CAN BE 'DEACTIVATED' QUICKLY AND EASY FROM THE "QUICK EDIT TOURS' PAGE. TO CREATE A NEW TOUR, CLICK "CREATE A NEW TOUR". YOU WILL BE PROMPTED FOR THE NUMBER OF PHOTOS, SO HAVE YOUR PICTURES READY. TO MAKE A CHANGE TO AN EXISTING TOUR, CLICK ON THAT TOUR'S NUMBER. A GREEN CHECKMARK NEXT TO THE TOUR NUMBER INDICATES THAT IT IS 'LIVE' AND IS BEING DISPLAYED ON THE WEBSITE. IF THERE IS A RED 'X' NEXT TO THE TOUR NUMBER, IT IS 'DISABLED', AND IS NOT BEING DISPLAYED ON THE WEBSITE.

CLICK HERE TO SEND US AN EMAIL

FIG. 12B

| FIG.14A |
|---------|
| FIG.14B |
| FIG.14C |

FIG. 14

TOURS.NET

TOUR MENU

HELP
CONTACT INFORMATION
QUICK EDIT TOURS
CREATE A NEW TOUR
TOUR HIT COUNTERS
LOG OUT

LIST OF TOURS

ANNE MORSE    QUICK EDIT
A  100599  —
A  100603  —  MEXICO
X  100409  —  123 YELLOW BRICK LANE
X  100643  —  YELLOW BRICK
X  101199  —
X  101200  —

NEED HELP?

CONTACT INFORMATION

| FIELD | DATA | HELP |
|---|---|---|
| CONTACT NAME: | ANNE MORSE | ? |
| EMAIL ADDRESS: | ANNE@DEBUT.NET | ? |
| PASSWORD: |  | ? |
| PHONE NUMBER: | 123-456-7890 | ? |
| FAX NUMBER: | 456-789-0123 | ? |
| HOME PAGE URL: | HTTP://DEBUT.NET | ? |
| COMPANY NAME: | HOME DEBUT | ? |

FIG. 14A

ADDRESS: 1234 W. FIRST AVE. [?]

CITY, STATE ZIP: SPOKANE, WA 99204

BILLING ADDRESS: 1234 W. FIRST AVE. [?]

BILLING CITY: SPOKANE [?]

BILLING STATE: WA [?]

BILLING ZIP: 99204 [?]

X 100980 —
X 101201 —
X 101215 —
X 101527 —
X 102461 —

A = ACTIVE TOUR
X = INACTIVE TOUR

FIG. 14B

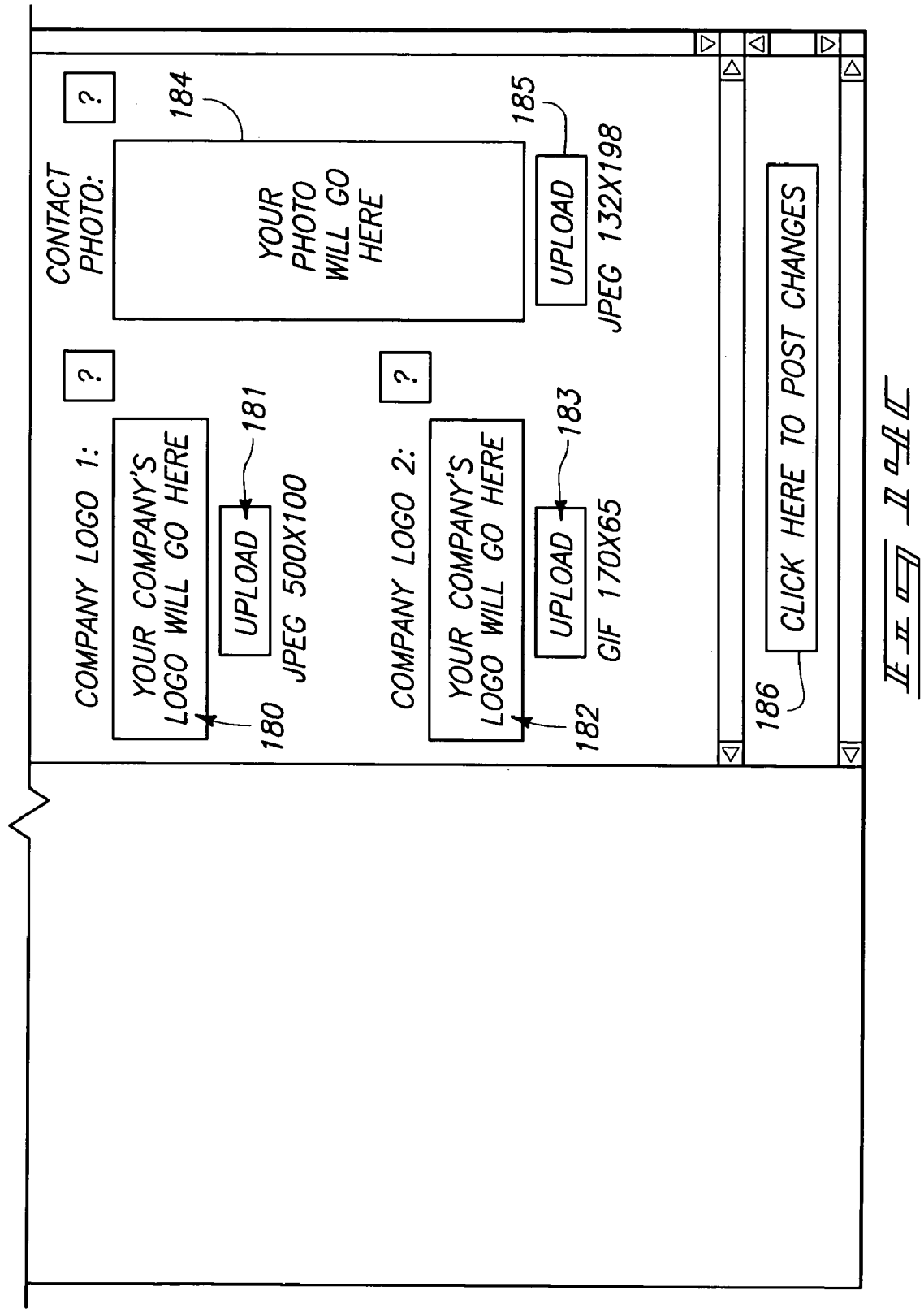

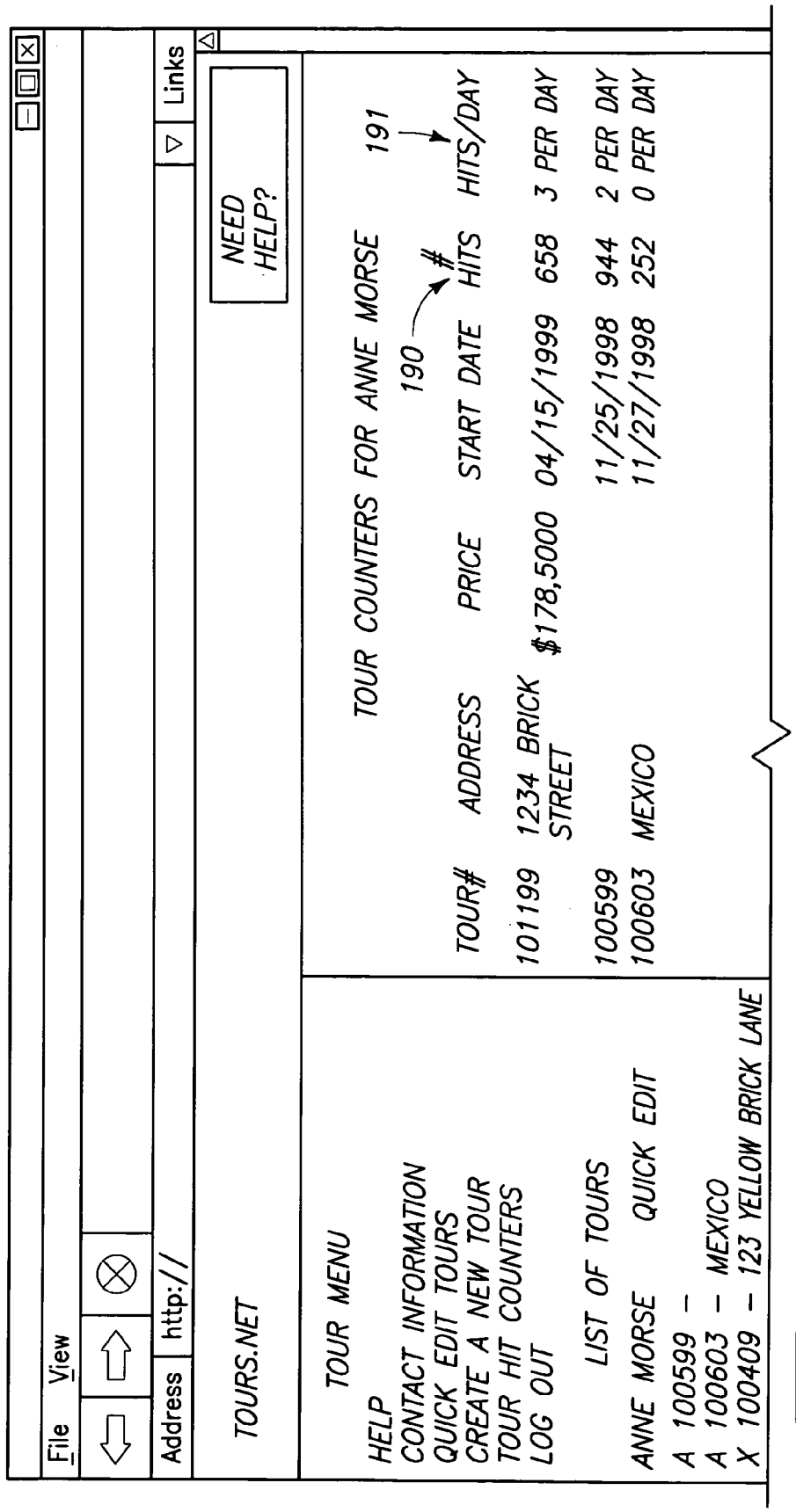

TOURS.NET

NEED HELP?

TOUR MENU

HELP
CONTACT INFORMATION
QUICK EDIT TOURS
CREATE A NEW TOUR
TOUR HIT COUNTERS
LOG OUT

LIST OF TOURS

ANNE MORSE    QUICK EDIT
A  100599  -
A  100603  -  MEXICO
X  100409  -  123 YELLOW BRICK LANE

FIG. 17

QUICK EDIT TOURS
                                OPEN → 193
AD#     ADDRESS          PRICE        HOUSE     STATUS              ACTIVE

100599                                          N/A       PAID TO              ● YES ○ NO
                                                          11/30/1999

100603  MEXICO                                  N/A       PAID TO              ● YES ○ NO
                                                          12/31/1999

100409  1244 YELLOW      $189,000    SCHEDULE             PAID TO              ● YES ○ NO
        BRICK LANE        ↑194                            12/30/1999

FIG. 18A

| FIG.18A |
| FIG.18B |

X 100643 – YELLOW BRICK
X 101199 –
X 101200 –
X 100980 –
X 101201 –
X 101215 –
X 101527 –
X 102461 –

A = ACTIVE TOUR
X = INACTIVE TOUR

| 101199 | 1234 BRICK STREET | $178,000 | SCHEDULE | UNPAID | PURCHASE |
| 102461 | 1234 LEE STREET | $100,00 | SCHEDULE | UNPAID | PURCHASE |
| 100643 | YELLOW BRICK | $0 | | | |
| 101200 | | $0 | | | |
| 100980 | | | | | |
| 101201 | | | | | |
| 101215 | | | | | |
| 101527 | | | | | |

CLICK HERE TO POST CHANGES

FIG. 18B

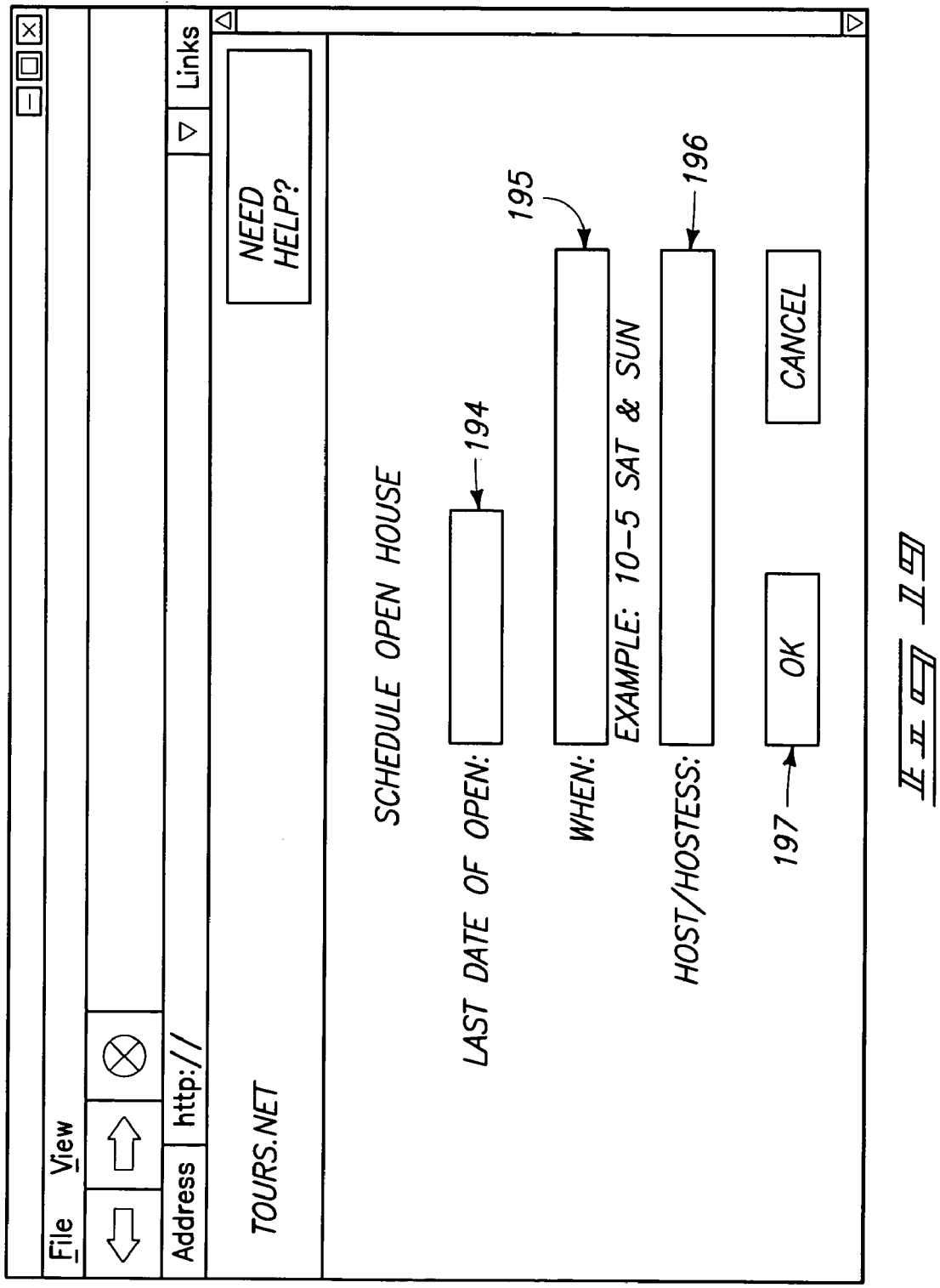

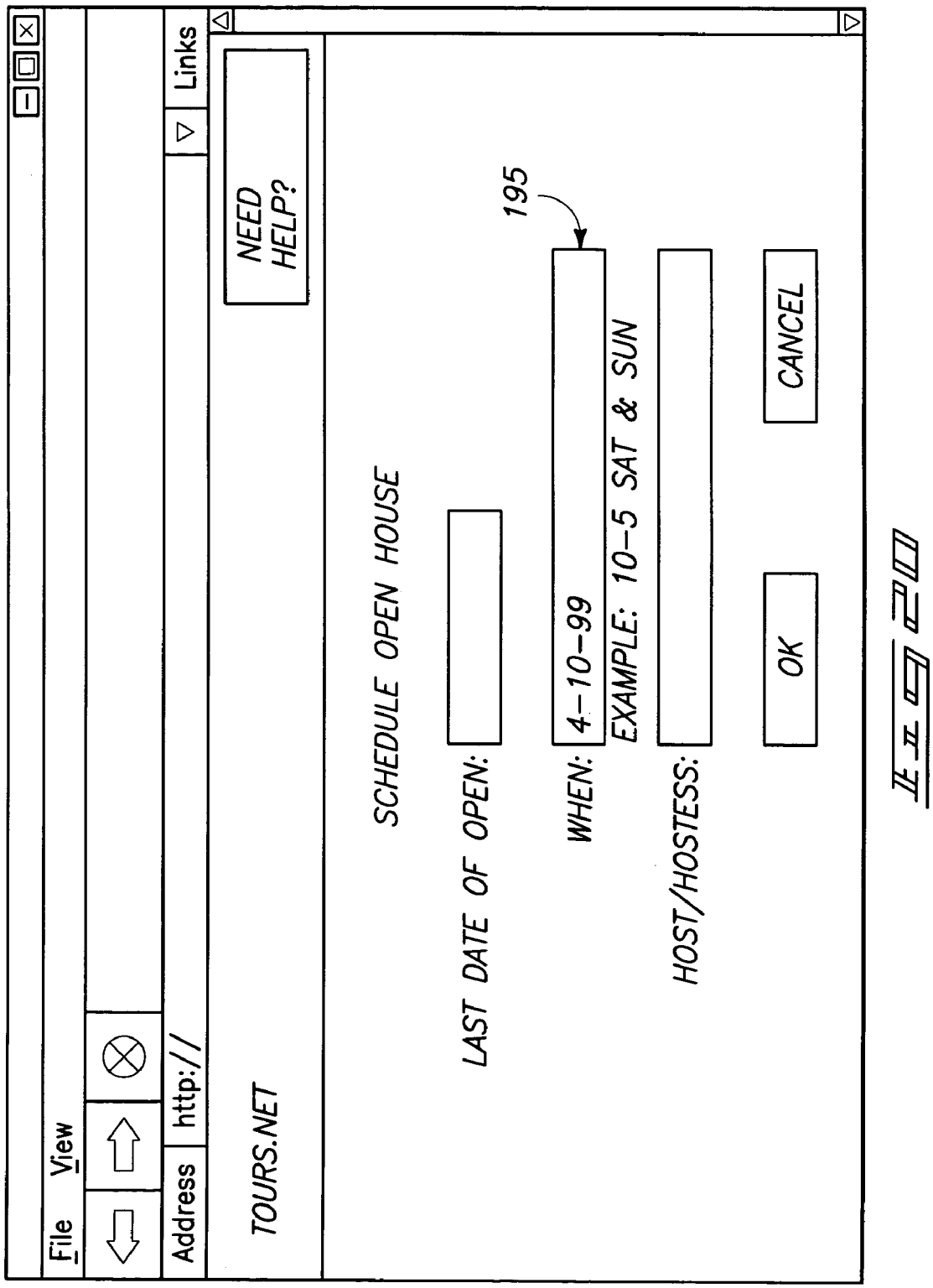

TOURS.NET

NEED HELP?

QUICK EDIT TOURS FOR ANNE MORSE

193 → OPEN 177
HOUSE ← 200

| TOUR# | ADDRESS | PRICE | SCHEDULE | STATUS | PAID TO | EXPIRED | ACTIVE | RENEW |
|---|---|---|---|---|---|---|---|---|
| 100409 | 1244 YELLOW BRICK LANE 11111 | $189,000 | 04/10/1999 | | PAID TO 12/30/1999 | | ●YES ○NO | ●YES ○NO |
| 100552 | | | | | | | | |
| 100599 | | $1 | | | | PAID TO 11/30/1999 | | ●YES ○NO |
| 100603 | MEXICO | | | | | PAID TO 12/31/1999 | | ●YES ○NO |

FIG.22A

TOUR MENU

HELP
CONTACT INFORMATION
QUICK EDIT TOURS
CREATE A NEW TOUR ← 163
TOUR HIT COUNTERS
LOG OUT

LIST OF TOURS

ANNE MORSE    QUICK EDIT
A 100599  –
A 100603  – MEXICO
X 100409  – 123 YELLOW BRICK LANE

FIG.22B

| FIG.22A |
|---|
| FIG.22B |

| X | 100643 | – | YELLOW BRICK |
|---|---|---|---|
| X | 101200 | – | |
| X | 100980 | – | |
| X | 101201 | – | |
| X | 101215 | – | |
| X | 101527 | – | |
| X | 102461 | – | |

A = ACTIVE TOUR
X = INACTIVE TOUR

| 100409 | YELLOW BRICK | $0 | SCHEDULE | UNPAID | PURCHASE |
|---|---|---|---|---|---|
| 100980 | | | SCHEDULE | UNPAID | PURCHASE |
| 100599 | 1234 BRICK STREET | $178,500 | SCHEDULE | UNPAID | PURCHASE |
| 101200 | | $0 | N/A | UNPAID | PURCHASE |
| 101201 | | | N/A | UNPAID | PURCHASE |
| 101215 | | | N/A | UNPAID | PURCHASE |
| 101527 | | | N/A | UNPAID | PURCHASE |
| 102461 | | | SCHEDULE | UNPAID | PURCHASE |

CLICK HERE TO POST CHANGES

Fig. 22B

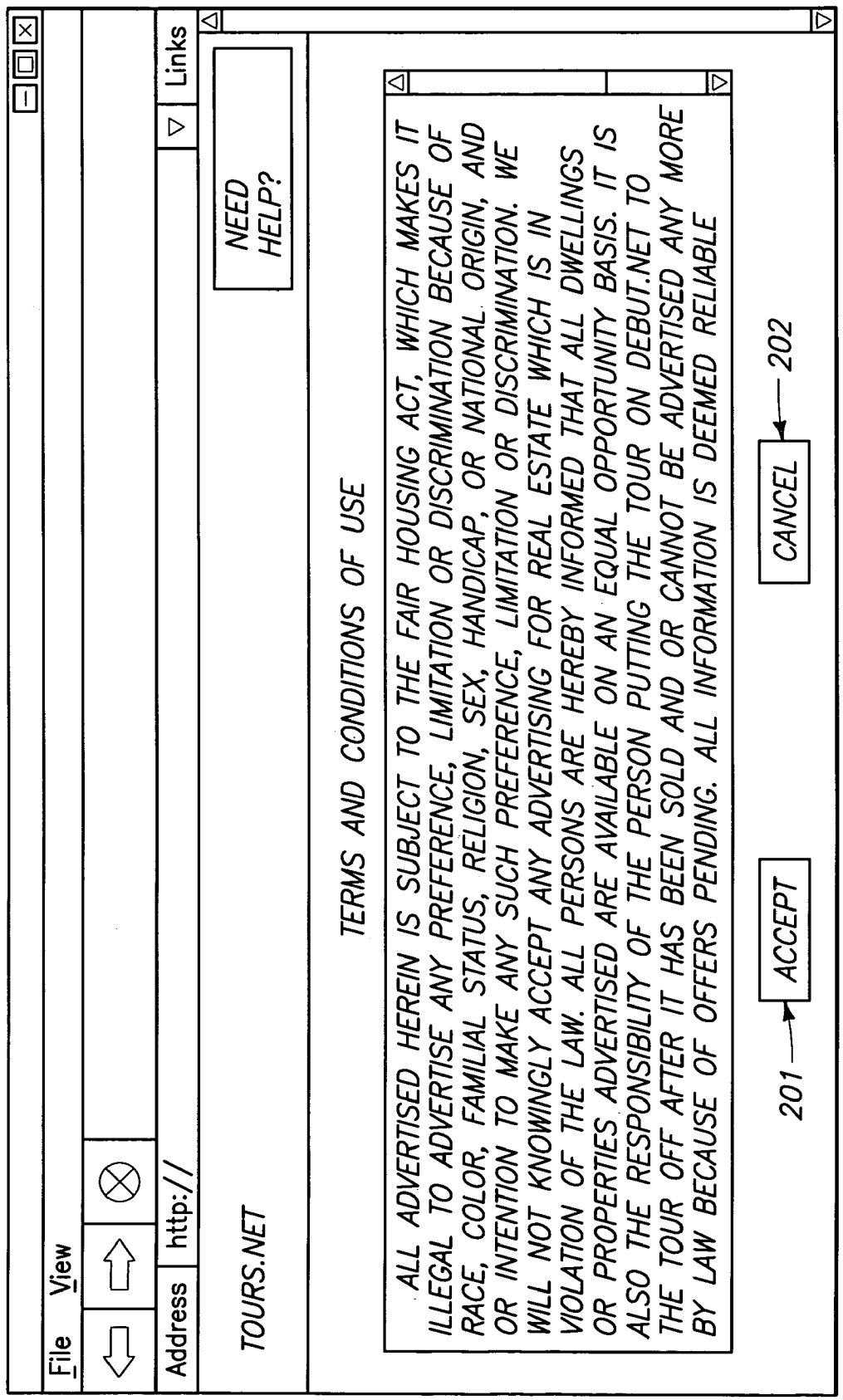

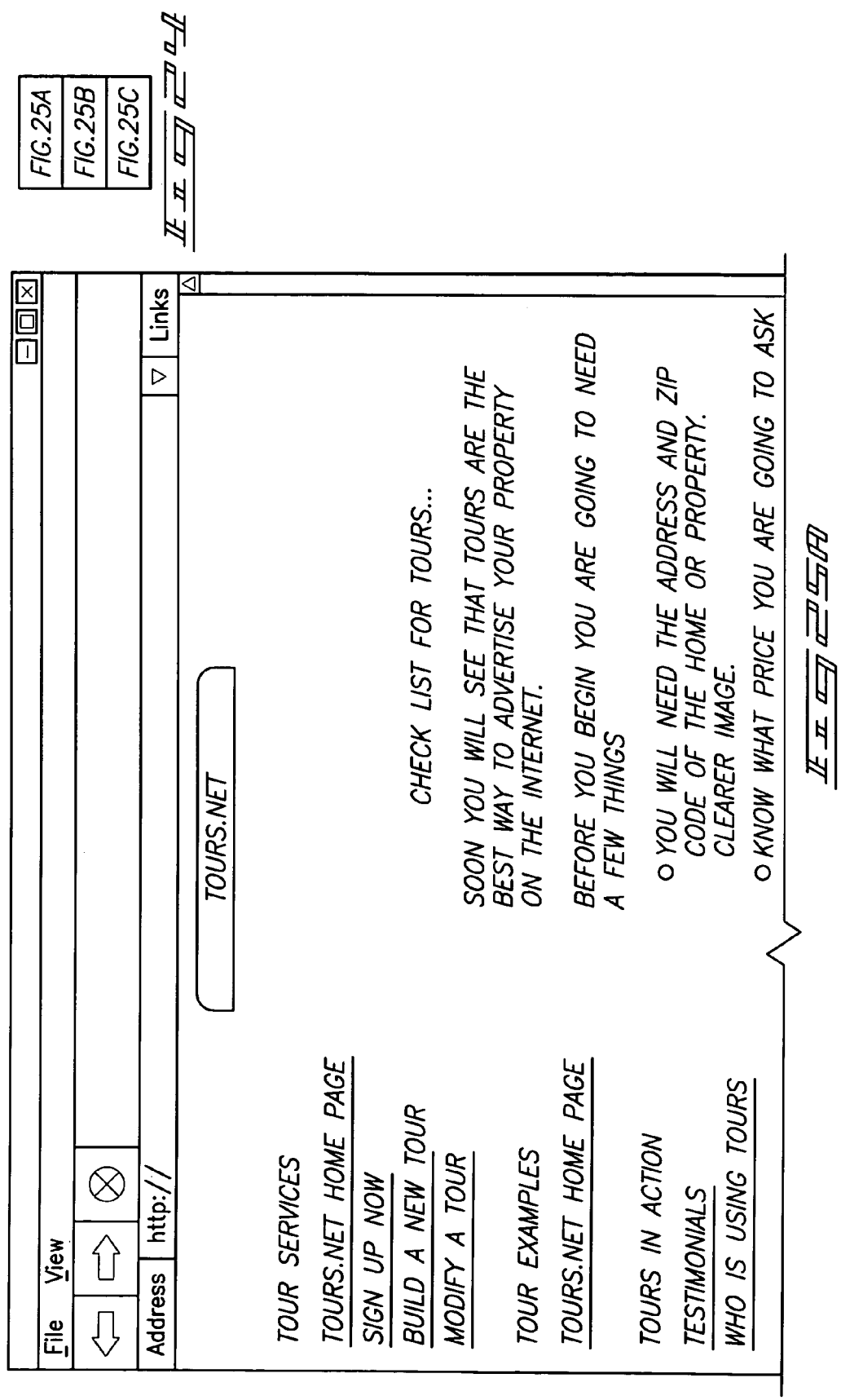

- HAVE OR TAKE THE PICTURES OF THE PROPERTY OR HIRE A PHOTOGRAPHER TO DO THIS. PICTURES HAVE JPEG'S. IF YOU WANT PANORAMIC JPEG PHOTOS IN YOUR TOUR USE A PANORAMIC CAMERA OR MAKE SURE YOUR PHOTOS OVER LAP SO THEY CAN BE STITCHED TOGETHER TO MAKE A PANORAMIC PHOTO. SEE OUR PANORAMIC PAGE FOR HELP AND FAQ'S.

- KNOW HOW MANY JPEG PICTURES YOU WILL WANT FOR YOUR TOUR (1 TO 16). OUR MARKET RESEARCH SHOWS THAT 9 PHOTOS IS THE BEST ALL AROUND NUMBER FOR DISPLAYING YOUR HOME OR PROPERTY. THE STILL JPEG PHOTOS SIZE SHOULD BE APPROXIMATELY 300 TALL X 400 WIDE IN PIXELS, WHICH IS ABOUT 4" X 6".

I NEED HELP
WHY TOURS...
TOUR FAQ
VIEWING DIFFICULTIES

CONTACT US
COMMENTS/SUGGESTIONS
ABOUT TOURS.NET

TOUR BY NUMBER
TYPE YOUR TOUR#: [    ] [GO]

FIG. 25B

- HAVE ALL THE PICTURES IN FRONT OF YOU WHILE WRITING THE TEXT IF POSSIBLE AND WRITE THE TEXT IN A WORD PROGRAM SO YOU CAN COPY AND PASTE IT IN THE TOUR WHEN YOU GO ON-LINE TO BUILD IT. BE PREPARED TO PROVIDE A BRIEF DESCRIPTION OF WHAT IS IN EACH PHOTO OR WHAT YOU WANT TO SAY NEXT TO EACH PHOTO. (ONE PARAGRAPH OF THREE TO FOUR SENTENCE) NO TEXT IS NEEDED FOR THE 1ST AND LAST PHOTO, THIS IS WHERE YOUR CONTRACT INFORMATION GOES. YOU WILL ALSO NEED TO SPELL CHECK YOUR TEXT IN A SOFTWARE PROGRAM LIKE WORD OR WORDPERFECT FOR ERRORS.

- IF WE WRITE THE TEXT FOR YOU, SEND US ALL THE INFORMATION AND TEXT YOU CAN ABOUT THE PROPERTY. THE MORE INFORMATION WE HAVE THE EASIER IT IS TO WRITE ABOUT THE PROPERTY.

- IF YOU ARE GOING TO CHARGE THE TOUR ON YOUR CREDIT CARD THEN HAVE IT READY.

ONCE YOU HAVE COLLECTED ALL OF THESE ITEMS, YOU ARE READY TO PLACE AND ORDER FOR YOUR TOUR.

Fig. 25C

TOURS.NET ○ SPOKANE, WA ○ PHONE (123)456-7890 ○ WEBMASTER@TOURS.NET

TOURS.NET

CREATING A NEW TOUR

CONTACT PERSON: ANNE MORSE

TYPE OF TOUR: RESIDENTIAL — 210

NUMBER OF PHOTOS: 9 — 211

◉ UPLOAD
PHOTOS ARE TAKEN WITH A DIGITAL CAMERA OR SCANNED. ONCE THE PHOTOS ARE ON YOUR COMPUTER IN DIGITAL FORM, THEY ARE SIMPLY UPLOADED TO THE INTERNET VIA THIS WEBSITE.

○ MAIL
PHOTOS ARE TAKEN WITH A CONVENTIONAL CAMERA THEN DEVELOPED. A NON-RETURNABLE SET OF THE PHOTOS ARE MAILED TO TOURS.NET VIA YOUR LOCAL POSTAL SERVICE. ONCE THE PHOTOS HAVE BEEN RECEIVED BY TOURS.NET, THEY WILL BE SCANNED AND ENTERED INTO THIS TOUR WITHIN 2 BUSINESS DAYS.

OK — 212     CANCEL

NEED HELP?

Fig. 26

TOURS.NET

TOUR MENU
HELP
CONTACT INFORMATION
QUICK EDIT TOURS
CREATE A NEW TOUR
TOUR HIT COUNTERS
LOG OUT

LIST OF TOURS
ANNE MORSE     QUICK EDIT
A 100599 —
A 100603 — MEXICO
X 100409 — 123 YELLOW BRICK LANE
X 100643 — YELLOW BRICK

FIG. 27

YOU ARE EDITING TOUR #102461  — 220
CLICK HERE FOR A PREVIEW OF THIS TOUR

TOUR INFO | PICTURES | FLYER INFO | PURCHASE
FIELD — 250    251 — DATA           HELP

TOUR-ID: 102461 — 230                 [?]

AGENT ID NUMBER: 178 — 231            [?]

PRICE: [____] — 232                   [?]

PROPERTY TYPE: RESIDENTIAL ▽ — 234    [?]
                      233

PROPERTY SUB-TYPE: [____▽]            [?]
                      235

TOUR TITLE: [____]

NEED HELP?

FIG. 28A

| FIG. 28A |
| FIG. 28B |
| FIG. 28C |

| Field | Value | Ref |
|---|---|---|
| ADDRESS: | | 236 |
| ZIP: | | 237 |
| CITY: | | 239 / 238 |
| STATE: | | |
| REGION: | | 240 |
| AREA OF TOWN: | ▷ | 242 / 241 |
| NUMBER OF BEDROOM(S): | ▷ ▷ | |
| NUMBER OF BATH(S): | 0 | 243 |
| MLS NUMBER: | | |
| STYLE | ▷ | |
| YEAR: | | |
| MORTGAGE CALCULATOR LINK: | ○ YES ⊙ NO | |
| LIST DATE: | 10/06/1999 | |

```
X 101199 —
X 101200 —
X 100980 —
X 101201 —
X 101215 —
X 101527 —
X 102461 —
```

A = ACTIVE TOUR
X = INACTIVE TOUR

FIG. 28B

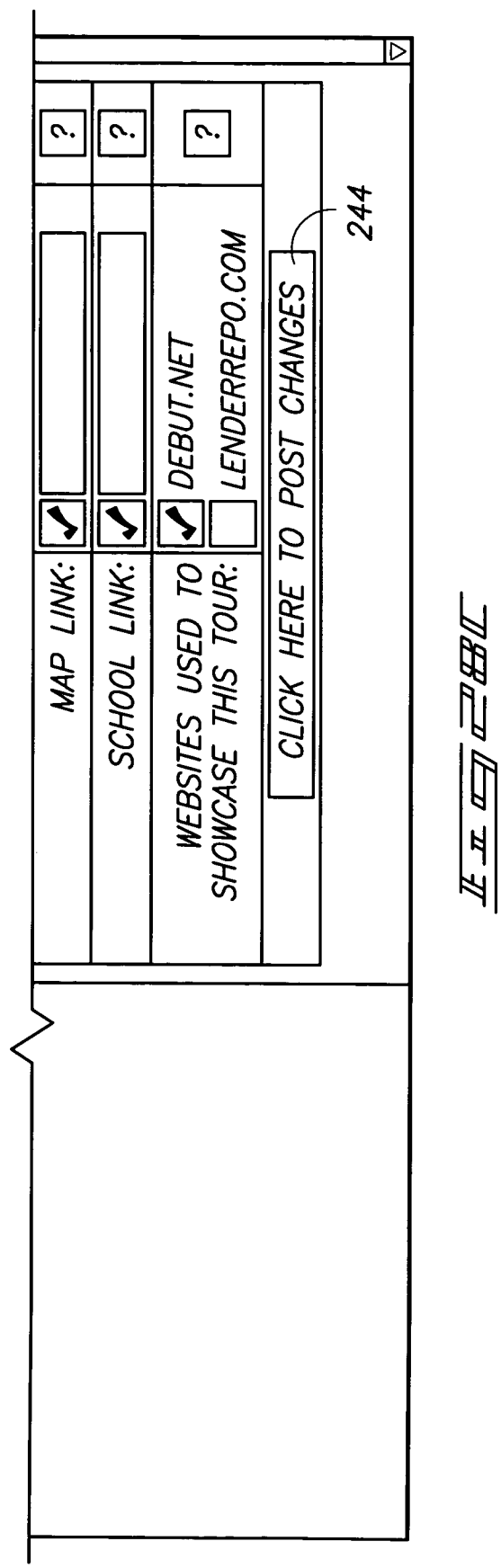

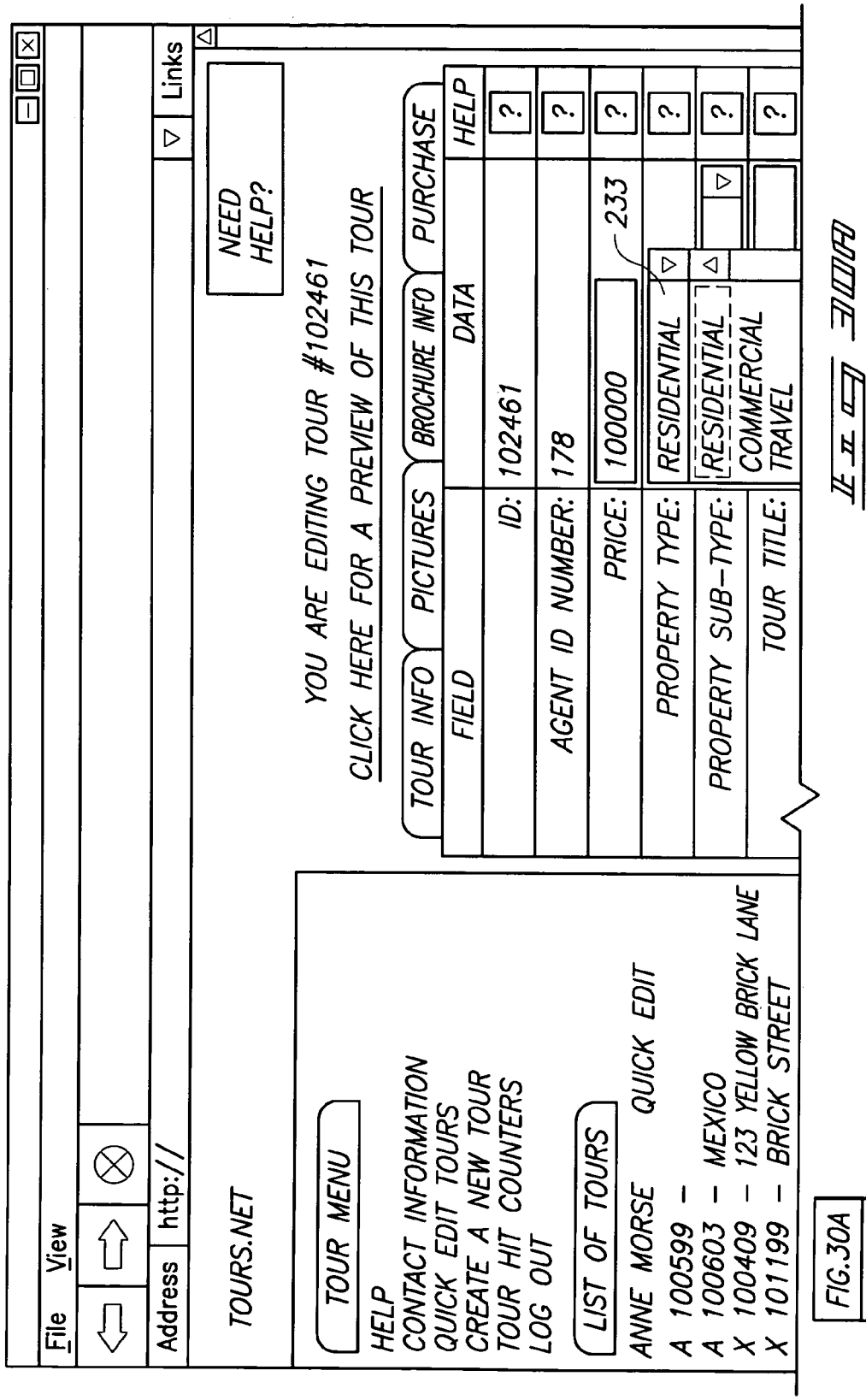

X 102461 — 12345 LEE STREET
X 100643 — YELLOW BRICK
X 101200 —
X 100980 —
X 101201 —
X 101215 —
X 101527 —

A = ACTIVE TOUR
X = INACTIVE TOUR

ADDRESS: RENT
ZIP: EDUCATION
 GOLF
CITY: ENTERTAINMENT
 AUTO
STATE: SENIOR
 INDUSTRIAL
REGION: DEALERSHIP

AREA OF TOWN:
NUMBER OF BEDROOM(S): 2
NUMBER OF BATH(S): 2  1/2
MLS NUMBER: 9999999
STYLE: RANCH
YEAR: 1998
MORTGAGE CALCULATOR LINK: ○ YES  ● NO
LIST DATE: 10/06/1999

FIG. 30B

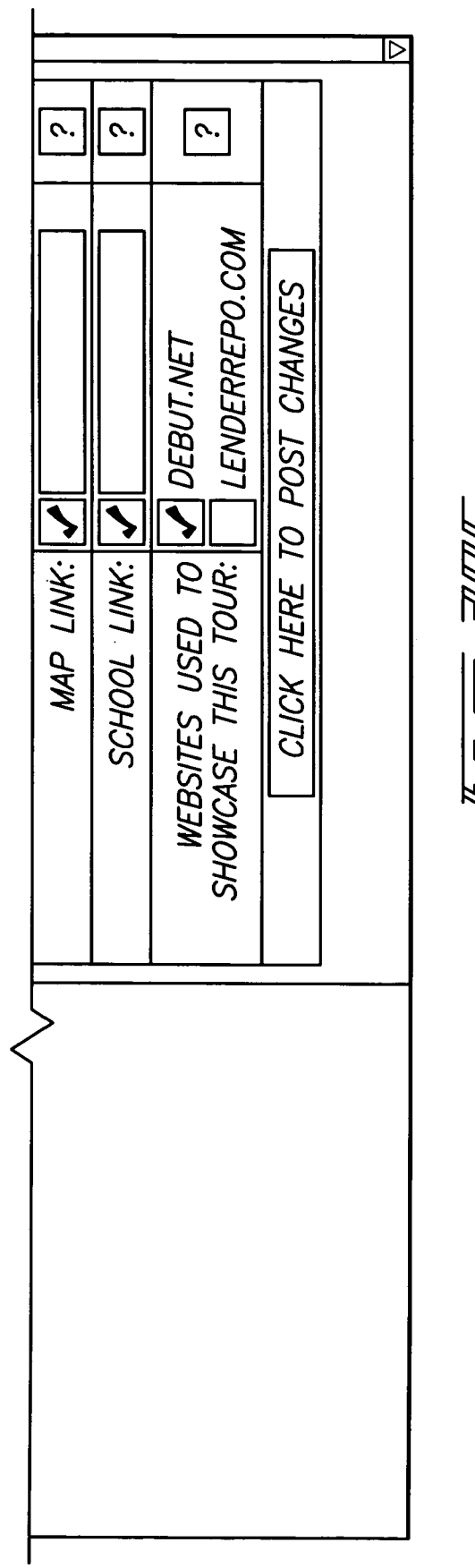

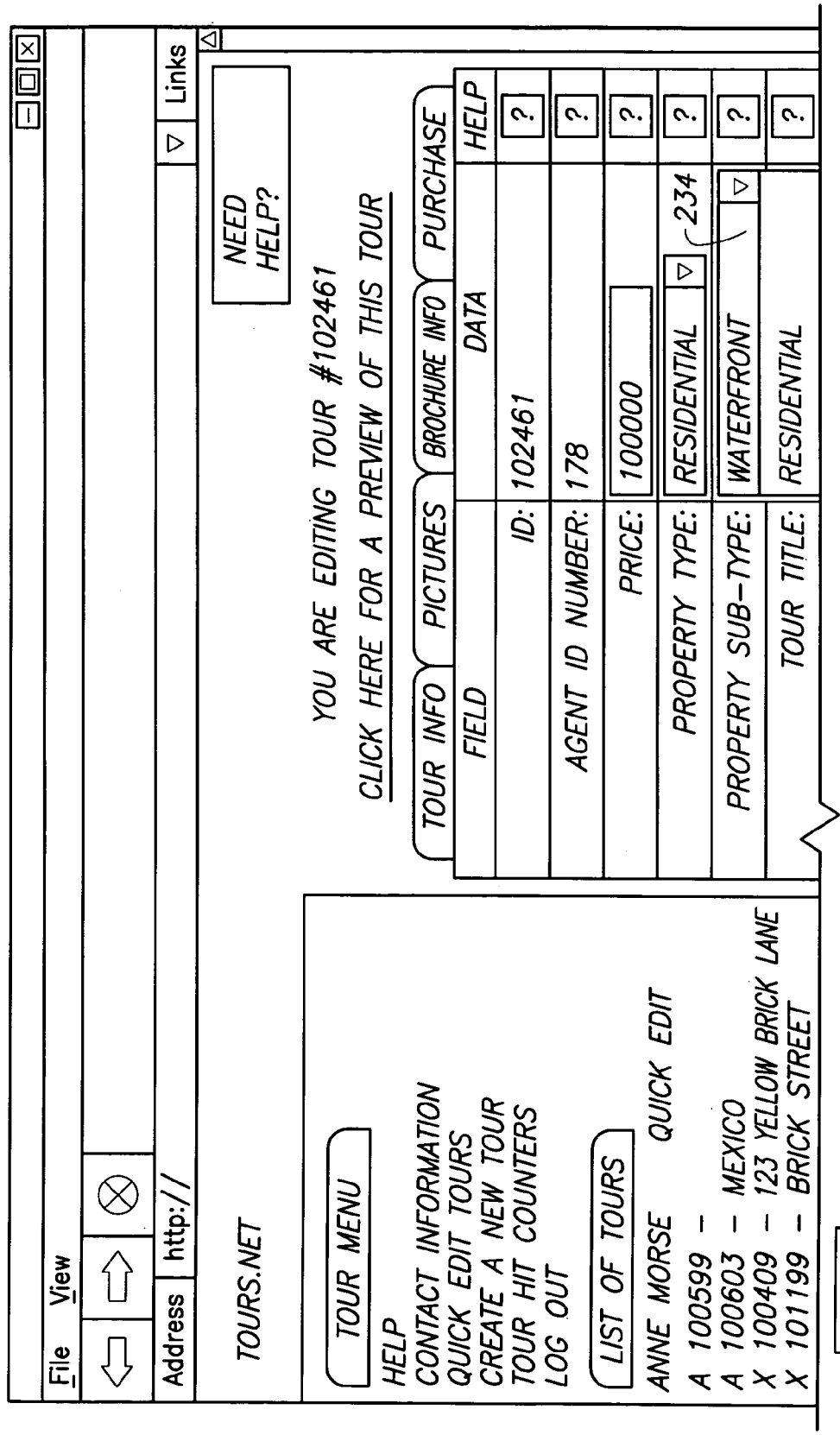

X 102461 — 12345 LEE STREET
X 100643 — YELLOW BRICK
X 101200 —
X 100980 —
X 101201 —
X 101215 —
X 101527 —

A = ACTIVE TOUR
X = INACTIVE TOUR

ADDRESS: [?]
ZIP: RESIDENTIAL WITH ACREAGE [?]
 LOTS AND LAND
 WATERFRONT
CITY: MULTI-FAMILY [?]
STATE: FARMS [?]
 CONDO
REGION: NEW CONSTRUCTION [?]
AREA OF TOWN: [?]
NUMBER OF BEDROOM(S): 2 ▽ [?]
NUMBER OF BATH(S): 2 ▽ 1/2 ▽ [?]
MLS NUMBER: 9999999 [?]
STYLE: RANCH ▽ [?]
YEAR: 1998 [?]
MORTGAGE CALCULATOR LINK: ○ YES ⊙ NO [?]
LIST DATE: 10/06/1999 [?]

FIG. 32B

| | |
|---|---|
| ADDRESS: | 12345 LEE STREET | ? |
| ZIP: | 99204 | ? |
| CITY: | SPOKANE | ? |
| STATE: | WA | ? |
| REGION: | EASTERN WASHINGTON | ? |
| AREA OF TOWN: | | ? |
| NUMBER OF BEDROOM(S): | 2 ▷ | ? |
| NUMBER OF BATH(S): | 2 ▷ 1/2 ▷ | ? |
| MLS NUMBER: | 9999999 | ? |
| STYLE | RANCH —246 | ? |
| | ▷ ◁ | |
| | BUNGALOW | |
| | CAPE COD | |
| | CONTEMPORARY | |
| | COLONIAL | |
| YEAR: | | ? |
| MORTGAGE CALCULATOR LINK: | | ? |
| LIST DATE: | RANCH | ? |

X 101199 —
X 101200 —
X 100980 —
X 101201 —
X 101215 —
X 101527 —
X 102461 —

A = ACTIVE TOUR
X = INACTIVE TOUR

FIG. 34B

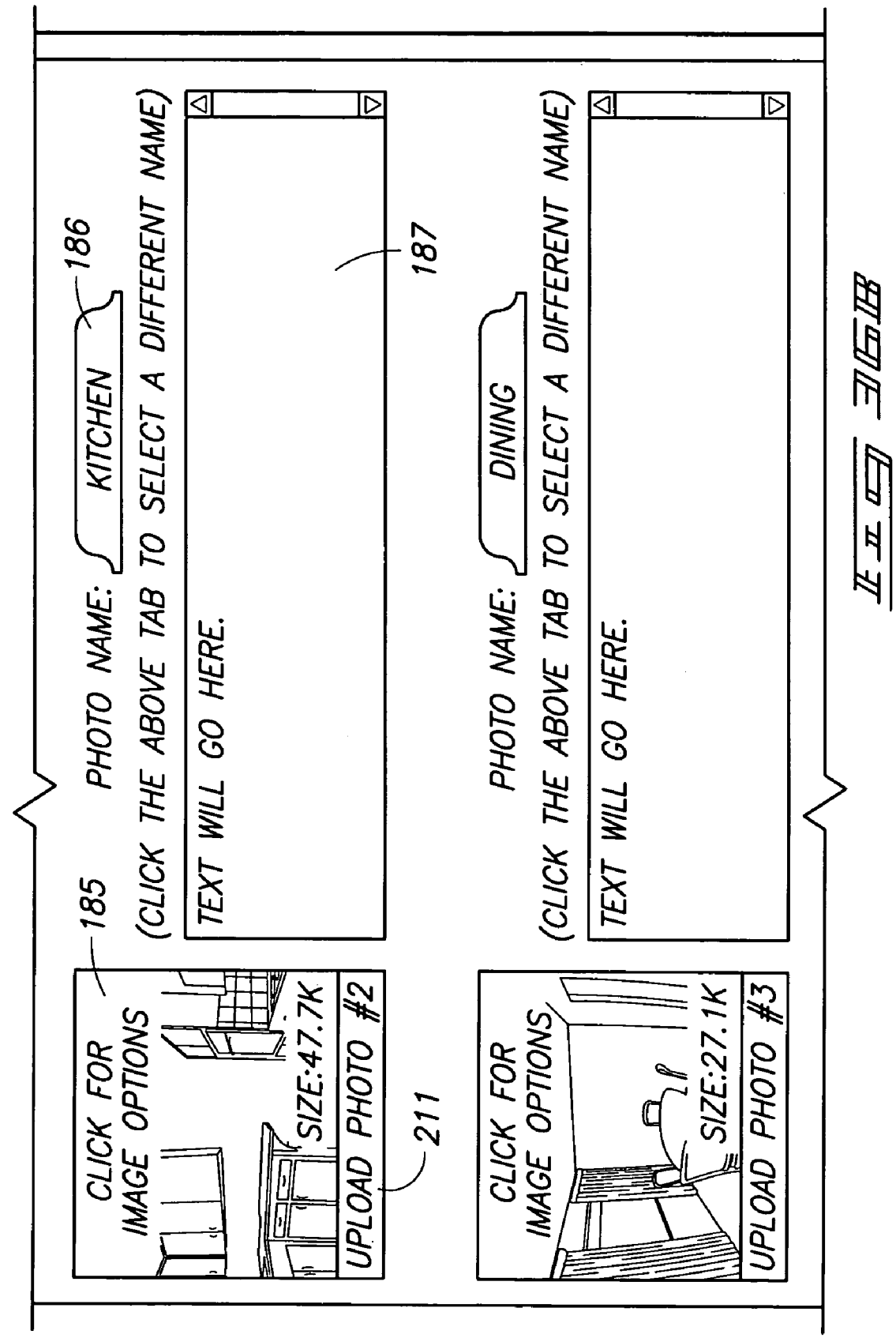

PHOTO NAME: MASTER
(CLICK THE ABOVE TAB TO SELECT A DIFFERENT NAME)
TEXT WILL GO HERE.
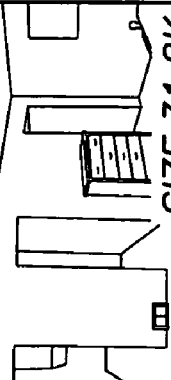
CLICK FOR IMAGE OPTIONS
SIZE: 31.8K
UPLOAD PHOTO #6
PHOTO NAME: FAMILY
(CLICK THE ABOVE TAB TO SELECT A DIFFERENT NAME)
TEXT WILL GO HERE.
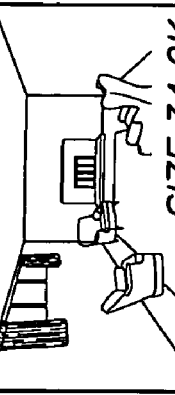
CLICK FOR IMAGE OPTIONS
SIZE: 34.2K
UPLOAD PHOTO #7
FIG. 36D

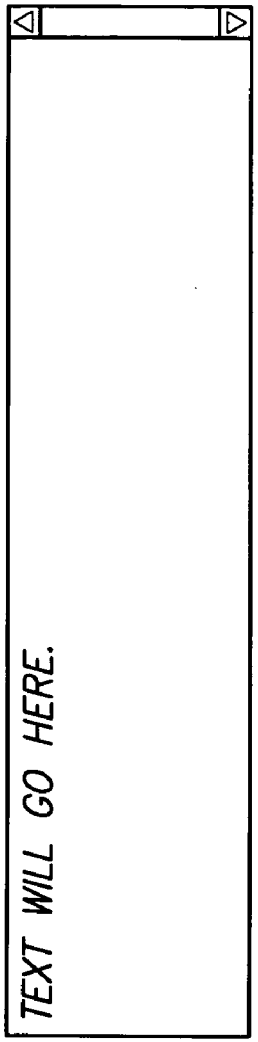

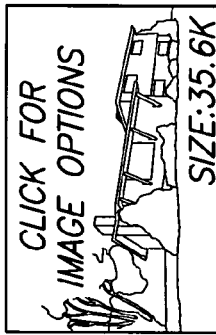

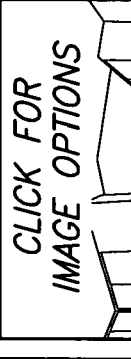

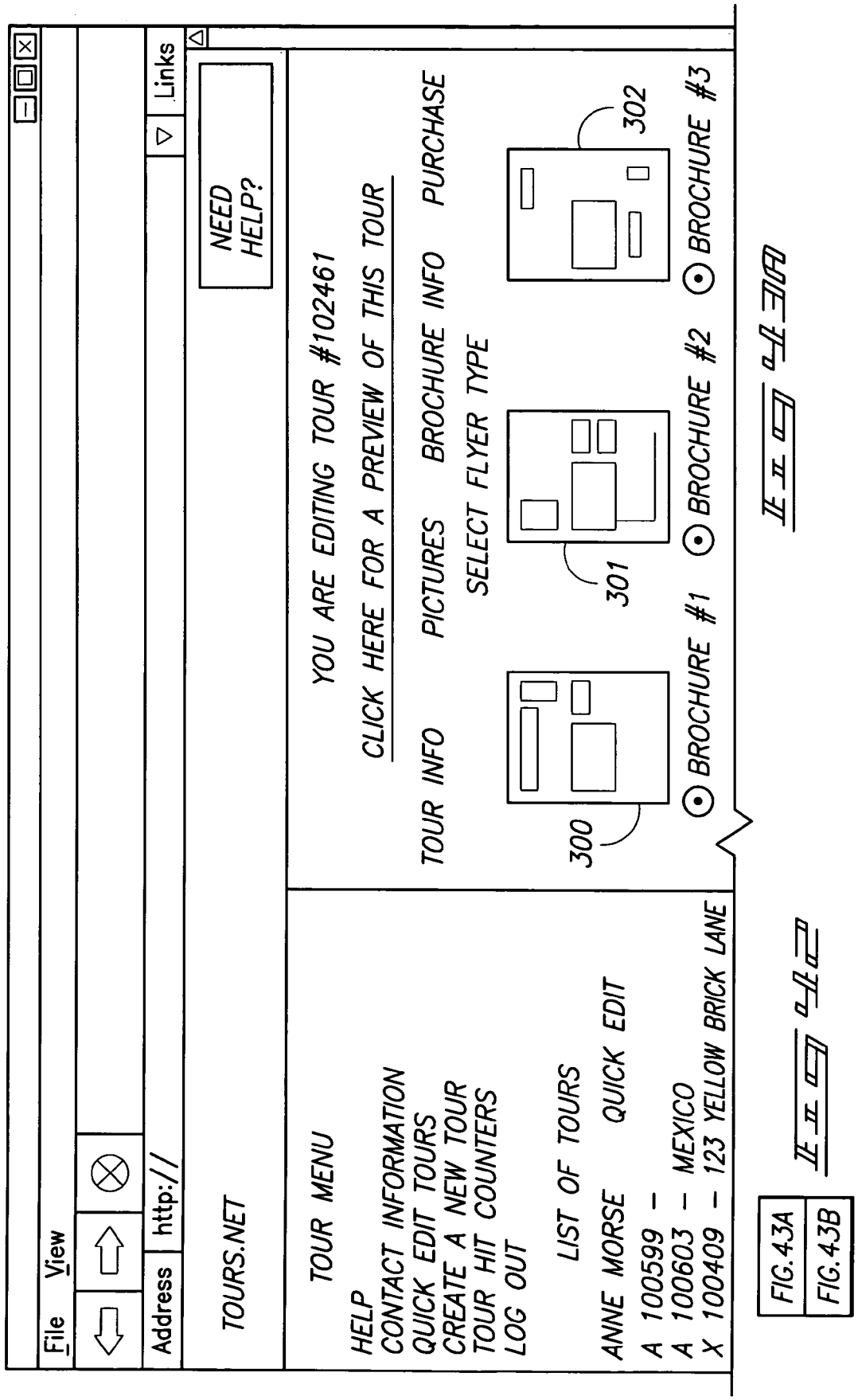

FLYER TEXT

LARGE VIEW VALLEY LOT WITH PRIVATE BACKYARD BY TERRACE VIEW PARK. FORMAL DINING PLUS KITCHEN EATING SPACE, 2 FIREPLACES, ON SEWER, GAS HEAT NEWER ROOF, LARGE COVERED PATIO PLUS DECK WITH STORAGE, 2 CAR GARAGE W/ OPENER, 3+ BEDROOMS, 2 BATHS W/ RI BATH DOWN. GREAT PRICE-GREAT LOCATION.

FLYER BULLET POINTS

| | |
|---|---|
| TERRACE VIEW PARK | GREAT VIEW |
| ON SEWER | GAS HEAT |
| 2 CAR GARAGE | LARGE CEDAR CLOSET |
| WOOD FLOORS | TAXES ARE $1811 |
| 2 FIREPLACES | OVER 1900 SQFT |
| PRIVATE BACKYARD | FORMAL DINING |
| DECK & COVERED PATIO | |
| LOTS OF STORAGE | |

CLICK HERE TO POST CHANGES

X 101199 — 1234 BRICK STREET
X 102461 — 12345 LEE ST
X 100643 — YELLOW BRICK
X 101200 —
X 100980 —
X 101201 —
X 101215 —
X 101527 —

A = ACTIVE TOUR
X = INACTIVE TOUR

FIG. 44 31B

OFFERED AT: $100,000

LARGE VIEW VALLEY LOT WITH PRIVATE BACKYARD BY TERRACE VIEW PARK. FORMAL DINING PLUS KITCHEN EATING SPACE, 2 FIREPLACES, ON SEWER, GAS HEAT, NEWER ROOF, LARGE COVERED PATIO PLUS DECK WITH STORAGE, 2 CAR GARAGE W/ OPENER, 3+ BEDROOMS, 2 BATHS W/ RI BATH DOWN. GREAT PRICE -GREAT AREA.

- ☐ 2 FIREPLACES
- ☐ PRIVATE BACKYARD
- ☐ DECK & COVERED PATIO
- ☐ LOTS OF STORAGE
- ☐ GREAT VIEW
- ☐ GAS HEAT
- ☐ LARGE CEDAR CLOSET
- ☐ TAXES ARE $1811
- ☐ OVER 1900 SQFT
- ☐ FORMAL DINING

305

ANNE MORSE
123-456-7890

SEE A TOUR OF THIS PROPERTY AT HOME.DEBUT.NET

FIG. 45B

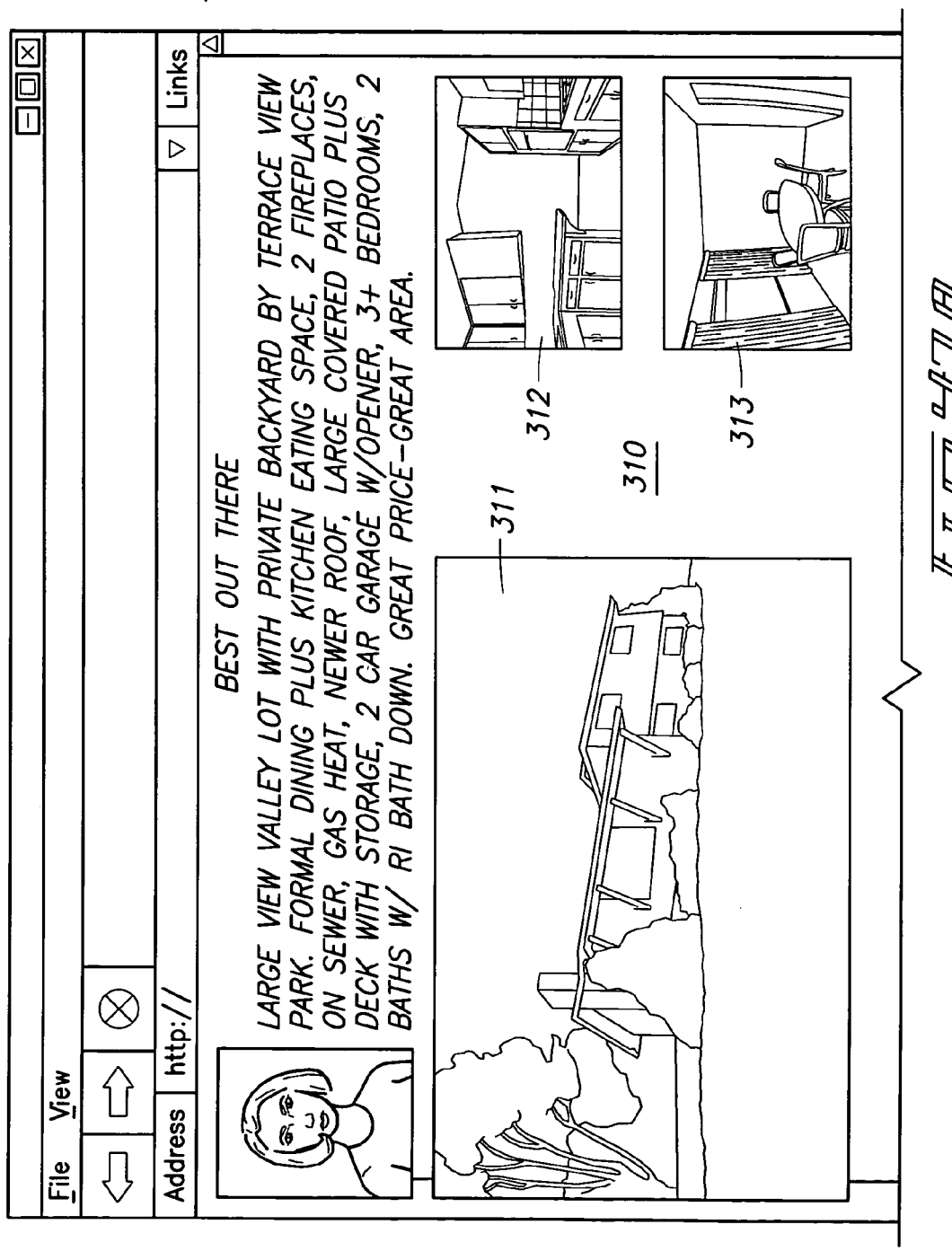

- TERRACE VIEW PARK
- ON SEWER
- 2 CAR GARAGE
- WOOD FLOORS
- 2 FIREPLACES
- PRIVATE BACKYARD
- DECK & COVERED PATIO
- LOTS OF STORAGE
- GREAT VIEW
- GAS HEAT
- LARGE CEDAR CLOSET
- TAXES ARE $1811
- OVER 1900 SQFT
- FORMAL DINING
- THIS PROPERTY OFFERED AT $100,000

314

12345 LEE ST

FOR MORE INFORMATION

CONTACT ANNE MORSE AT 123-456-7890
OR EMAIL: ANNE@DEBUT.NET

HOME DEBUT

FIG. 47B

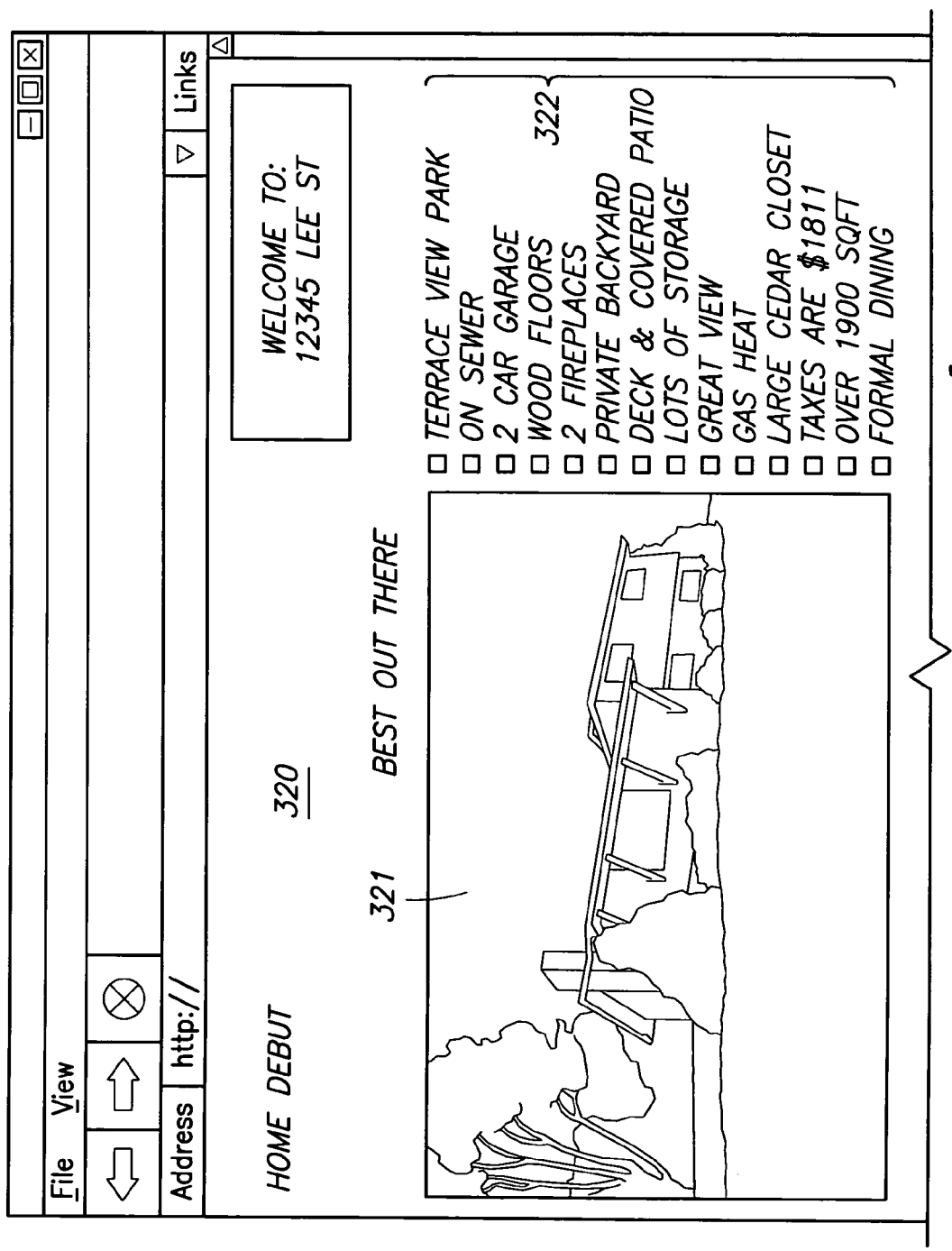

LARGE VIEW VALLEY LOT WITH PRIVATE BACKYARD BY TERRACE VIEW PARK. FORMAL DINING PLUS KITCHEN EATING SPACE, 2 FIREPLACES, ON SEWER, GAS HEAT, NEWER ROOF, LARGE COVERED PATIO PLUS DECK WITH STORAGE, 2 CAR GARAGE W/ OPENER, 3+ BEDROOMS, 2 BATHS W/ RI BATH DOWN. GREAT PRICE-GREAT AREA.

ANNE MORSE
123-456-7890
E-MAIL: ANNE@DEBUT.NET

OFFERED AT: $100,000

SEE A TOUR OF THIS HOME AT HOME.DEBUT.NET

X 101461 — 12345 LEE ST
X 100643 — YELLOW BRICK
X 101200 —
X 100980 —
X 101201 —
X 101215 —
X 101527 —

A = ACTIVE TOUR
X = INACTIVE TOUR

PURCHASE TOUR
⊙ ADVERTISE FOR 6 MONTHS        $39.95

METHOD OF PROVIDING PHOTOS
    CUSTOMER UPLOADS PHOTOS     NO CHARGE

METHOD OF PROVIDING TEXT
○ TEXT WRITING SERVICE FOR THE PICTURES $29.95
⊙ CUSTOMER PROVIDES TEXT        NO CHARGE

PANORAMIC PHOTO BUILDING SERVICE (OPTIONAL)
 [0 ▷] STITCH 2-4 PHOTOS         $9.95/PAN
 [0 ▷] STITCH 5 OR MORE PHOTOS  $19.95/PAN

[PRINTABLE INVOICE]   [SECURE ONLINE FORM]

TOURS.NET

TOUR MENU

HELP
CONTACT INFORMATION
QUICK EDIT TOURS
CREATE A NEW TOUR
TOUR HIT COUNTERS
LOG OUT

LIST OF TOURS
ANNE MORSE    QUICK EDIT

A  100599  –
A  100603  –  MEXICO
X  100409  –  123 YELLOW BRICK LANE
X  101199  –  1234 BRICK STREET

FIG.53B

NEED HELP?

TOUR INVOICE

THANK YOU FOR YOUR ORDER! SIMPLY FILL OUT THE BLANKS AT THE BOTTOM OF THIS PAGE TO COMPLETE YOUR TOUR ORDER. YOUR CREDIT CARD WILL BE CHARGED, AND YOUR TOUR WILL BE ACTIVATED. PLEASE PRINT OUT A COPY OF THIS PAGE, BEFORE YOU FILL IN THE BLANKS, FOR YOUR RECORDS. WE APPRECIATE YOUR BUSINESS. IF YOU HAVE ANY QUESTIONS CONCERNING THIS ORDER PLEASE CALL OUR OFFICE (123)456-7890 OR TOLL FREE AT 1-888-445-7890.

10/06/1999 3:23:16PM          TOUR NUMBER: 102461
ANNE MORSE                    ANNE MORSE
AGENT ID: 123                 AGENT ID: 123

FIG.53A

| FIG.53A |
| FIG.53B |
| FIG.53C |

X 101461 – 12345 LEE ST
X 100643 – YELLOW BRICK
X 101200 –
X 100980 –
X 101201 –
X 101215 –
X 101527 –

A = ACTIVE TOUR
X = INACTIVE TOUR

PURCHASER INFORMATION    BILLING INFORMATION
ANNE MORSE               ANNE MORSE
AGENT ID: 123            AGENT ID: 123

PROPERTY DESCRIPTION

ADDRESS: 12345 LEE ST    PRICE: $100,000.00
         SPOKANE, WA
         99204           AREA:

GROUPING: EASTERN        MLS#: 9999999
          WASHINGTON

QTY   PRODUCTS/SEVICES              PRICE    TOTAL
 1    ADVERTISE FOR 6 MONTHS        $39.95   $39.95
                                    TOTAL    $39.95

FIG. 53B

CREDIT CARD INFORMATION

CARD NUMBER:
EXPIRATION DATE: 01 ▷ 00 ▷
CARD HOLDER NAME: ANNE MORSE
BILLING ADDRESS:
CITY:
STATE:
ZIP:
COUNTRY:

FIG. 63C

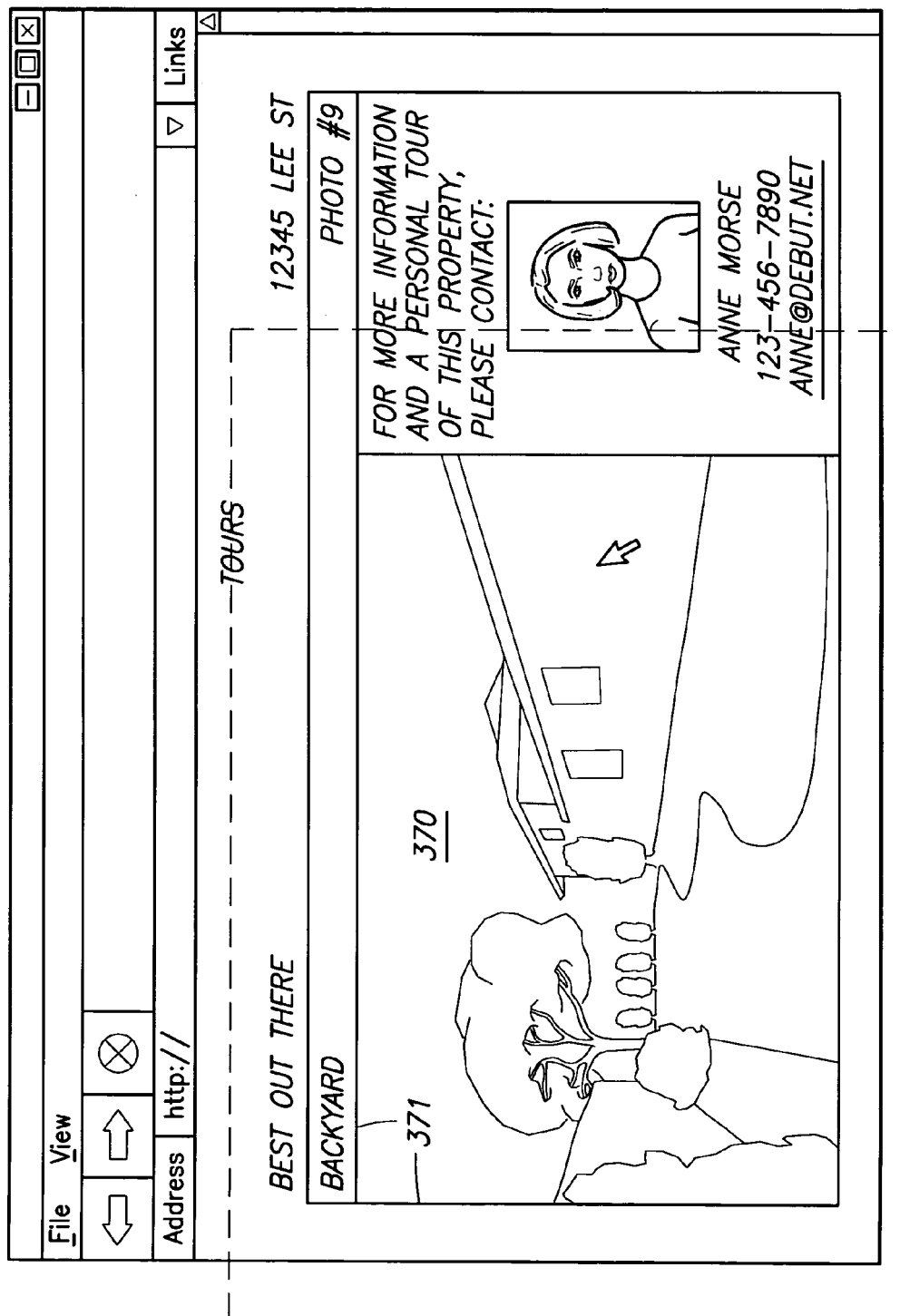

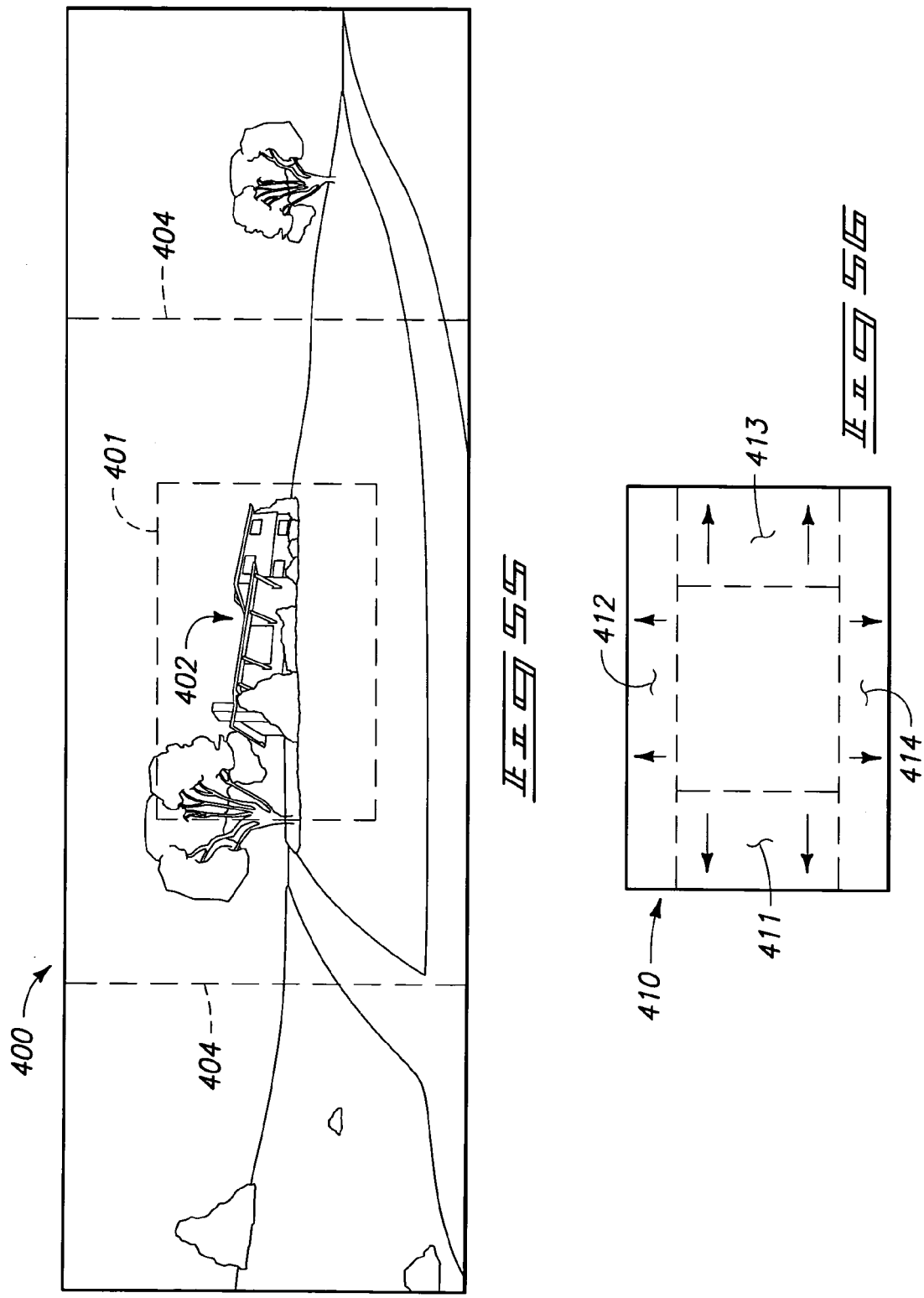

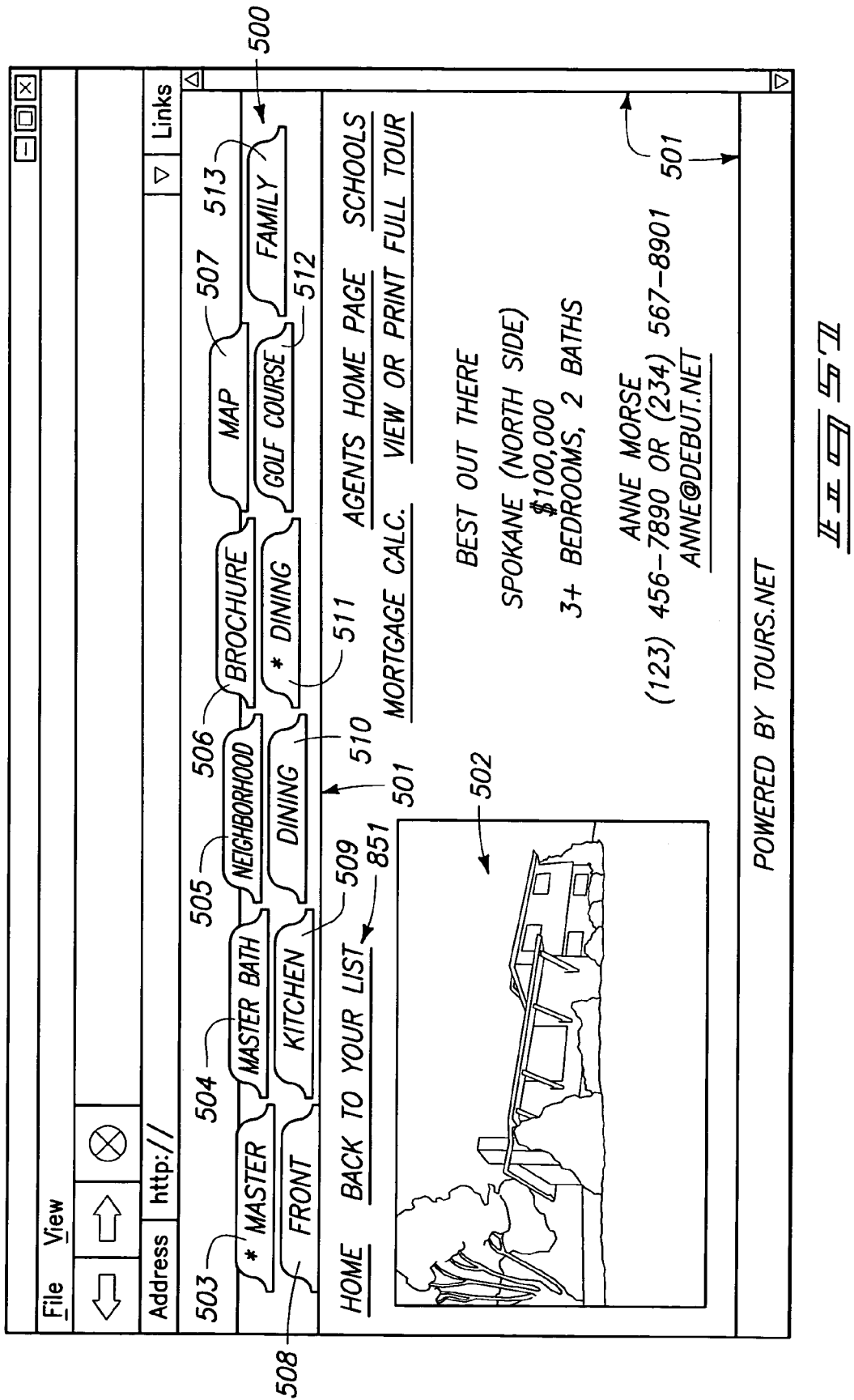

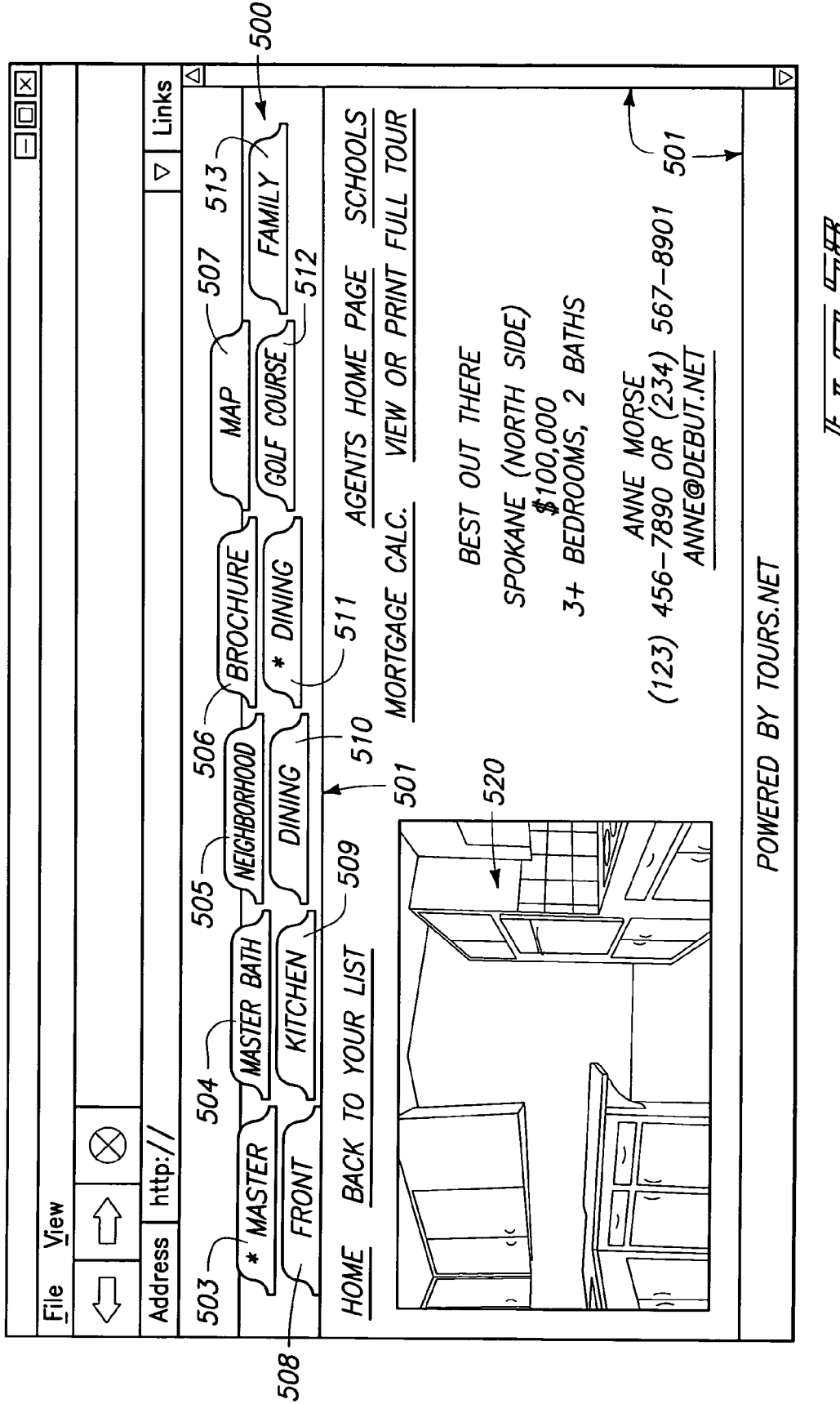

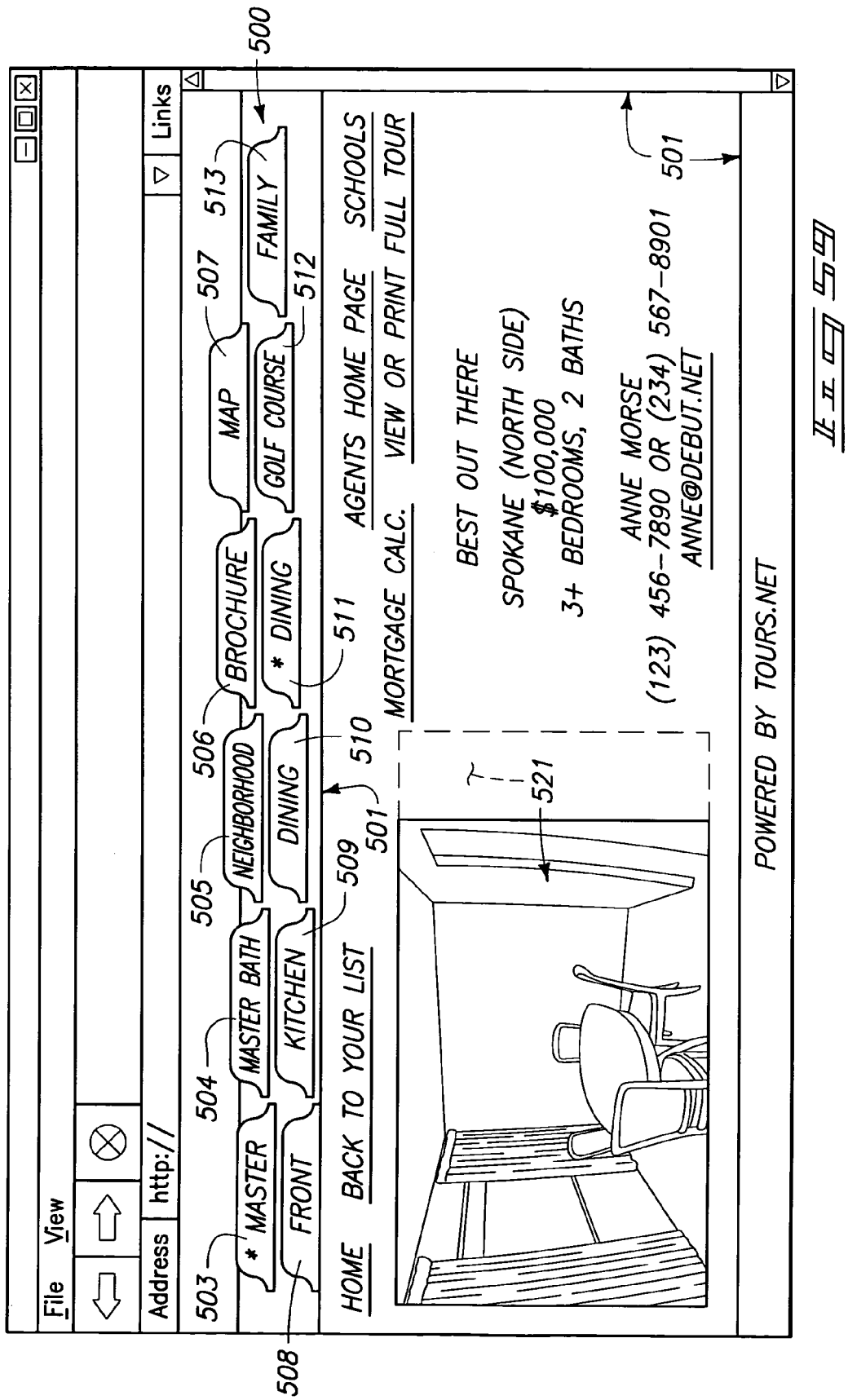

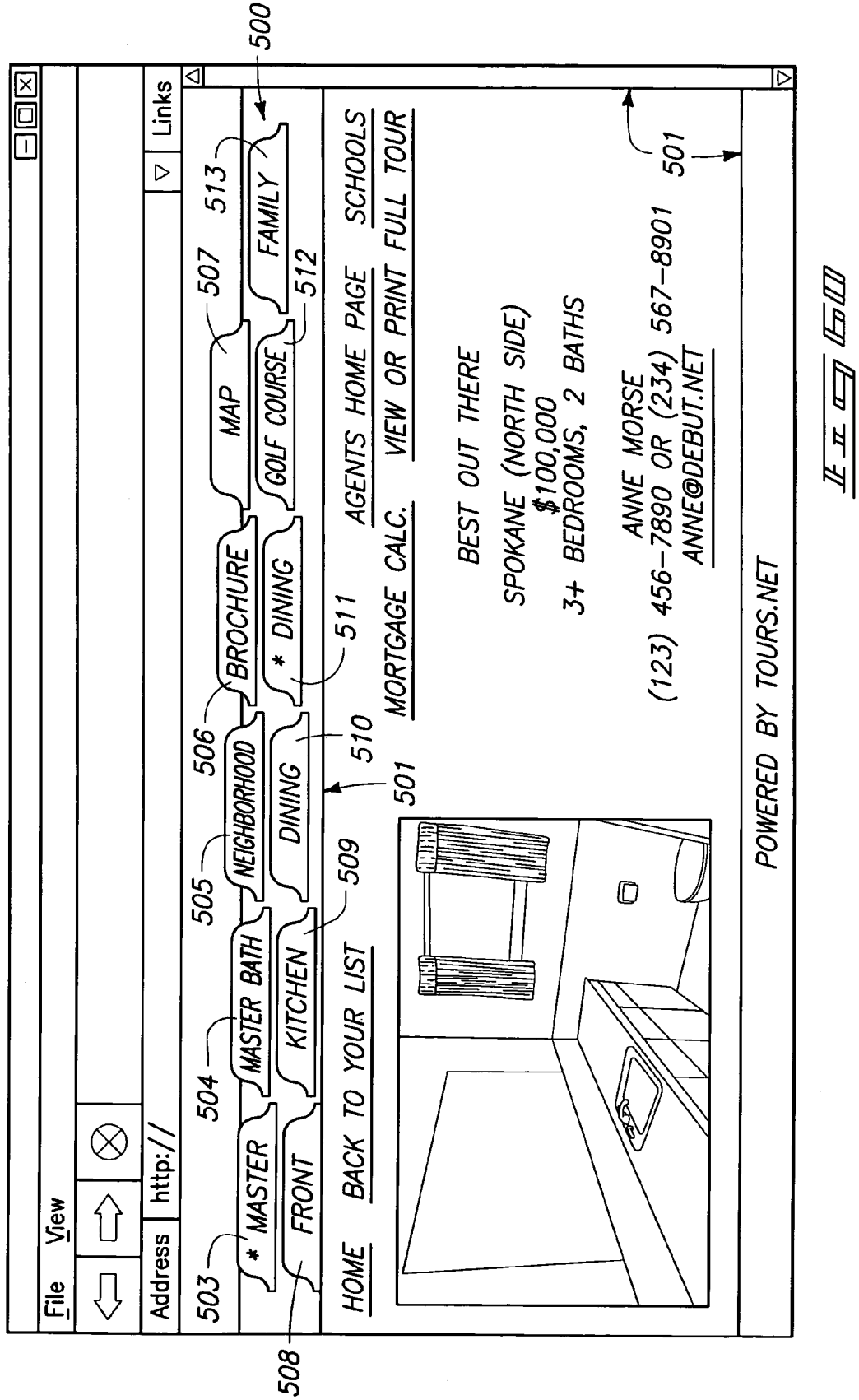

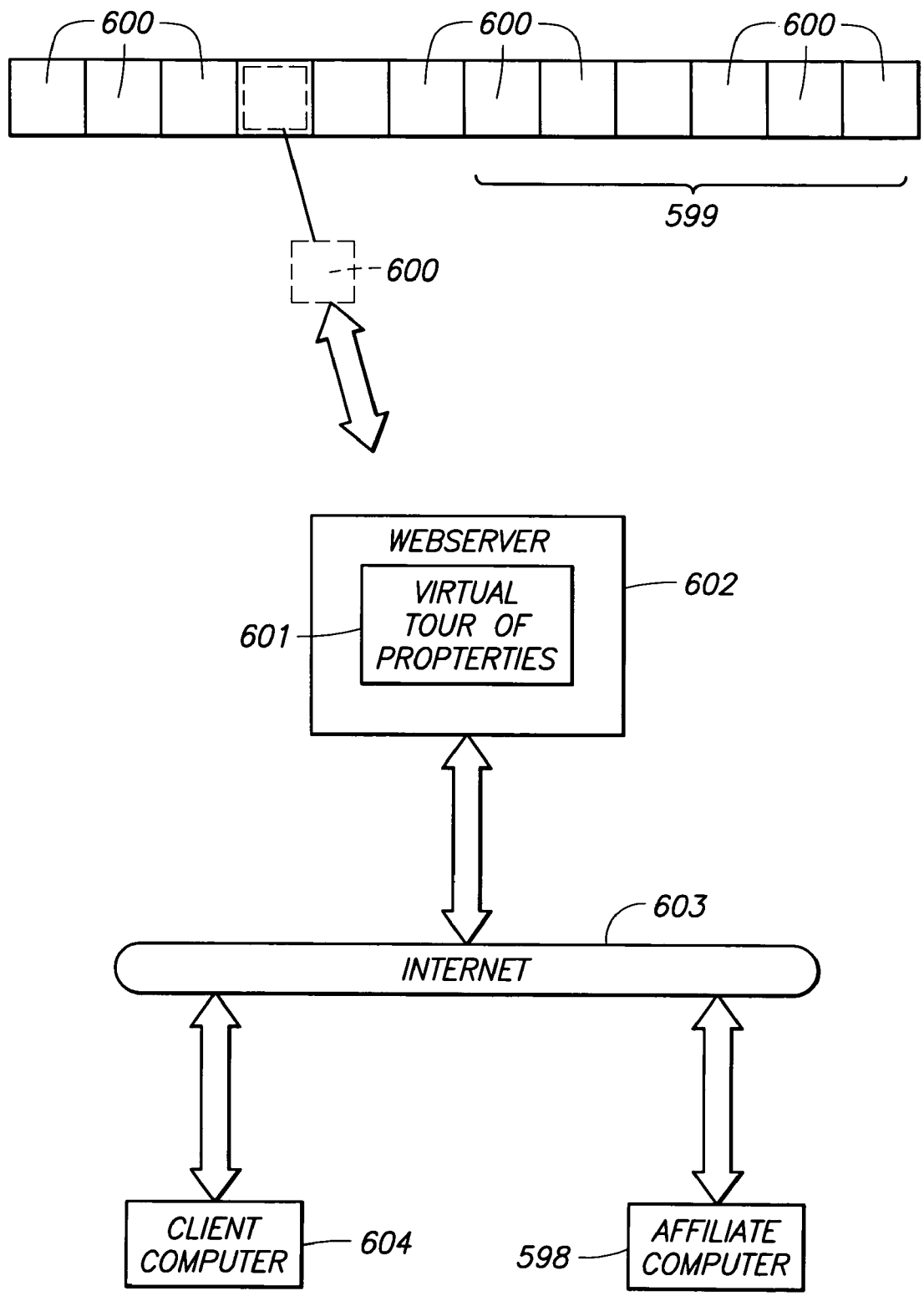

ELECTRONIC PROPERTY VIEWING METHOD AND COMPUTER-READABLE MEDIUM FOR PROVIDING VIRTUAL TOURS VIA A PUBLIC COMMUNICATIONS NETWORK This is a continuation of U.S. patent application Ser. No. 09/425,833, filed Oct. 21, 1999 now U.S. Pat. No. 6,839,880; and from which this application claims priority.

TECHNICAL FIELD

This invention pertains an electronic property viewing system for providing virtual property tours through a public communications network, the system allowing consumers to tour real and personal property, and wherein affiliates themselves may independently access, input and edit the property tour data sets and photographs.

REFERENCE TO MICROFICHE INDEX

This specification includes an appendix which is filed herewith, comprising eighty five pages including computer source code comprising one embodiment of the computer readable instructions which may be used to practice an embodiment of this invention, and which are hereby incorporated into this specification by this reference.

BACKGROUND OF THE INVENTION

The more recent acceptance and use of public communications networks such as the internet, has provided a network or system through which the viewing of both real and personal property may be accomplished in a much more efficient and desirable way than has ever previously been provided or available. The increased ability to handle larger amounts of data and information over the internet has further allowed more graphical images to be presented to the viewer, which facilitates much more effective presentations or tours to users of the internet.

While there have been prior attempts to make available the viewing of still photographs of property over the internet, the prior systems have typically required that a photographer be hired on behalf of the company providing the website, who must go to the property to take photographs. The website company then posted the one or more still photographs on the website, and later input text describing the still photographs.

These prior systems therefore have a relatively high cost in the commercial creation of the photographs, and then in their placement on the website of the website company. The prior systems also took an unjustifiably long amount of time before the photographs of the property were available to viewers or potential purchasers.

It is therefore an object of an embodiment of this invention to provide a property viewing system wherein affiliates, such as real estate agents or property owners (in the real estate embodiments of this invention), property managers (in the rental property embodiments of this invention), or the property management companies & owners (in the vacation rental or room rental embodiments of this invention), may take their own photographs and upload the images along with the desired data sets to the website, thereby constructing their own virtual tour which would be available immediately or in real-time.

In the typical prior systems the viewer accessing a property viewing website over the internet would find one or more photographs on the first page for that property unit, but typically must then move from new page to new page in order to view the plurality of photographs of the property. In order to go back to a prior view of the property to look at it a second time and to look at other pages which contain other photographs of the property, the user must typically click on the back button on his internet browser. Requiring a user to continually go back to the start page for a series of photographs or images makes the tour more tedious and less desirable for the user. This becomes a relatively slow process and does not provide a sufficiently easy or desirable virtual tour of the property.

It is therefore an object of an embodiment of this invention to provide a property viewing system in which the viewer may take a virtual tour of property while staying on the same reference page, and further which provides the index, tabs or other selection means to directly go to each of the other multiple views of the property from the same page. Some of the embodiments of this invention have the advantage of providing a tab system which allows the user to view or access any one of the tour views or pages from any one of the tour views or pages, significantly reducing the amount of time to take a complete virtual tour, and making it more pleasing to the consumer.

In most property viewing situations, merely providing small single shot still photographs does not make the best presentation of the property being viewed. It is much more desirable to provide larger photographs, panorama photographs or movable photographs, which allow the potential customer or viewer to see a more complete view of the property, and to control the movement of the photograph or the view of the property. Providing panorama photographs also gives the viewer more of a feeling or belief that he or she is actually taking a tour of the property, and turning their head or looking around the property unit, as opposed to merely looking at a still photograph.

A feature of one embodiment of this invention therefore provides a virtual property viewing or tour system, which provides one or more panorama or movable photographs. Text and/or still photographs may be combined with the movable photographs as part of the same virtual tour.

There are numerous different embodiments for which this invention may be used, such as without limitation, providing virtual tours of real property for sale or lease, virtual tours of vacation properties and virtual tours of vehicles, virtual tours of art or museums using movable photographs; to name but a few examples.

There is not currently a sufficiently versatile website which contains a virtual tour of real property, with options of having a movable photograph with a three hundred sixty degree range, a movable photograph having less than a three hundred sixty degree range, and still photographs, in the same is virtual tour. With the varying types of photographs and photographic capabilities of affiliates and potential affiliates, this type of flexibility is long overdue. It is therefore an object of this invention and a feature of one embodiment of the invention to provide a virtual tour site which is versatile enough to optionally provide a movable photograph with a three hundred sixty degree range, a movable photograph having less than a three hundred sixty degree range. It is a still further object to provide such a site which additionally provides the option for still photographs.

BRIEF DESCRIPTION OF THE DRAWINGS

Preferred embodiments of the invention are described below with reference to the following accompanying drawings:

FIG. 1 is a flowchart block diagram overview of the property viewing system in relation to the internet and client computers;

FIG. 2 is a process flow diagram of an embodiment a property viewing system as contemplated by this invention;

FIG. 3 is a block depiction of a diagram of an embodiment of a start page or home page screen display, as shown more fully in FIGS. 4A and 4B;

FIG. 4A is a partial diagram of the Home Page screen display for one embodiment of the electronic property viewing system contemplated by this invention;

FIG. 4B is a partial diagram of the lower portion of the Home Page screen display for the embodiment of the electronic property viewing system contemplated by this invention and shown in FIG. 4A;

FIG. 5 is a block depiction of a diagram of a Sign Up screen display for an embodiment of the electronic property viewing system contemplated by this invention, wherein new clients or affiliates, input personal information to create a new account, and as shown more fully in FIGS. 6A, 6B and 6C;

FIG. 6A is a partial diagram of a Sign Up screen display represented in FIG. 5;

FIG. 6B is a partial diagram of the sign up screen display represented in FIG. 5;

FIG. 6C is a partial diagram of the sign up screen display represented in FIG. 5;

FIG. 7 is a block depiction of a diagram of a Login screen display which may be used in an embodiment of this invention, wherein existing clients or affiliates input their unique information such as email address and password, and as shown more fully in FIGS. 8A and 8B;

FIG. 8A is a partial diagram of the login screen display represented in FIG. 7;

FIG. 8B is a partial diagram of the login screen display represented in FIG. 7;

FIG. 10B is a partial diagram of the modify a tour screen display represented in FIG. 9;

FIG. 11 is a block depiction of a diagram of a main tour editing screen display which may be used in an embodiment of this invention, wherein existing clients or affiliates choose in which way to input, access, or update information within their account, as more fully shown in FIGS. 10A and 10B;

FIG. 12A is a partial diagram of the main tour editing screen display represented in FIG. 11;

FIG. 12B is a partial diagram of the main tour editing screen display represented in FIG. 11;

FIG. 13 is a block depiction of a diagram of the Contact Information screen display which may be used in an embodiment of this invention, wherein the affiliate or agent may input personal, business or advertising data and photographs for their use of the system, as more fully shown in FIGS. 14A, 14B and 14C;

FIG. 14A is a partial diagram of the contact information screen display represented in FIG. 13;

FIG. 14B is a partial diagram of the contact information screen display represented in FIG. 13;

FIG. 14C is a partial diagram of the contact information screen display represented in FIG. 13;

FIG. 15 is a block depiction of a diagram of a Tour Counter, or hit counter, screen display which may be used in an embodiment of this invention, wherein the affiliate or agent may obtain information about the number of visits or hits on each of his or her property units for which virtual tours are provided, as more fully shown in FIGS. 16A and 16B;

FIG. 16A is a partial diagram of the hit counter screen display represented in FIG. 15;

FIG. 17 is a block depiction of a diagram of a Quick Edit tour display which may be used to allow the agent or affiliates to edit the most commonly changed fields in a given property tour, and from which open houses or other scheduled items may be scheduled, as more fully shown in FIGS. 18A and 18B;

FIG. 18A is a partial diagram of the Quick Edit tour screen display represented in FIG. 17;

FIG. 18B is a partial diagram of the Quick Edit tour screen display represented in FIG. 17;

FIG. 19 is a diagram of a Schedule Open House screen display which may be used to allow the affiliate to schedule an open house and thereby notify potential customers as well;

FIG. 20 is a diagram of a Schedule Open House screen display wherein an open house date has been input by the affiliate in the template containing part of the data set for the property unit;

FIG. 21 is a block depiction of a diagram of the Quick Edit tour screen display with the open house scheduled in FIG. 20 teen shown on the Quick Edit tour screen display;

FIG. 22A is a partial diagram of the edited Quick Edit tour screen display represented in FIG. 21;

FIG. 22B is a partial diagram of the edited Quick Edit tour screen display represented in FIG. 21;

FIG. 23 is a partial diagram of a Terms and Conditions of Use screen display which may be used in an embodiment of this invention, and a which would be encountered by a user selecting the Create a New Tour menu item from the screen display depicted in FIG. 18A (or others with the same menu item selection);

FIG. 24 is a block depiction of a diagram of a checklist for the creation of a new tour which the affiliate reviews before proceeding to create a new property virtual tour, as more fully shown in FIGS. 25A, 25B and 25C;

FIG. 25A is a partial diagram of the checklist for the creation of a new tour represented in FIG. 24;

FIG. 25B is a partial diagram of the checklist for the creation of a new tour represented in FIG. 24;

FIG. 25C is a partial diagram of the checklist for the creation of a new tour represented in FIG. 24;

FIG. 26 is a diagram of a Creating a New Tour" screen display which may be used in an embodiment of this invention, wherein the affiliate inputs basic information to initiate the creation of a new virtual tour within the contemplation of this invention, and after accepting the Terms and Conditions of Use as more fully set forth in FIG. 23;

FIG. 27 is a block depiction of a diagram of the main tour information editing screen display which may be used in an embodiment of this invention, and which would be encountered by a user desiring to create a new virtual tour or by a user desiring to edit an existing virtual tour, as more fully shown in FIGS. 28A, 28B and 28C;

FIG. 28A is a partial diagram of the main tour information editing screen display represented in FIG. 27;

FIG. 28B is a partial diagram of the main tour information editing screen display represented in FIG. 27;

FIG. 28C is a partial diagram of the main tour information editing screen display represented in FIG. 27;

FIG. 29 is a block depiction of a diagram of the main tour information editing screen display, showing the partial input of property information and further showing the drop-down menu selections for "Property Type", which may be used in an embodiment of this invention, as more fully shown in FIGS. 30A, 30B, and 30C;

FIG. 30A is a partial diagram of the main tour information editing screen display represented in FIG. 29;

FIG. 30B is a partial diagram of the main tour information editing screen display represented in FIG. 29;

FIG. 30C is a partial diagram of the main tour information editing screen display represented in FIG. 29;

FIG. 31 is a block depiction of a diagram of the main tour information editing screen display, showing the partial input of property information and further showing the drop-down menu selections for Property Subtitle, which may be used in an embodiment of this invention, as more fully shown in FIGS. 32A, 32B, and 32C;

FIG. 32A is a partial diagram of the main tour information editing screen display represented in FIG. 31;

FIG. 32B is a partial diagram of the main tour information editing screen display represented in FIG. 31;

FIG. 35 is a block depiction of a diagram of a photograph edit page accessed from the main tour information editing screen by clicking on the picture tab, in an embodiment of this invention, and is more fully shown in FIGS. 36A, 36B, 36C, 36D and 36E;

FIG. 36B is a partial diagram of the photograph edit page represented in FIG. 35;

FIG. 36C is a partial diagram of the photograph edit page represented in FIG. 35;

FIG. 36D is a partial diagram of the photograph edit page represented in FIG. 35;

FIG. 40 is a block depiction of the main tour information editing screen display as reflected in FIG. 27, wherein the drop-down menu for number of photographs has been selected, as more fully shown in FIGS. 41A and 41B;

FIG. 41A is a partial diagram of the main tour information editing screen display represented in FIG. 40;

FIG. 41B is a partial diagram of the main tour information editing screen display represented in FIG. 40;

FIG. 42 is a block depiction of a brochure information editing screen display which provides the affiliate with three different brochure options which may be selected, as well as data boxes for the entry of data for inclusion in the data set for the brochure or brochures chosen, as more fully shown in FIGS. 43A and 43B;

FIG. 43A is a partial diagram of the brochure edit screen display represented in FIG. 42;

FIG. 43B is a partial diagram of the brochure edit screen display represented in FIG. 42;

FIG. 44 is a block depiction of a screen display containing a first brochure created as the virtual tour was created, as more fully shown in FIGS. 45A and 45B;

FIG. 45B is a partial diagram of the first brochure screen display represented in FIG. 44;

FIG. 46 is a block depiction of a screen display containing a second brochure, as more fully shown in FIGS. 47A and 47B;

FIG. 47A is a partial diagram of the second brochure screen display represented in FIG. 46;

FIG. 47B is a partial diagram of the second brochure screen display represented in FIG. 46;

FIG. 48 is a block depiction of a screen display containing a third brochure option, as more fully shown in FIGS. 49A and 49B;

FIG. 49A is a partial diagram of the third brochure screen display represented in FIG. 48;

FIG. 51B is a partial diagram of the purchase screen display represented in FIG. 50;

FIG. 52 illustrates an embodiment of a Tour Invoice screen display which may be printed by the affiliate, and which provides basic information regarding the tour, as more fully shown in FIGS. 53A, 53B and 53C;

FIG. 53A is a partial diagram of the Tour Invoice screen display represented in FIG. 52;

FIG. 53B is a partial diagram of the Tour Invoice screen display represented in FIG. 52;

FIG. 53C is a partial diagram of the Tour Invoice screen display represented in FIG. 52;

FIG. 54 is a figurative illustration of one way to provide a movable photograph as part of a virtual tour contemplated by an embodiment of this invention;

FIG. 55 is a representation of a panoramic photograph which has been stitched or spliced, and which shows the relative area of the viewing window to the entire panoramic photograph;

FIG. 56 is a diagram showing how locating the computer mouse pointer causes the movable photograph to move;

FIG. 57 is an embodiment of a screen display which would preferably be used as a first page in a virtual tour, within the contemplation of this invention;

FIG. 58 is an embodiment of a screen display which may be used as a page or display in a virtual tour, within the contemplation of this invention;

FIG. 59 is an embodiment of a screen display which may be used as a page in a virtual tour, within the contemplation of this invention, figuratively illustrating a movable photograph;

FIG. 60 is an embodiment of a screen display which may be used as a page in a virtual tour within the contemplation of this invention;

FIG. 61 is a block diagram illustrating the exchange of time units in consideration for a virtual tour posting on a website;

DETAILED DESCRIPTION OF THE PREFERRED EMBODIMENTS

Figures 9, 10A:
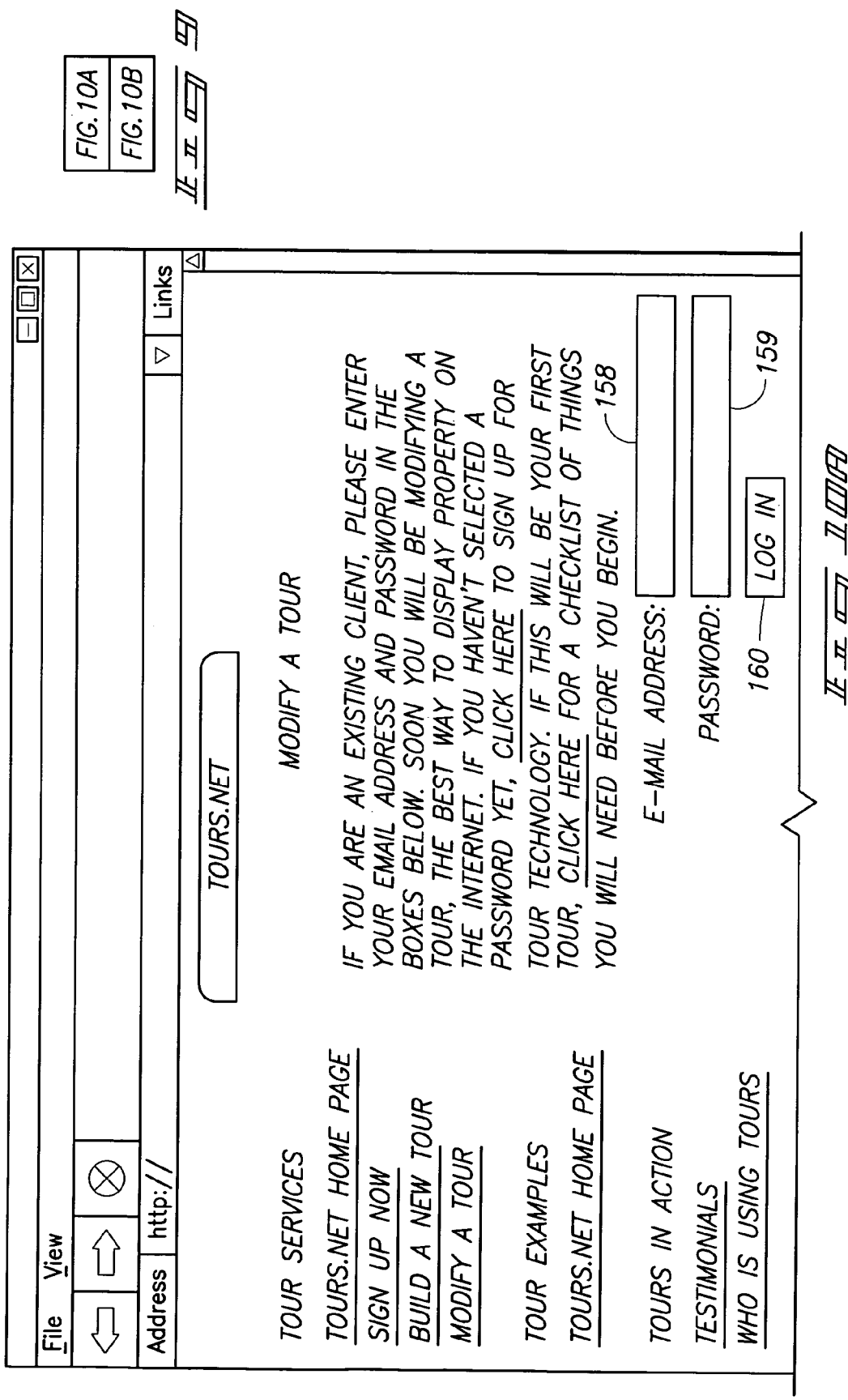
FIG. 9 is a block depiction of a diagram of a Modify a Tour screen display which may be used in an embodiment of this invention, wherein existing affiliates input their unique information such as email address and password, and as shown more fully in FIGS. 10A and 10B.
FIG. 10A is a partial diagram of the Modify a Tour screen display represented in FIG. 9.

Reference will now be made to a preferred embodiment of the Applicants' invention. One exemplary implementation is described below and depicted with reference to the drawings comprising an electronic property virtual tour system for use on a public network such as the internet. While the invention is described via a preferred embodiment, it is understood that the description is not intended to limit the invention to this embodiment, but is intended to cover equivalents and modifications such as are included within the scope of the appended claims.

Further, due to the nature of the level of skill in the art, there may be various menu items, explanatory text, buttons, menus, routines, subroutines, source code, display configurations which are known or may readily be duplicated by known programming means by one skilled in the art, and they will not therefore be described in significant detail.

The term photograph as used herein is used in a broader sense than its normal definition, to include without limitation, traditional photographs, photographic images, digital photographs, electronic depictions of photographs, video taped segments, digitized photographs, digital and manipulated photographs, and any other image which is derived from, or based on, a photograph.

The term "movable photograph" as used herein means a photograph, as defined above, and which is caused to move or appear to move within the viewer window, to allow more of the photograph to be seen than is shown in the viewer window. In this case if a given photograph is larger than the viewer photograph window, it may be designated as such when being input, and it is the selection during input that determines whether the embodiment of this invention, creates a movable photograph or picture, versus a still photograph.

The term panorama or panoramic as used herein in connection with photographs, in addition to its traditional definitions, is used herein for photographs which are larger than the viewer photograph window (either vertically or horizontally), which is typically measured in pixels.

The term "affiliate" as used herein is intended to broadly apply to any person or entity authorized to create or modify virtual tours of property units, examples of which for various embodiments of this invention, including without limitation: real estate agents listing real property and rental/lease property; resorts; property managers; sellers of vehicles; hotel owners; travel agents; travel promoters; chambers of commerce; visitors bureaus; and others.

The term "property" or "property unit" as used herein is intended to cover not only what is traditionally considered real property, but also, without limitation, time share interests, condominium interests, motel rooms, hotel rooms, resorts, golf courses, and bed and breakfast facilities, to name but a few. The term property unit also includes all types and kinds of personal property such as, without limitation, automobiles, trucks, recreational vehicles, airplanes, artwork, to name just a few.

The term "template" as used herein in relation to the format of a virtual tour of a given screen display is used in a broad sense to include a form, framework, report form, format or other electronic or screen display structure for the input, editing or presentation of a virtual tour.

While the preferred embodiment is described and used in connection with the internet and the world wide web, the term communications network or public communications network as used herein is meant in its broadest sense to include these and all other current and future communication is networks, including public packet switched communications networks, and the current or future internet.

FIG. 1 illustrates a preferred embodiment of Applicants' invention wherein a basic system configuration is provided for an electronic property virtual tour system for use on a public communications network, which is identified as reference numeral 100. An online network 102 is provided in one form as the internet 104, and more particularly as the World Wide Web (WWW). Network 102 is part of a network environment, or networked computer system 108. Networked computer system 108 includes a web server computer 110, one or more client or host computers 112, and an online network 102. Client computers 112 would typically have a web browser 114 and may also include a web document 116.

It will be appreciated by those skilled in the art that the web server 110 illustrated may be one or more such servers connected by known means local or remote from one another.

There will further be one or more affiliate computers 117, which would be connected to the internet 104 and through which the affiliate may create or edit virtual tours.

In an embodiment of this invention, the affiliate may have his or her own website which is accessed over the internet by clients or prospective clients of affiliate (or potential purchasers/lessees of the property units). FIG. 1 illustrates an affiliate server computer 800, affiliate web server 801, affiliate website 802, affiliate webpage 803 and affiliate property unit listings 804, all of which are connected to the public communications network, which in this embodiment is the internet.

A feature of one embodiment of this property viewing system to affiliates is that customers who visit the affiliate's web site 802 will be returned to that web site after viewing the virtual tour selected from the affiliates site. For instance, a potential client of the affiliates may be viewing a list of property units on the affiliates's web site 802 and click on a particular property unit to see a virtual tour. This will link the client to web site 122 where the one or more memory areas store the virtual tour. The one or more memory areas may also be located on linked or electronically connected computers, sites or memory areas, and they need not be physically near one another.

Once done with the virtual tour, the client may select or click on the Back to Your List button 851 or link (shown on the sample tour illustrated in FIG. 57, and others), and be returned to the affiliates web site without the need to repetitiously hit the back button of the client's internet browser.

More particularly, Web server computer 110 is a hardware component that serves codes and data to the WWW. Web server computer 110 includes a web server 118 comprising a software program that receives, manages, and responds to client requests for web documents and files. Web server 118 includes a central electronic property viewing system 120 in which a virtual property tour may be viewed by client computers 112. The virtual tour is carried out pursuant to the electronic property viewing system 100.

Website 120 includes web page 122 and virtual property tour memory area 124. Web page 122 comprises a unit of information in a form of a data unit, that may include text and/or graphics. The unit of data or data unit is presented on a screen out of client computer 112 to a user, such as to an individual searching for property or desiring to virtually tour real or personal property.

Individual web pages are active and may include buttons, icons and/or links, which are all well known in the art and which will be referred to herein as triggers. Triggers enable the launching of application software programs and/or access or links to other pages. Virtual property tour memory area 124 comprises the collective memory area allocated for part or all of property unit data sets, on the web server computer 110.

The term memory areas as used herein is intended to cover any area with temporary or permanent memory capabilities, including any memory storage mediums, such as a computer hard drives, disks, data storage devices, and others as set forth below.

For purposes of this disclosure, it is understood that memory generally refers to a data storage device resident within or associated with a computer, such as a random access memory (RAM). As utilized herein, memory is intended to refer to any form of storage medium associated with a computer, such as a data storage device, and including hard disk drives (HDDs), semiconductor memories and addressable storage spaces present within a processing unit or other internal storage devices that are used to execute instructions and/or store data and addresses, or any other form of memory as presently understood within the art, or which may later be developed. Furthermore, it is understood that memory can be physically subdivided into units such as a first memory area, a second memory area, and a third memory area. Such units are not necessarily physically associated, but can be associated via the ability to address and/or locate such memory areas.

As shown in FIG. 1, it is understood that client computer 112 is a general-purpose machine that processes data via a set of instructions that is stored in a data storage device, such as memory or a memory area. The computer server components comprise hardware on which one or more software programs are implemented.

The typical hardware includes a processor or microprocessor; a hard disk drive; screen displays; input devices such as a keyboard and/or a mouse; and other associate components which are well understood and known in the art.

Additionally, Web server computer 110 includes hardware such as one or more processors, or microprocessor; one or more data storage devices, such as a hard disk drive ("HDD"); memory, such as random access memory ("RAM"); and an interface device, such as a display, a keyboard and/or a mouse.

According to one implementation of Applicants' invention, web server computer 110 comprises two servers which are identical in hardware, each machine having 300 MHz Intel Pentium II processors, 256 MB of 100 MHzRAM, and a 13 GB IDE hard drive. Both machines are running Windows NT4.0 (with the service pack 5 update). One server is the data warehouse server (includes memory area), and it has Microsoft SQL 6.5 installed thereon. The second server is the web server (includes memory area), which is running Microsoft Internet Information Server (IIS) 4.0, and a host of third party add-ons (server objects), including: SA-Fileup, v2.0.3.8 by Software Artisians, AspMail, v3.0.2 by ServerObjects.com, AspImage, v1.9 by ServerObjects.com, AspHTTP, v3.0.2 by ServerObjects.com, AspInet, v2.0 by ServerObjects.com, ImgSize, v1.1.1 by ServerObjects.com and Counter, and v5.2 by Henn Saar.

A variety of programming languages are used in this system. For server-side processing, Microsoft's Active Server Pages (ASP) is used, and is included in the Microsoft Internet Information Server. For client side technologies, HTML, DHTML, Java (applets) and JavaScript are utilized. It will be appreciated by those skilled in the art that the foregoing is to disclose the preferred embodiment, and that there would be numerous alternatives and combinations of alternatives available.

FIG. 2 is a process flow diagram of one embodiment of a property viewing system as contemplated by this invention, and which is an embodiment for application over the internet. Step P1 is a representative home page for which an exemplary home page for an internet embodiment is shown more fully in FIGS. 3, 4A and 4B. Step P2 is a Log-in screen display for authorized users or affiliates to enter personal data to gain access to the input, or editing portion of the viewing system. FIGS. 7, 8A and 8B illustrate an internet embodiment of step P2.

Step P3 is a Sign-Up screen display for persons who are not yet authorized to access, create and/or edit the viewing system. FIGS. 5, 6A, 6B and 6C show a representative internet embodiment screen display representing step P3.

An affiliate or a potential affiliate would typically access the home page of the virtual tour service provider. In order for the affiliate to proceed to access, create or edit virtual tours, he or she would choose step P2 or step P3 to either log in if he or she is already an authorized user, choose step P3 to sign up and thereby become authorized to enter step P4.

Step P4 is the main tours editing screen display, and an internet embodiment of step P4 is illustrated in FIGS. 9, 10A and 10B.

Figure 16B:
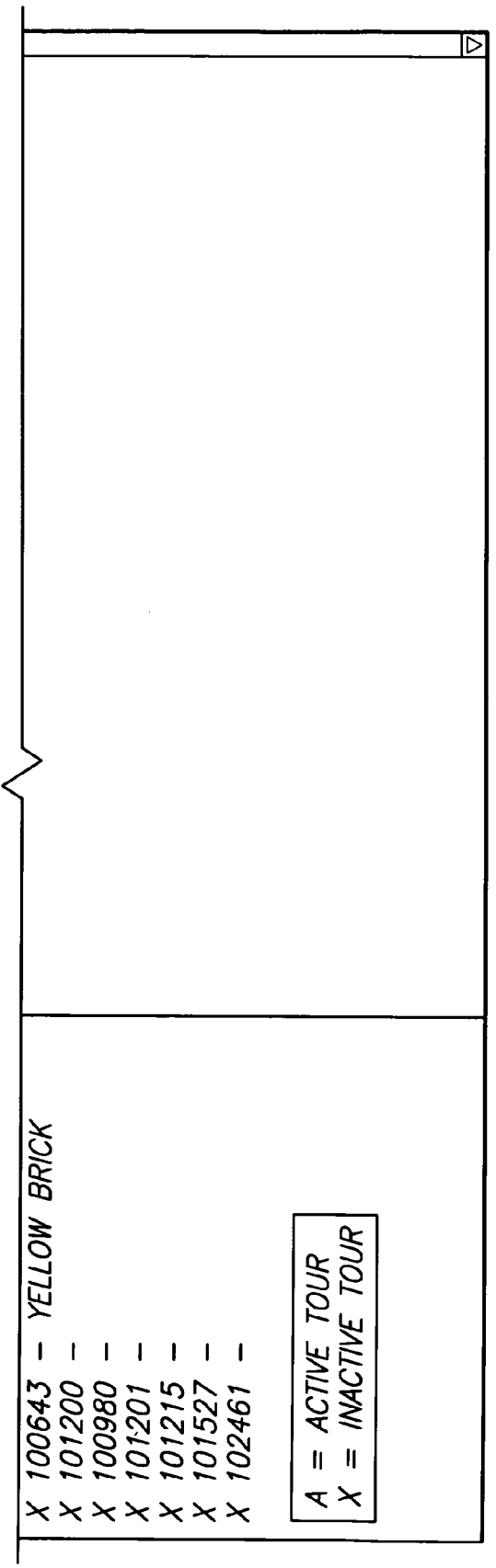
FIG. 16B is a partial diagram of the hit counter screen display represented in FIG. 15.

From step P4, the affiliate may review a Tour Hit Counter screen display, represented by step P5, and an internet embodiment of which is more fully illustrated in FIGS. 15, 16A and 16B, which allows the affiliate to ascertain the number of times each of the listed virtual tours has been accessed.

Also from the main tour editing screen display, the affiliate may enter affiliate contact information via step P6. An internet embodiment of step P6 is more fully illustrated in FIGS. 13, 14A, 14B and 14C.

As can be seen at step P6, the Contact Information screen display, at this point an affiliate may choose to upload company logo 1 (step P7), upload company logo 2 (step P8), or provide the data which will comprise the contact information within step P6. The contact information data may include a photograph of the affiliate or affiliates, as represented by step P9.

As will be seen below from the feature of this invention which creates electronic property unit brochures, the company logo which may be entered in step P7 or step P8 may be chosen based upon the desired result in the various styles of brochures, which may be created concurrently with the virtual tour. At step P9, the affiliate may upload photographs which would then appear in the virtual tour and on brochures created concurrently with the virtual tour.

From the main tour editing screen display, step P4, the affiliate may choose to perform quick editing of an existing virtual tour that he or she already has on the site, and representative step P10 provides a Quick Edit Tour screen display, and an internet embodiment of this invention as illustrated in FIGS. 17, 18A and 18B. The quick edit feature allows the affiliate to manipulate the most commonly changed fields in a listing and also to schedule various items, such as an open house for instance, if it is a real property sale virtual tour. In the event an affiliate wishes to schedule an open house in that embodiment, he or she proceeds to step P11, which represents a Schedule Open House screen display, as more fully illustrated in FIG. 19.

FIG. 20 illustrates a part of the template for the entry of open house data within step P11, and as shown more fully in FIGS. 21, 22A and 22B. The resulting screen display illustrates the edit or change to the Quick Edit tour screen display after step P11 is followed and an open house is scheduled.

If the affiliate desires to proceed to Step P12, which is a tour information editing screen display to create a new tour, he or she would proceed to such step but would be interrupted by a pop-up window which would contain the Terms and Conditions of Use for the property viewing system, which is represented by step P13. The Terms and Conditions of use must be accepted before the viewing system will allow the affiliate to proceed to build or create a new tour. Step P13 is more fully illustrated in FIG. 23.

An affiliate desiring to create a new virtual tour should have the requisite information or data ready for input before proceeding to create a tour, and this system provides the affiliate a checklist of the requisite data required for input. The checklist may be provided at multiple locations, such as just after the affiliate has accepted the Terms and Conditions of Use (step P13). If the checklist is provided at that point, it would be step P14. An internet embodiment screen display for step P14 is illustrated in FIGS. 24, 25A, 25B and 25C. It is at this step that the affiliate is reminded of the information which needs to be input to create a virtual tour, as well as the decisions that must be made once he or she proceeds to step P14. This checklist may alternatively be provided at step P2 or P3, as shown in FIG. 8B by selecting the "click here for a list of things you will need to build a new tour" button or selection.

FIG. 2 further illustrates step P12 being a tour information editing screen display, an internet embodiment of which is more fully shown in FIGS. 27, 28A, 28B and 28C. This is the main tour creation and editing screen for creating and editing virtual tours of property units.

FIG. 2 further illustrates step P23, which is a main pictures and text editing screen which is encountered when selecting or clicking on the pictures tab to create or edit existing pictures for a virtual tour. An internet embodiment of step P23 is more fully reflected in FIGS. 35 and 36A through 36E.

Figure 38B:
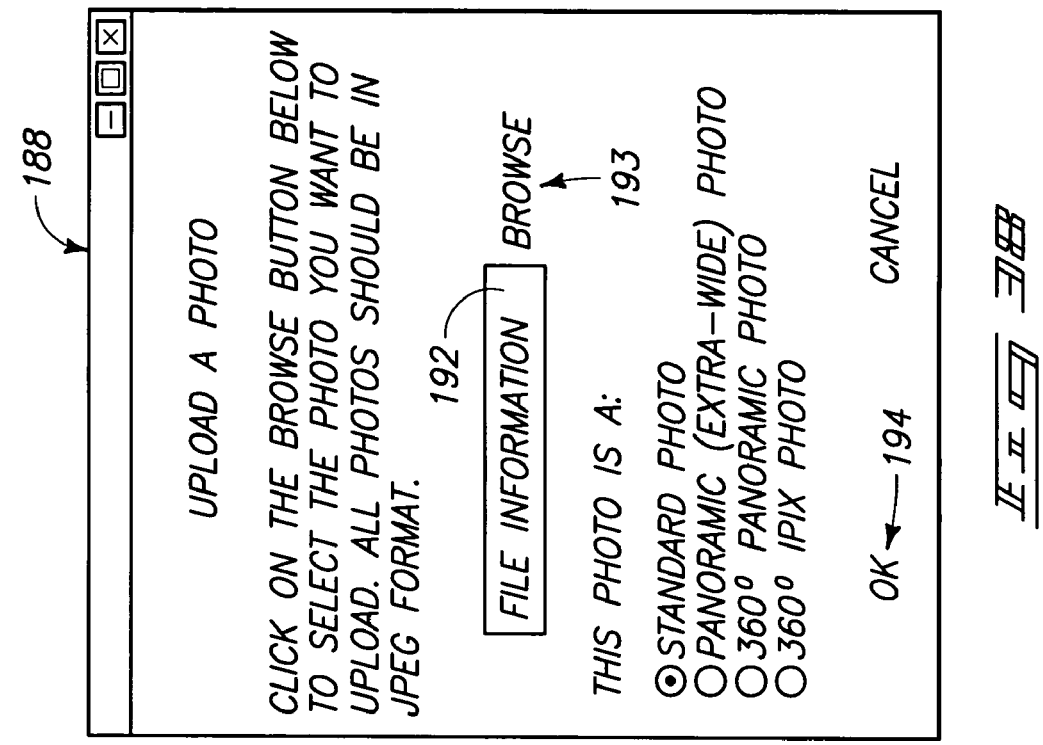
FIG. 38 is an Upload Photo screen display which is encountered when selecting or clicking on the Upload Photo box just below where the photograph window will appear.

From step P23, the affiliate may choose step P22 which is the Upload Photo screen display, as shown more fully in FIG. 38.

Step P16 is a step which involves a pop-up window which appears when the affiliate selects the photo name by clicking on it. The pop-up window provides a list of pre-selected photograph names to choose from in labeling the uploaded photograph, and is more fully illustrated in FIG. 37 and explained below.

Step P17 illustrates the brochure information editing screen display step which is more fully shown in FIGS. 42, 43A and 43B. The brochure information editing screen display then provides three different brochure selections or options, as is more fully shown in FIG. 43A. The brochures are more fully illustrated in FIGS. 44, 45A, 45B, 46, 47A, 47B, 48, 49A, and 49B.

Figures 50, 51A:
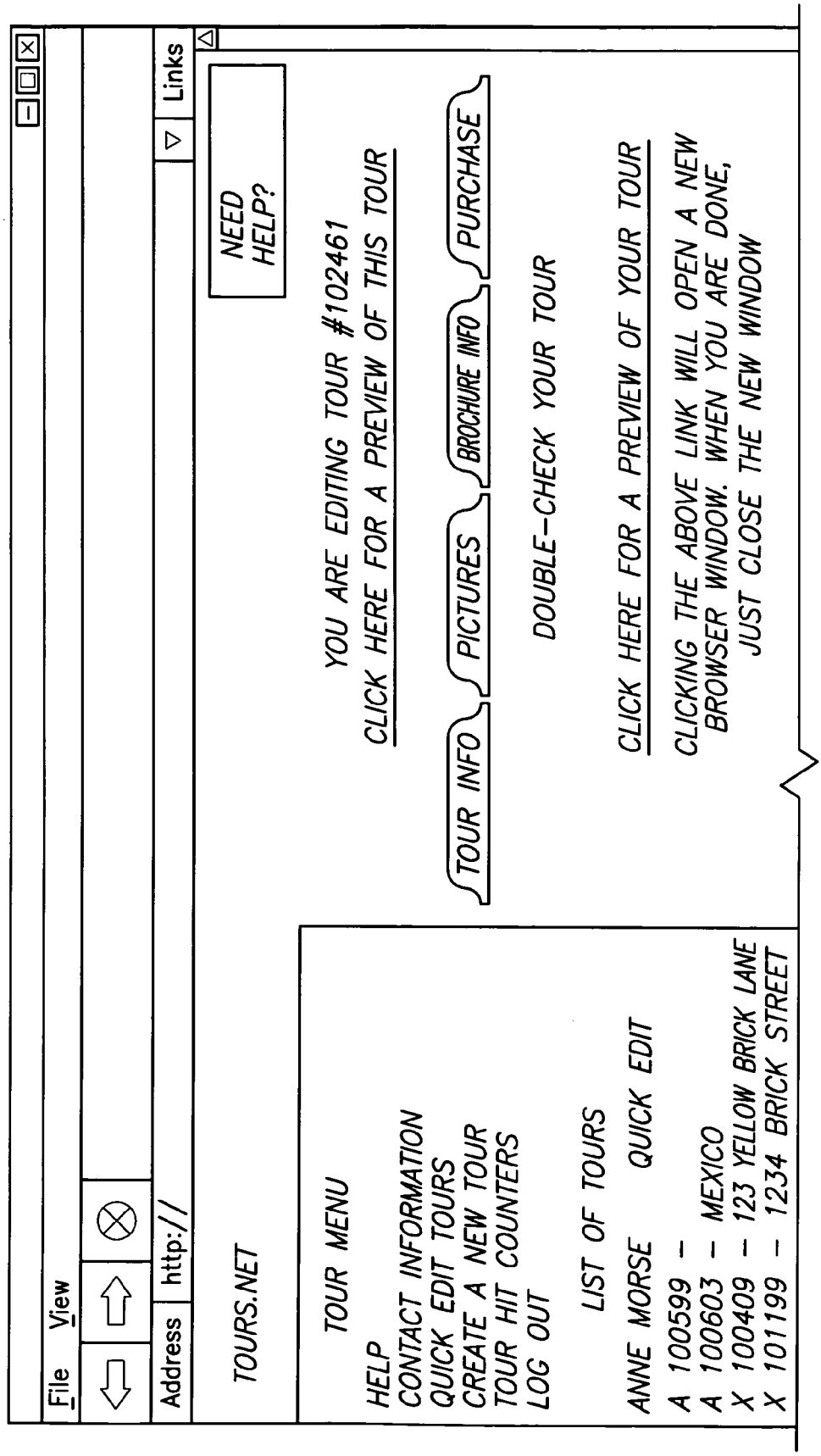
FIG. 50 is a block depiction of a diagram of the purchase screen display wherein the affiliate initiates the purchase of the virtual tour, selects advertising and methods of providing data or photographs, as more fully shown in FIGS. 51A and 51B.
FIG. 51A is a partial diagram of the purchase screen display represented in FIG. 50.

Once the virtual tour has been created, there is a Purchase Tour screen display, represented by step P18, which is more fully reflected in FIGS. 50, 51a and 51b. The affiliate may then proceed to step P19 to print the invoice, or to step P20 to engage in an online transaction, e-commerce, or to step P21 to request the server to bill the affiliate.

FIG. 3 is a block depiction of an embodiment of a starting page or Home Page screen display for an internet application of this invention, which is shown more fully in FIGS. 4A and 4B.

FIG. 4A illustrates a common browser page or outline with the Home Page for a virtual tour site therein. From the Home Page screen display illustrated in FIGS. 4A and 4B, there are numerous common or known menu selection or options for customer and affiliates. The Home Page screen display provides several buttons which may be selected or clicked on by the mouse pointer to move to other memory areas or pages of the website.

Sign-Up Now button 140 retrieves the Sign-Up Now screen display, as more fully illustrated in FIGS. 5, 6A, 6B and 6C, and described below, which allows a new potential affiliate to sign up and become authorized to modify or build virtual tours. The Build a New Tour button 141 and the Modify a Tour button 142 retrieve the Log-In screen display reflected and more fully explained with respect to FIGS. 7, 8A, 8B, 9, 10A and 10B. The Click Here to See a Tour button 143 retrieves a sample virtual tour of a property unit, in this example a house offered for sale, which is then available for the user to virtually tour or preview.

The Click Here to See a Tour button 143 or link in FIG. 4A, when selected or clicked on, presents a pop-up window which gives a preview or sample virtual tour of the property unit, in this embodiment a real property unit. The Tour Examples button 145 retrieves the same sample or preview virtual tour as the Click Here to See a Tour button 143. The Click Here to Build a Tour button 144 or link, takes the affiliate to the Terms and Conditions of Use screen which is described more fully elsewhere herein.

FIGS. 4A and 4B also present self-explanatory information to affiliates and potential affiliates, such as testimonials, lists of persons who are using the virtual tour in their business, frequently asked questions, and other self-explanatory and sales, customer service related features.

FIG. 5 is a block depiction of a Sign-Up screen display wherein new affiliates or clients input their personal information and are required to review and accept the Terms and Conditions of Use in order to gain access to the property viewing system, and in order to be able to create and edit virtual tours of property units. FIGS. 6A, 6B and 6C illustrate this "Sign Up Now" screen display. Once the personal information 150 is entered and the prospective affiliate selects or clicks on the I Agree to These Terms button 151, the affiliate is then able to proceed to build or modify virtual tours.

If the affiliate chooses the Build a New Tour button 141, the Build a Tour login screen display depicted in FIGS. 8A and 8B are retrieved. The affiliate then enters his or her e-mail address in box 155 and his or her password in box 156, thereafter clicking login button 157 to gain access to the main tour editing screen.

If the affiliate chooses the Modify a Tour button 142 in FIG. 4A, he or she will be presented with a screen display reflected in FIGS. 10A and 10B, which allow him or her to modify an existing tour. The affiliate will then be required to enter his or her e-mail address in box 158, password in box 159 (FIG. 10A), and then select or click on the log-in button 160 to gain access to the main tour editing screen. If the affiliate selects or clicks on "Quick Edit" button 166, he or she will be directed to step P10 and FIG. 17, as described more fully below.

It will be appreciated from viewing the screen displays reflected in FIGS. 8A and 8B and FIGS. 10A and 10B, that from this display the affiliate can choose other selections on the left-most column to enter other parts of the website or other web pages, all of which are known in the art.

Once the e-mail address and password are properly entered and accepted, the affiliate is logged in, he or she may be presented with a getting started aid as depicted in FIG. 11 and illustrated in FIGS. 12A and 12B. The e-mail and password information results in the "retrieval of a list of tours" button 160 as reflected in FIG. 12A. From the list of tours provides certain information regarding the existing virtual tours that affiliate currently has on the website, in the database or on the system.

From the column on the left of the screen display reflected in FIGS. 12A and 12B, the affiliate is presented with a tour menu 161 which provides certain linking buttons to click on to allow better navigation or maneuvering through the site or to particular virtual tours that the affiliate already has created. Tour menu 161 provides help button 170, contact information button 169, quick edit tours button 162, create a new tour button 163, tour hit counters button 164, and logout button 165.

The left-hand column also provides a list of tours section which provides the affiliate's name and a listing of tours the affiliate already has in the viewing system. For example, inactive tour number 100409 in FIG. 12A is for a real property unit with an address of 123 Yellowbrick Lane. Selecting or clicking on the listing 167 will allow the affiliate to edit and perform other tasks relative to that particular virtual tour.

FIGS. 12A and 12B also provide a right-hand column with other helpful information to the affiliate, and this can be changed as desired, and is generally known in the art. Selecting or clicking the Contact Information button 169 allows the affiliate to change contact information and photographs regarding the affiliate, his or her company, and other pertinent information which appears with virtual tours and on brochures. Selecting Contact Information button 169 takes the affiliate to the screen display reflected in FIGS. 13, 14A, 14B and 14C, which will be discussed more fully below.

If the affiliate selects the Quick Edit Tours button 162, he or she will be taken to the quick edit tours screen display more fully reflected in FIGS. 17, 18A and 18B, which will be more fully discussed below. If the affiliate selects or clicks on the Create a New Tour button 163, the affiliate will be returned to the main tours editing screen display, assigned a tour number and provided the template boxes to input data to compose a data set, and to upload photographs if desired.

If the affiliate selects the Tour Hit Counters button 164, the Tour Hit Counters screen display will be retrieved, as shown more fully in FIGS. 15, 16A and 16B, which will be more fully discussed below. Needless to say, if the affiliate selects or clicks on the logout button 165, he or she will be logged out of the system.

FIG. 13 is a block depiction of a diagram of the Contact Information screen display which may be used in an internet embodiment of this invention, wherein the affiliate may input or edit personal, business or advertising data and photographs about the affiliate, such as shown in FIGS. 14A, 14B and 14C.

The Contact Information screen display further allows the affiliate to upload company logo information and photographs. For instance, in FIG. 14C the affiliate may upload his or her company logo into logo box 180 by selecting or clicking the upload button 181. The affiliate may similarly upload a second company logo into the logo box 182 by selecting or clicking on upload button 183.

The affiliate may also upload his or her personal photograph into contact photo box 184 by selecting or clicking upload button 185. Once the affiliate has completed his or her entries into the Contact Information page, the "post changes" button 186 may be selected or clicked to update the database and/or memory area where the information, logos and photographs are stored. Clicking on upload button 181, upload button 183 or upload button 185 will retrieve and upload a standard windows screen display, an example of which is shown in FIG. 38, and which is discussed more fully below.

If the affiliate selects "tour hit counters" button 164 shown in FIG. 12A, it will retrieve a Tour Counters screen display for that affiliate, which provides a list of tours stored in the viewing system and informs the affiliate of the number of hits or visits to that tour per day, as well as the total number of hits, as more fully reflected in FIGS. 16A and 16B. The hits column 190 and the hits per day column 191 are shown as of the applicable start dates for each of the respective tours of the affiliate shown in FIG. 16A.

If the affiliate selects the Quick Edit Tours button 162 in FIG. 12A, the Quick Edit Tours screen display as reflected in FIGS. 17, 18A and 18B, will be retrieved. The quick edit tours screen display allows the affiliate to manipulate the most commonly changed fields in a virtual tour, such as the price and the active versus inactive status of the virtual tour.

The Quick Edit Tours screen display also provides an open house column 193 to indicate information regarding an open house on the property unit itself. For instance, as shown in FIG. 18A, virtual tour number 100409 has a schedule button 194 which allows the affiliate to select or click on the schedule button 194 to schedule an open house for that property unit. If the affiliate selects schedule button 194, the schedule open house screen display reflected in FIG. 19 will be retrieved.

The Schedule Open House screen display illustrated in FIG. 19 provides information boxes to input data regarding an open house and provides information box 194 for the last date the open house (the date the system clears the open house scheduled date in FIG. 20), information box 195 for the date of an upcoming open house, information box 196 for the name of the host or hostess who will be at the open house. Once the date is entered in the respective information boxes, the affiliate may select the "OK" button 197 to approved the entry of the data into the Quick Edit Tours screen display if any new data has been entered, and to then return to the Quick Edit Tours screen display.

FIG. 20 reflects that an affiliate has entered a date of Apr. 10, 1999 (item 177) into information box 195 to schedule an open house, and FIGS. 21, 22A and 22B reflect the now scheduled open house in open house column 193, of Apr. 10, 1999 (item 177).

The information reflected in FIG. 22A for tour number 100409, for an address of 1244 Yellowbrick Lane, reflects the information for one property unit, in this case a real property unit which is a house located on Yellowbrick Lane. FIG. 22A further reflects a status column 200 which informs the affiliate of the status of the virtual tour on the viewing system, such as whether the subscription has been paid, and if so the date through which it has been paid, or whether it is expired.

From the main tours editing screen display, if the affiliate selects the "create a new tour" button 163, the Terms and Conditions of Use screen display reflected in FIG. 23 will be retrieved. Before the affiliate will be allowed to create a new virtual tour, the terms and conditions of use must be accepted by selecting "accept" button 201. The affiliate may choose not to proceed to create a virtual tour or choose not to agree to the terms and conditions of use by selecting or clicking on "cancel" button 202.

FIGS. 24, 25A, 25B and 25C reflect a checklist for tours screen display which informs the affiliate of the information and data that will be required in order to create or build a new virtual tour. The checklist for tours screen display may be retrieved after the affiliate has accepted the terms and conditions of use by selecting the accept button.

After the affiliate has accepted the terms and conditions of use, a pop-up window is presented for creating a new tour and requires that the affiliate enter or select certain basic information about the tour to be built or created. FIG. 26 reflects the creating a new tour screen display, which is step P14 in FIG. 2.

In FIG. 26, the affiliate selects the type of tour, whether it be residential, commercial or other, by selecting the name from the drop-down menu 210. The affiliate also selects the number of photos to be presented as part of the virtual tour through drop-down menu 211, and indicates whether the photographs will be supplied by uploading them or by mailing them. By selecting the appropriate upload or mail indicator, the affiliate identifies the method for building the virtual tour with photographs. Once the creating a new tour information has been input or selected, the affiliate may select the "OK" button 212 to proceed to the tour information editing screen, shown more fully in FIGS. 27, 28A, 28B, and 28C.

In the preferred embodiment of this invention the tour data or text information is stored in a database or a memory area, and the photographs are stored in a memory area.

The tour information editing screen display is reflected in FIGS. 27, 28A, 28B and 28C. It is from this tour information editing screen display that most of the editing and creation of a virtual tour are accomplished, and FIGS. 28A through 28C reflect a sample template for a data set to be entered into, relating to a particular property unit. A data set may be a variety of information chosen for the specific embodiment or application of the embodiment, all within the contemplation of this invention.

In FIGS. 28A through 28C, tour information tab 220 has been selected and provides the template for a basic data set about the property unit, which in this case is a real property unit for sale. It will be appreciated by those in the industry that there are numerous different items which may be added or removed from the data set about the property, all within the contemplation of this invention, with the preferred information being shown in FIGS. 28A through 28C. The template may allow information to be input in certain of the information boxes, while in others allow it to be selected from a pre-selected list in a pull-down menu format.

In FIGS. 28A through 28C, it reflects the tour information in a field column and in a data column, the field and data being related to a database where the information is stored. The various fields shown in FIG. 28A relate to tour identification number and the tour identification information box 230. The affiliate or agent identification number is input into information box 231 and the price field has information box 232 receives price data.

The property type may be selected from pull-down menu 233 which is shown pulled down in FIGS. 30A and 30B, giving a plurality of property types to select from to input the data into the template. Examples of property types which may be selected are residential, commercial, travel, rent, education, golf, entertainment, automobile, senior, industrial or dealership. It will be appreciated that this list is no way by limitation, as there are many other property types that may be used for real property and for other types of property, all within the contemplation of the viewing system provided by this invention.

FIG. 28A further shows a field entitled "property sub-type" wherein data may likewise be selected to input a data set about the property unit reflected as tour number 102461. FIGS. 32A and 32B reflect a possible pull-down menu to be used for the property sub-type data field box 234 and lists such selections as residential, residential with acreage, lots and land, waterfront, and others.

FIG. 28A further illustrates a tour title information box 235 where the affiliate may enter a title of the virtual tour being created. Information box 236 in FIG. 28B allows the affiliate to input address information about the property unit and information boxes 237, 238 and 239 allow the input of the zip code, city, state and region (box 240) of the particular property unit in question. In the preferred embodiment, the affiliate inputs the zip code and the city, state and region are automatically inputted by the system, thereby removable the need for the affiliate to enter the data manually. Information box information box 241 (FIG. 28B) allows the input of information regarding the area of town in which the property unit is located.

Information in the number of bedrooms field may be selected by clicking on the pull-down menu 242 and then selecting the applicable number of bedrooms. In similar manner, data may be input into the number of baths field by clicking on the pull-down menu 243 and then selecting the appropriate number.

FIG. 28B further illustrates other fields which may be used and corresponding information boxes or pull-down menus to build the virtual tour and receive the data to comprise a data set about the property unit. Fields such as multiple listing service ("MLS") number, style of the property unit, year the property unit was built, mortgage calculator link and list date are also shown in FIG. 28B.

FIG. 28C shows additional database fields into which data can be entered into the template, including a map link which provides a map of the area and a location of the property unit on the map, a school link which provides information about the applicable schools for the property unit, and a database field for the selection of web sites used to showcase the virtual tour. "Post changes" button 244 may be selected or clicked on to then enter the changes, additions or edits made to the template as reflected in FIGS. 28A, 28B and 28C. The virtual tour template creates a framework for the entry of data and photographs.

FIG. 29 is a block depiction of a diagram of the main tour information editing screen display showing the pull-down menu for the selection of property type information and is more fully shown in FIGS. 30A, 30B and 30C. FIGS. 30A and 30B are intended to show the pull-down menu selections which are used for entry to comprise the data set for the property unit in question.

Figure 32C:
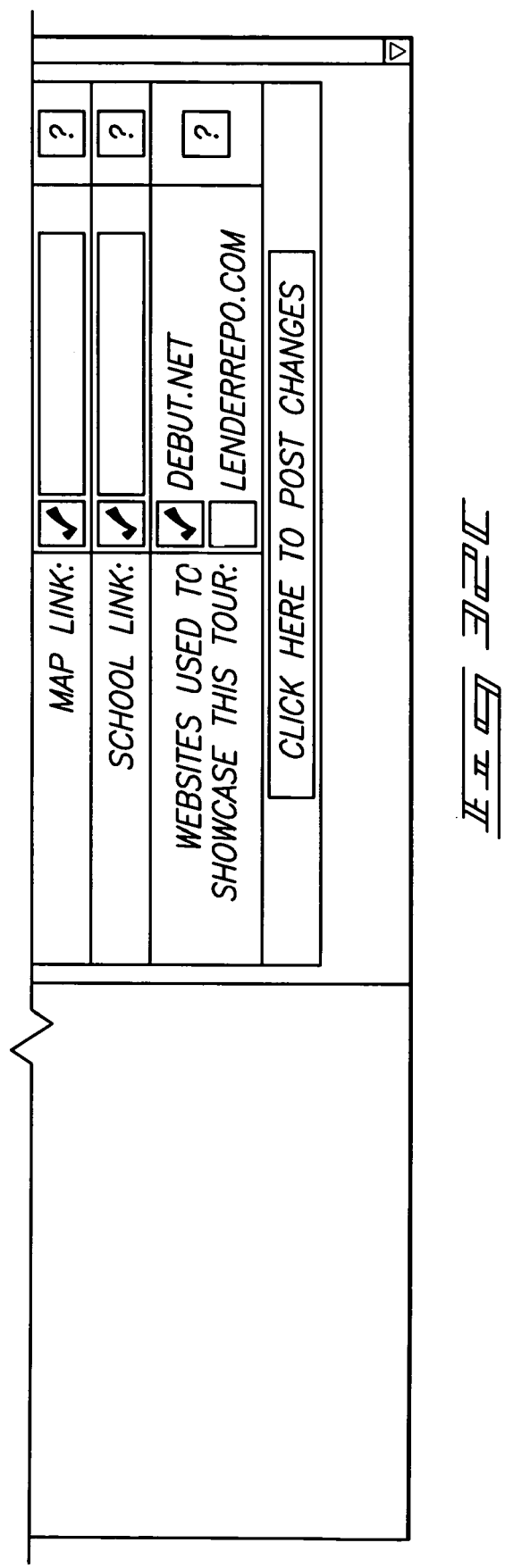
FIG. 32C is a partial diagram of the main tour information editing screen display represented in FIG. 31.

FIG. 31 is a block depiction of a diagram of the main tour information editing screen display showing the pull-down menu and selections available for the property sub-type database field, as reflected more fully in FIGS. 32A, 32B and 32C. Other information has been input into the various information boxes, which will then comprise a data set for the property unit.

Figures 33, 34A, 34B, 34C:
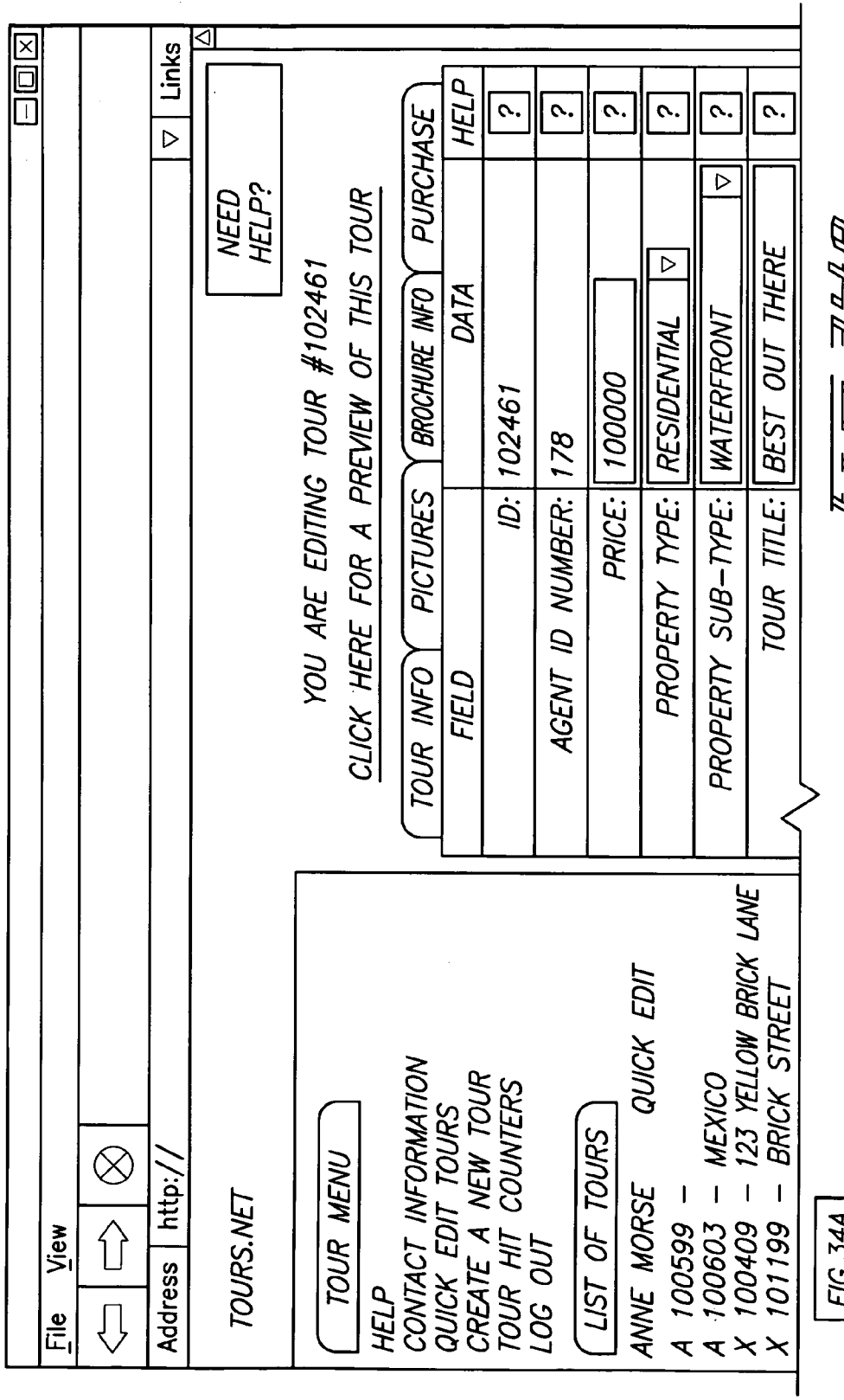
FIG. 33 is a block depiction of a diagram of the main tour information editing screen display, showing the drop-down menu selections for the Property Style data to be included in the template, which may be used in an embodiment of this invention, as more fully shown in FIGS. 34A, 34B and 34C.
FIG. 34A is a partial diagram of the main tour information editing screen display represented in FIG. 33.
FIG. 34B is a partial diagram of the main tour information editing screen display represented in FIG. 33.
FIG. 34C is a partial diagram of the main tour information editing screen display represented in FIG. 33.
Figure 34C:
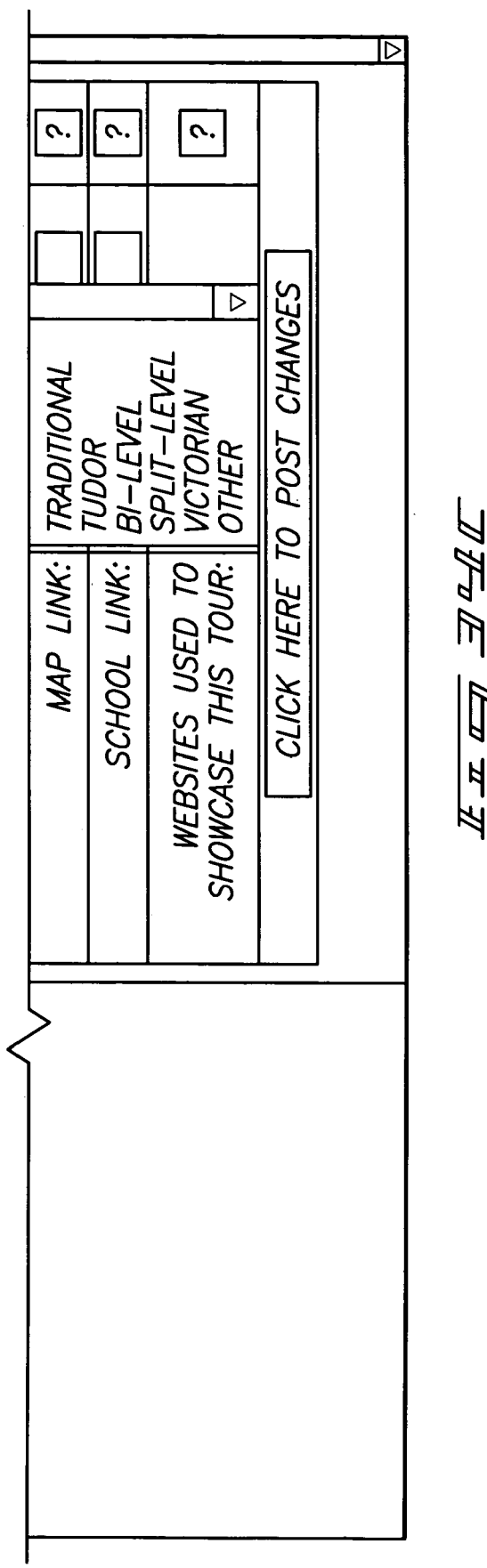

FIG. 33 is a block depiction of a diagram more fully shown in FIGS. 34A, 34B and 34C, of the main tour information editing screen showing the drop-down menu selections for the style database field, showing pull-down menu 246 and selections for ranch, bungalow, cape cod, contemporary and colonial in the pull-down menu. If the affiliate selects or clicks on the pictures tab 250 in FIG. 28A, the screen display reflected in FIGS. 35 and 36A through 36E will be retrieved to allow the affiliate to name and upload photographs which will comprise the virtual tour.

FIG. 35 is a block depiction of a diagram of the screen display one encounters in an internet embodiment of this invention when selecting or clicking on the "pictures" tab 250, as shown in FIG. 28A (and other figures), and as more fully shown in FIGS. 36A, 36B, 36C, 36D and 36E.

Figure 37:
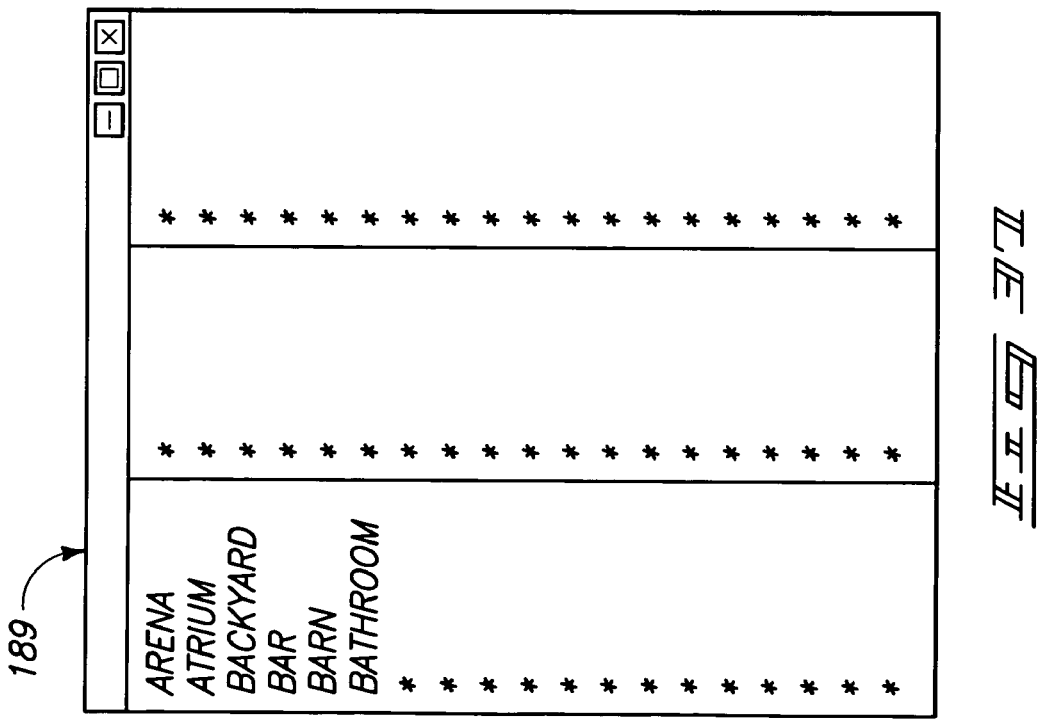
FIG. 37 is a pop-up window which is encountered when selecting the photograph name tab by selecting or clicking on the Photo Name tab, and allows the affiliate to choose from pre-selected names to use for photographs.

FIG. 37 is a pop-up window which appears when the affiliate selects the photo name by selecting it or clicking on it. The pop-up window provides a list of pre-selected photograph names to choose from in labeling the uploaded photograph. This selection may be used to edit or change an existing photograph name.

Figure 36A:
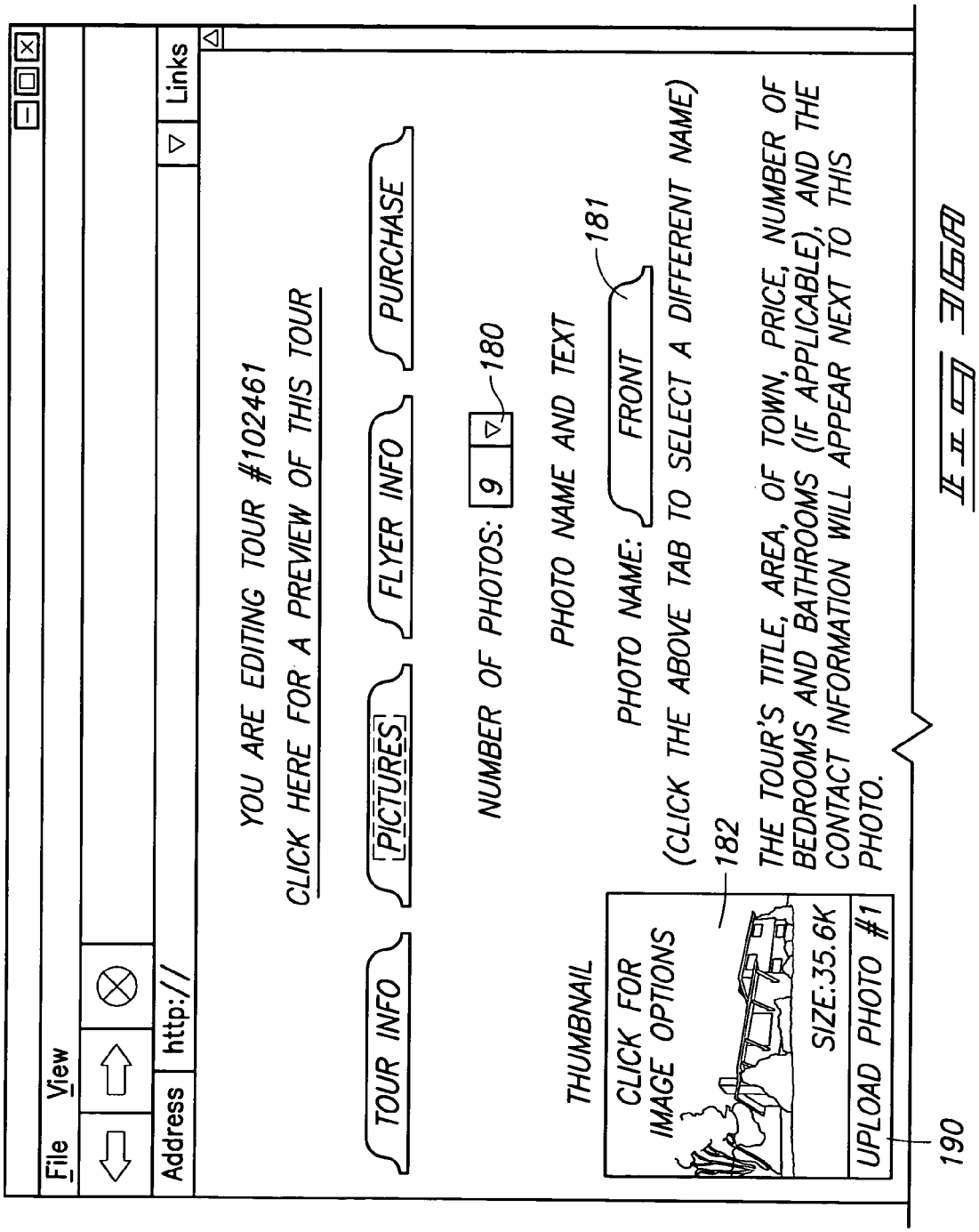
FIG. 36A is a partial diagram of the photograph edit page represented in FIG. 35.

FIG. 36A allows the affiliate to select the number of photographs to be included in the virtual tour by making a selection from pull-down menu 180. FIG. 36A further illustrates the first photo and accompanying data for the first photo which comprises part of the data set for this property unit. Photo tab label 181 indicates a front view of the house as what is shown, and that is what is also reflected in photograph 182.

If the affiliate desires to change the photo name, he or she can select or click on the photo label tab and a pop-up window will be retrieved which provides a listing of preselected photo names for potential inclusion in photo label tab 181. The pop-up window is shown more fully in FIG. 37 and discussed below. During the initial creation of a virtual tour, the first photo label tab 181 would be labeled "first photo" and the affiliate would need to choose which photo to use as the first photograph and the corresponding photo name to place within tab 181.

FIG. 36B illustrates more of the photograph and text editing screen display and includes photograph 185 of a kitchen area and photo name 186 indicates it as a kitchen area. The affiliate would next add text or data to the data input box 187 to provide information relating to the image of the kitchen area. If the affiliate desires to change or alter photograph 185, selecting or clicking on upload photo button 211 would bring an upload of photo pop-up window to the screen to allow a new photograph to be designated for this location.

Figure 36E:
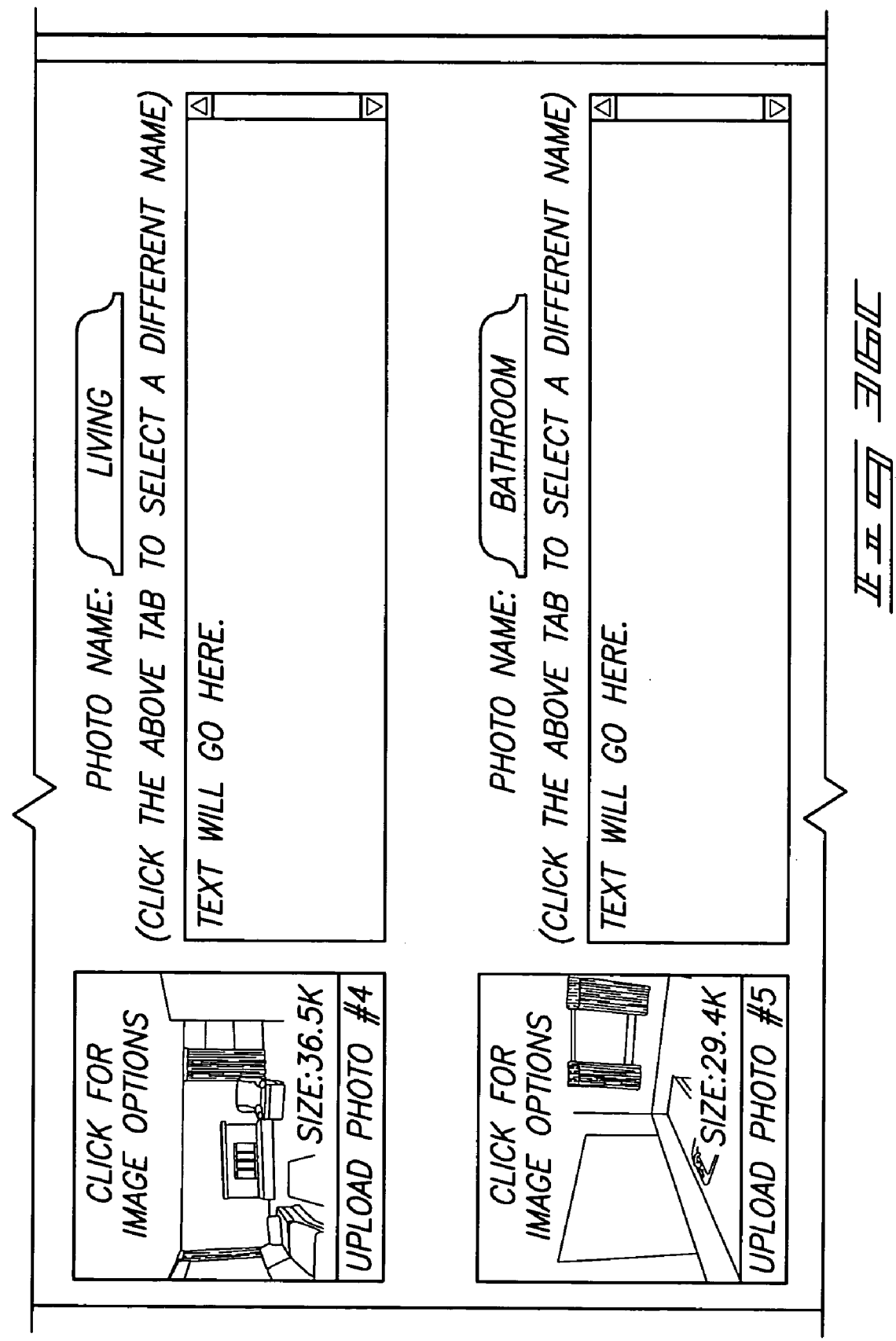
FIG. 36E is a partial diagram of the photograph edit page represented in FIG. 35.

A sample upload of photograph pop-up window is illustrated in FIG. 38 and described more fully below. The remainder of the screen display illustrated on FIGS. 36A through 36E are similar to that indicated for photo number 2 for the kitchen area. In FIG. 36E, room number eight (8) is indicated as the photo name and remains to be completed by the affiliate. If the affiliate chooses to only use seven photographs, he or she would then go up to pull-down menu 180 and change the number of photographs. Any additional views and accompanying data text may be input for the property unit to complete the designated areas for photograph and accompanying data text for room number 8 and for room number 9.

FIG. 37 is an embodiment of an exemplary pop-up window 189 which can provide pre-selected names to place on the photograph label tabs, such as photograph label tag 181 shown in FIG. 36A. In order to select a pre-selected photograph label to place in a photograph label tab, the affiliate would simply select or click on the photograph label tab 181, which would bring up the pop-up window 189 screen display with the pre-selected labels contained thereon. By selecting or clicking on a particular pre-selected label or name, this causes that label or name to be placed within the tab which had previously been selected by the affiliate and which caused the pop-up window 189 to appear.

FIG. 38 is an "upload a photograph" pop-up window 188 which would become displayed when an affiliate would select or click on an upload photo button, such as upload photo button 190 shown in FIG. 36A. Selecting the upload photo button 190 would cause the pop-up window 188 shown in FIG. 38 to appear, and this then allows the affiliate to input the file location of the photograph in file information box 192. The affiliate may select or click on browse button 193 to browse various memory areas to select the appropriate photograph file from those areas.

The pop-up window 188 also allows the affiliate to identify the nature of the photo, i.e., whether it is a standard photograph, a panoramic or extra-wide photograph, 360 degree panoramic photograph, or a 360 degree IPIX photograph. IPIX is a type of photograph by IPIX Corporation. Once the photograph file has been identified and the photo type selected, the affiliate would select the "OK" button 194 to cause the photograph to be uploaded into the designated location on the screen display, such as photograph window 182 in FIG. 36A. This viewing system gives the affiliate the option to input multiple types of photographs into the same virtual tour template, namely a still photograph, an over-sized photograph, a movable photograph, a 360 degree panoramic photograph, a panoramic photograph less than 360 degrees, as can be seen from the accompanying drawings.

An alternative or complementary embodiment allows the affiliate to email the photograph to the web server computer 110 instead of directly uploading it from the affiliate computer, which is more fully explained below in connection with FIGS. 62, 63, 64 and 65. In the alternative embodiment illustrated in FIGS. 62, 63, 64 and 65, the process of e-mailing the photograph to the web server 118 where the virtual tour is located is considered herein to be uploading that photograph.

Figure 39:
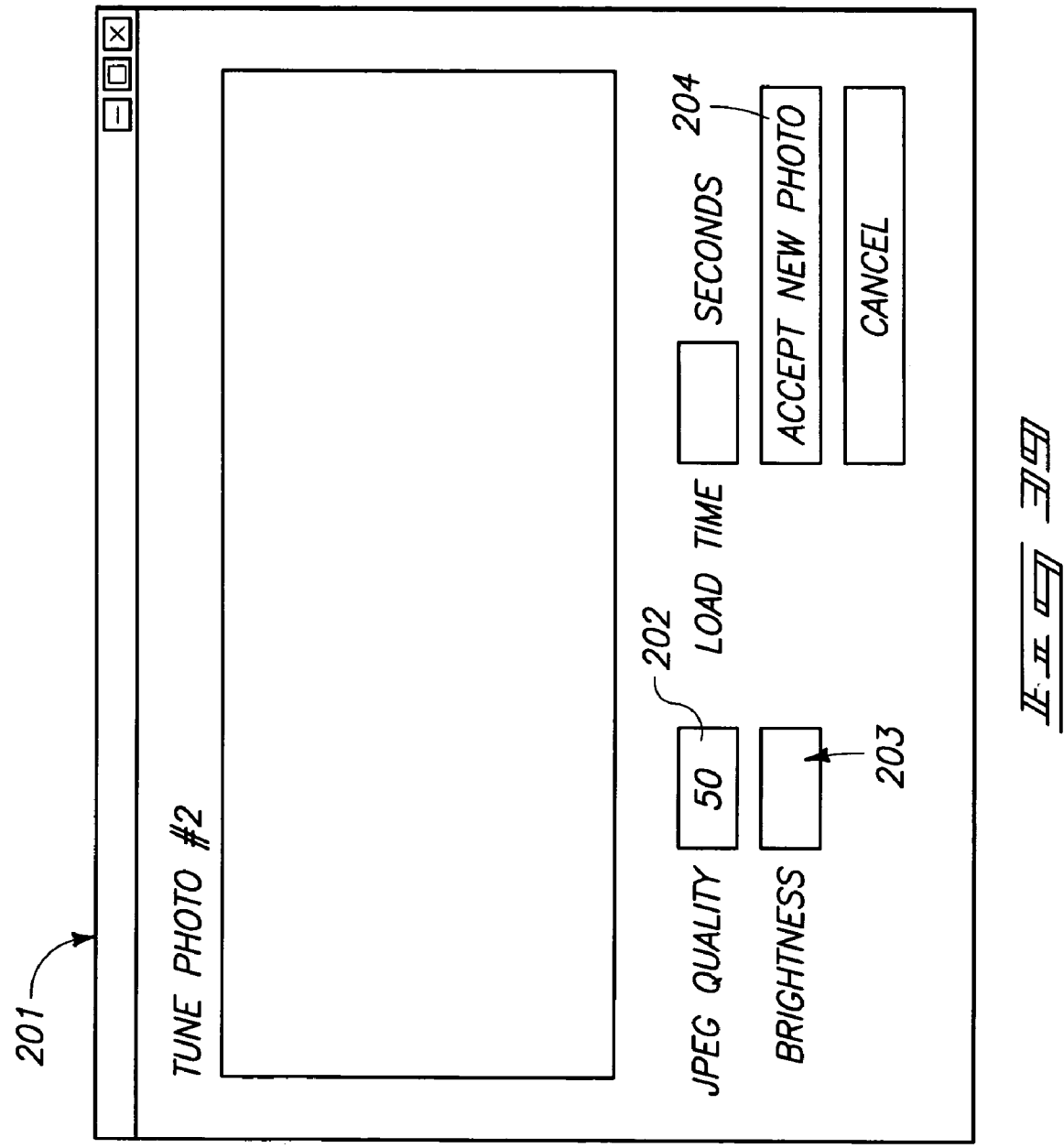
FIG. 39 is a Tune Photo screen display which is provided via a pop-up window and which allows the user to edit certain attributes of a photograph.

If the affiliate selects or clicks on any particular photograph which has already be uploaded into the viewing system, as shown in FIGS. 36A through 36E, it will cause a pop-up window 201 to be displayed in FIG. 39. The pop-up window is to allow the affiliate to adjust or tune the photograph selected. The affiliate may choose to edit the JPEG file quality by changing the number in the JPEG quality information box 202 and/or may change the brightness in the photograph by inputting into brightness information box 203 a different brightness setting. Once the subject photograph has been sufficiently tuned or edited, the affiliate may select the "accept new photo" button 204 to incorporate the edited photograph back into the screen display of the pictures in the virtual tour as more fully reflected in FIGS. 36A through 36E.

FIG. 40 is a block depiction of the main tour information editing screen display, with the number of photos pull-down menu selected and being utilized to select the number of photographs to be included in the virtual tour of the subject property unit. FIGS. 41A and 41B more fully illustrate the screen display with the pull-down window 180 in the pulled down position. Another advantage and feature of this property viewing system and this invention is the creation of brochures or flyers using part or all of the data set and photographs inputted for the virtual tour by selecting the brochure info tab 251 on the screen display shown in FIG. 28A.

FIGS. 43A and 43B show the screen display depicted in the block diagram in FIG. 42. FIG. 43A illustrates a first brochure template 300, a second brochure template 301, and a third brochure template 302, each having a different format and each incorporating part or all of the data set inputted for the tour for the subject property unit and each incorporating one or more photographs from the pictures uploaded for the virtual tour. The affiliate is able to select the brochure type or types desired for promotion of the property unit.

Figure 45A:
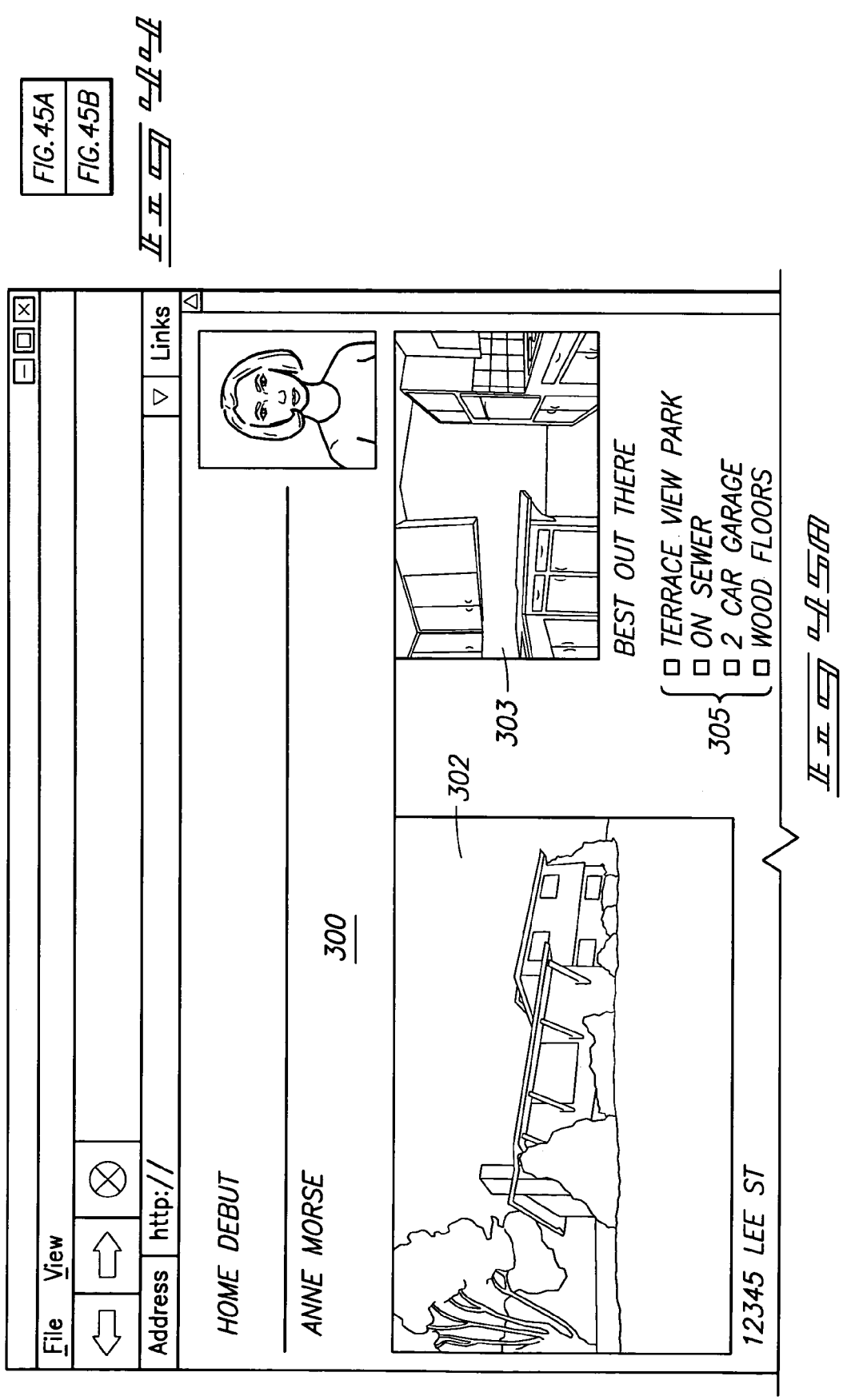
FIG. 45A is a partial diagram of the first brochure screen display represented in FIG. 44.

FIG. 45A illustrates brochure template 300 (shown in FIG. 43A) in larger display form, illustrating a sample format for a property unit brochure. For the subject property, the photograph 302 in FIG. 45A was taken from photograph 182 in FIG. 36A where the photograph was uploaded. Photograph 303 from brochure template 300 is photograph 185 from FIG. 36B and which was input for the virtual tour and additionally incorporated into brochure template 300. It will be appreciated by those skilled in the art that the affiliate may also be given the option to upload or e-mail a different or a non-tour photograph for inclusion within in the brochure.

The remaining data 305 illustrated in FIGS. 45A and 45B is taken from the property data set input to create the virtual tour of the property unit. Brochure template 300 may be printed and used by the affiliate in the promotion of the property unit or the promotion of a time unit of the property unit, or the web page which brochure template 300 represents may be e-mailed to potential business associates or customers of the affiliate in order to further promote the property unit.

FIG. 46 is a block depiction of the screen display represented by FIGS. 47A and 47B and is a second brochure template 310 of the subject property unit, illustrating photograph 311, photograph 312, and photograph 313, all of which are photographs utilized in the virtual tour and uploaded in the creation of the virtual tour. The data 314 shown on brochure template 310 was taken from the data set for the property unit in question.

Figure 49B:
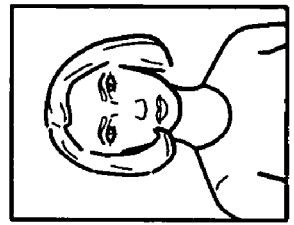
FIG. 49B is a partial diagram of the third brochure screen display represented in FIG. 48.

FIG. 48 is a block depiction of the brochure screen display illustrated in FIGS. 49A and 49B of a property brochure template 320. This is a third option for a property brochure which includes photograph 321 and data 322. The photograph 321 and the data 322 were taken from the photographs entered for the virtual tour for the subject property, and the data was taken from the data set for the property unit.

FIG. 50 is a block depiction of a diagram of the purchase screen display wherein the affiliate initiates the purchase of the virtual tour, selects advertising and methods of providing text, which is self explanatory from the review of FIGS. 51A and 51B. The affiliate may select "printable invoice" button 333 and will be provided an invoice for the purchase of the virtual tour and listing. The tour invoice is more fully shown in FIG. 52 and FIGS. 53A, 53B and 53C. The tour invoice may be printed by the affiliate and provides basic information regarding the tour, what was purchased, billing information, property description and any other information desired.

FIG. 53C provides a credit card information section to accomplish an electronic commerce transaction, wherein the affiliate can fill in credit card information to pay for the virtual tour, all of which is well known in the trade and will therefore not be discussed in any further detail.

FIG. 54 figuratively illustrates one way to visualize or provide a movable photograph as part of a virtual tour. The preferred movable photograph 370 is made to move by a java applet which provides the photograph 370 in the desired browser window 371, and then provides a way to appear to make it move. The preferred size of the browser window 371 is 270 pixels by 450 pixels, whereas the size of the photograph 370 is larger than the browser window 371 size.

When the photograph is uploaded or e-mailed and then uploaded (depending on the alternative chosen), the affiliate is asked to identify the type of photograph, as is more fully explained in relation to FIG. 38 above.

While this is the preferred way, i.e. using a java applet, it will be appreciated by those skilled in the art that there are other known ways to accomplish this, such as without limitation, through the use of a floating frame reference, or the use of a program plugin.

Since movable photographs or the appearance of a movable photograph is known, it will not be discussed in significant detail. Furthermore, the java applet source code is set forth in the microfiche appendix being filed herewith. The microfiche contains seventy nine pages of computer source code comprising one embodiment of the computer readable instructions which may be used to practice an embodiment of this invention, and which are hereby incorporated into this specification by this reference.

FIG. 55 is an elevation view of a panoramic photograph 400 of the front of a property unit 402 for which a virtual tour is desired. The photograph 400, as digitized, is larger than the size of the viewer window 401 in the browser. This invention provides for a movable photograph 400 and the java applet routines causes the underlying image to move relative to the viewer window 401, thereby appearing to the viewer that he or she is movable his or her head to view the property.

FIG. 55 also figuratively show splice or stitch lines 404 where more than one actual photograph was digitized and the multiple photographs were stitched or spliced together. It will be appreciated in the art that there are numerous known ways to achieve a panoramic photograph, including by stitching or splicing, using a panoramic camera which produces these in a single photograph, or by using other types of cameras and film which are well known in the industry.

There are numerous well known computer software programs which perform the stitching or splicing of photographs together, including PhotoVista by Live Picture, as one example.

When it comes to panoramas, the size of the digital file is very important and too large of a photograph may take too long to load. This may cause potential clients or buyers to become irritated and possibly move on to other property or other search sites. On the other hand, some clients and potential clients look for property units that have a panorama because it gives them a better understanding for what they're seeing.

The size of the photograph should be at least 270 pixels in height to fill the viewer window, and if it is taller than this, the viewer or client may scroll the entire photograph using the movable photograph feature of this invention.

When taking a panoramic photograph in a series of photographic views, the affiliate preferably should leave approximately twenty percent (20%) overlap from one photograph to the next so that the photographs may be spliced or stitched together. It is important that the camera be kept level of all times when taking panoramic photographs for splicing together. If possible, a tripod should be used. If the internet browser utilized by the viewer is java compatible, the panoramic photographs will automatically launch into motion and can be navigated by the mouse of the user, upon the proper identification upon uploading the photograph, as described above.

As bandwidth is increased over the internet or other networks, it will allow larger photographs and video taping of properties, all within the contemplation of this invention.

In the preferred embodiment, if a movable picture is being viewed, the client may move the mouse arrow in the viewer window to cause the photograph to move relative to the viewer window, and in the direction of the side of the photograph where the mouse pointer is moved.

This is figuratively illustrated in FIG. 56. Panoramic photograph 410 is broken into sections, and when the mouse pointer is placed in section 411 the photograph 410 appears to move to the right so that more of the left side of the photograph 410 may be viewed, analogous to the viewer turning their head to the left. The further to the left the mouse pointer is moved, the faster the photograph 410 appears to move the right. When the mouse pointer is moved into section 412 it causes the photograph 410 to appear to move downwardly to appear that the viewer is looking up or seeing more of the top of the photograph 410. The higher up in section 412 the mouse pointer is moved, the faster the photograph 410 appears to move downward.

The photograph will actually start to move when the mouse pointer is within the middle section of the photograph 410, but off from center in the horizontal direction.

Similarly, when the mouse pointer is placed in section 413, the photograph moves to the left, and when the mouse pointer is moved into section 414, the photograph appears to move upward so the viewer may see more of the bottom of the photograph.

FIGS. 57 through 60 are a partial example of a virtual tour of a property unit. FIG. 57 illustrates the virtual tour page 500, with the large viewing window 501 for viewing the various view displayed, depending on which tab above is selected. In the example shown, eleven tabs are illustrated: master tab 503; master bath tab 504; neighborhood tab 505; brochure 506; map tab 507; front tab 508; kitchen tab 509; dining tab 510; second dining tab 511; golf course tab 512; and family tab 513. Each tab represents a link to another photograph or view of the property unit with accompanying data.

In the view shown, photograph 502 is the front view shown. In order to go directly from any view or photograph in the virtual tour to any other photograph or image, the viewer need only select or click on the desired tab. For example, if the viewer wants to view the kitchen photograph 520 and accompanying text, he or she would simply click on the kitchen tab 509, and the view shown in FIG. 58 would appear.

Similarly, if the viewer wanted to look at a view of the dining room photograph 521, he or she would click on the dining tab 511, and the screen display shown in FIG. 59 would appear. Note that the dining photograph 521 is a larger than standard photograph and is a panorama photograph (or movable photograph), as that term is used herein. The asterisk next to the name on the tabs indicates that the photograph is a movable photograph or panorama photograph versus merely a still photograph. In FIG. 57, the master tab 503 links to a movable photograph, as indicated by the asterisk.

If the viewer of FIG. 59 desired to see the master bathroom, he or she would click on the master bathroom tab 504 and the bathroom photograph 522 shown in FIG. 60 would be displayed.

The utilization of such a tab system allows all of the photographs from the same property unit to be viewed with ease, enabling the viewer to move directly from one photograph to any other makes the virtual tour much more pleasing to view.

It will be appreciated by those in the property management, travel and vacation rental industries, that there are other embodiments of the present invention which may be utilized in those industries. For example, one embodiment or application of this invention is in the rental or vacation industry. In that embodiment, a rental agency has certain occupation time units available for its rental property, and has a need to provide virtual tours accessible over the internet to potential and existing customers.

In order to avoid in the cost of photographing, uploading and providing a virtual tour on a website or web server, the property manager may exchange one or more of the time units in his or her property unit, in consideration for the construction of a virtual tour of the property, and/or for maintaining the virtual tour onsite available for viewing by persons having access to the public communications network.

FIG. 61 illustrates in block diagram form an example of one possible embodiment of the invention wherein one or more available time units 600 for a property unit 599 are exchanged in consideration for creating and/or maintaining or posting a virtual tour 601 posting of the property unit on a webserver 602 available over a public communications network such as the internet 603. Client computers 604 and affiliate computers 598 may then be connected to virtual tour of properties via the public communications network, to tour the property unit.

Figure 62:
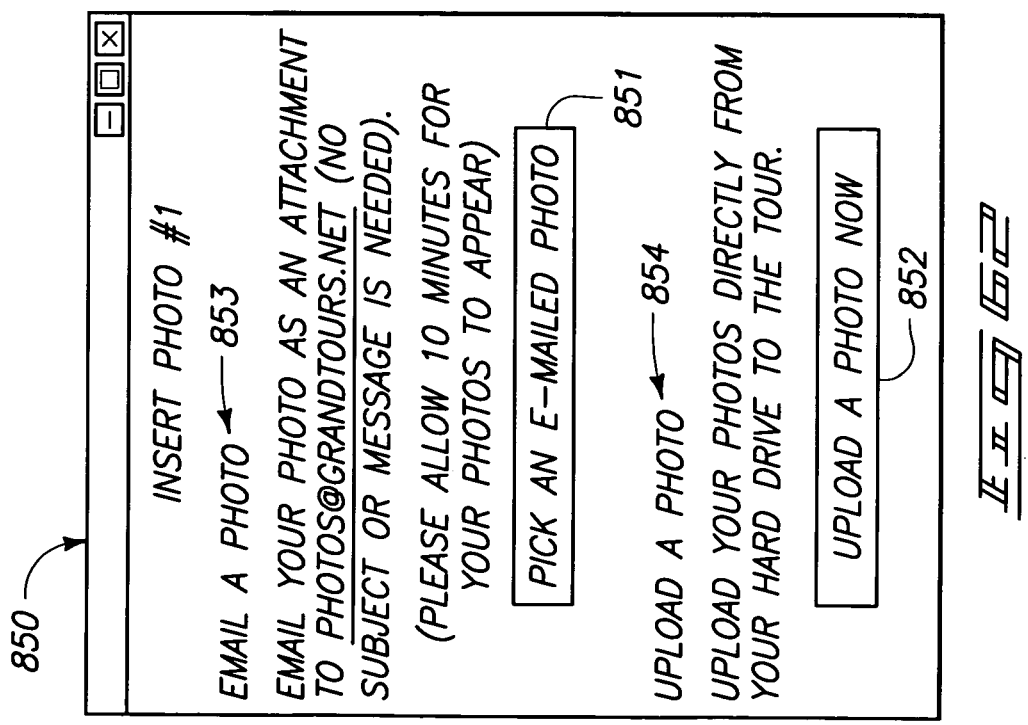
FIG. 62 is a pop-up window screen display of an Insert Photo which is prompted by selecting or clicking on the Upload Photo buttons described herein, giving the affiliate the option to either directly upload the photograph or to email it as an attachment to the virtual tour web site.

FIG. 62 is a pop-up window screen display of an Insert Photo which is prompted by selecting or clicking on the Upload Photo buttons described herein, giving the affiliate the option to either directly upload the photograph or to email it as an attachment to the virtual tour web site, as part of step P9.

The term "upload a photo" as used herein is intended to cover, without limitation, both the uploading of the photograph and the e-mailing of the photograph, as set forth herein.

In FIG. 62, the affiliate is presented with pop-up window 850 in order to insert a photograph into a window of a virtual tour of a property unit, the pop-up window 850 giving the affiliate two options, namely to directly upload 854 or to email a photo 853. If the affiliate directly uploads the photograph, he or she selects the "upload a photo now" button 852 and follows the procedure outlined above with respect to step P9.

Figure 63:
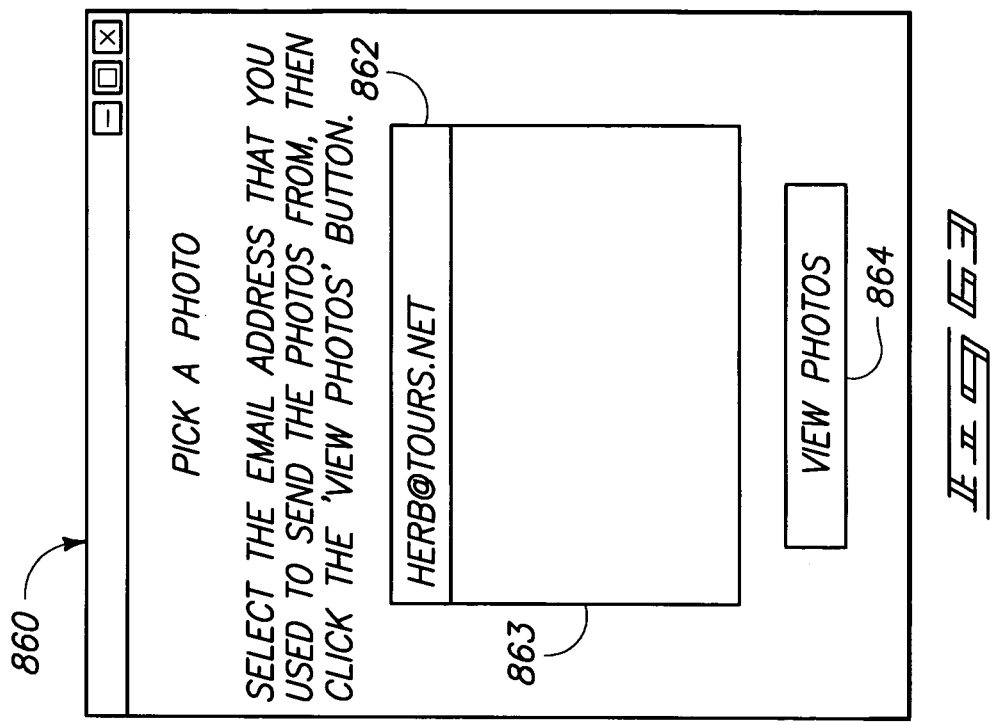
FIG. 63 is a pop-up window screen display of an Pick a Photo which is prompted by selecting or clicking on the Email a Photo button shown in FIG. 62.

If the affiliate has chosen to email the photograph, it would be received by the web server 118 (shown in FIG. 1) and when the affiliate then chooses the "pick an e-mailed photo" button shown in the screen display in FIG. 62, the affiliate will be presented with pop-up window 860 illustrated in FIG. 63. The system keys on the address from which the photograph was e-mailed (as it may come from one or more sources), and provides the affiliate a list or viewing of those photographs which came from that e-mail address.

FIG. 63 further reflects viewing box 863 in which a list of source email addresses are listed, which in the example shown, is only one source address 863, namely "herb@tours.net." The affiliate may then select the "view photos" button 864 to review thumbnail photographic depictions of those photographs which have been e-mailed to the web server from the selected email address.

Figure 64:
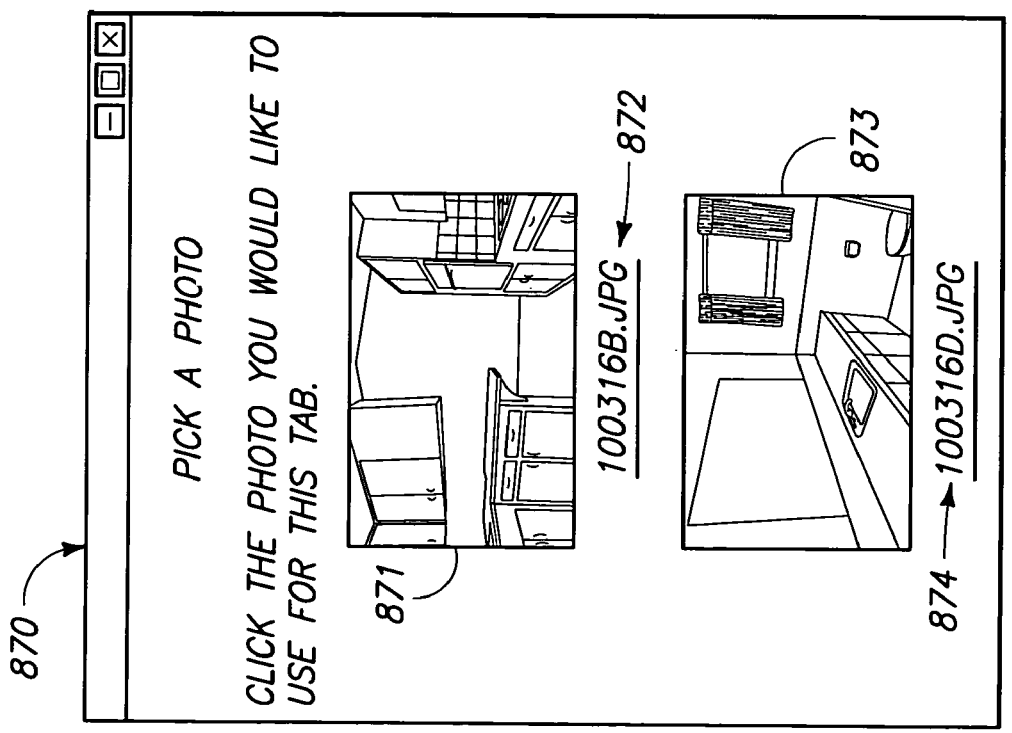
FIG. 64 is a pop-up window screen display of a second Pick a Photo screen which is prompted by selecting the "Pick an E-mailed Photo" button in FIG. 63.

If the affiliate selects the "view photos" button 864, he or she is provided with thumbnails such as thumbnail photograph 871 and thumbnail photograph 873 shown in FIG. 64, which are identified by their file name 100316B.jpg (item 872) and file name 100316D.jpg (item 874). The photograph naming convention utilized is the combination of the six digit tour identification number combined with a letter, "A" representing the first photograph in the tour, "B" representing the second photograph in the tour, and so on.

Figure 65:
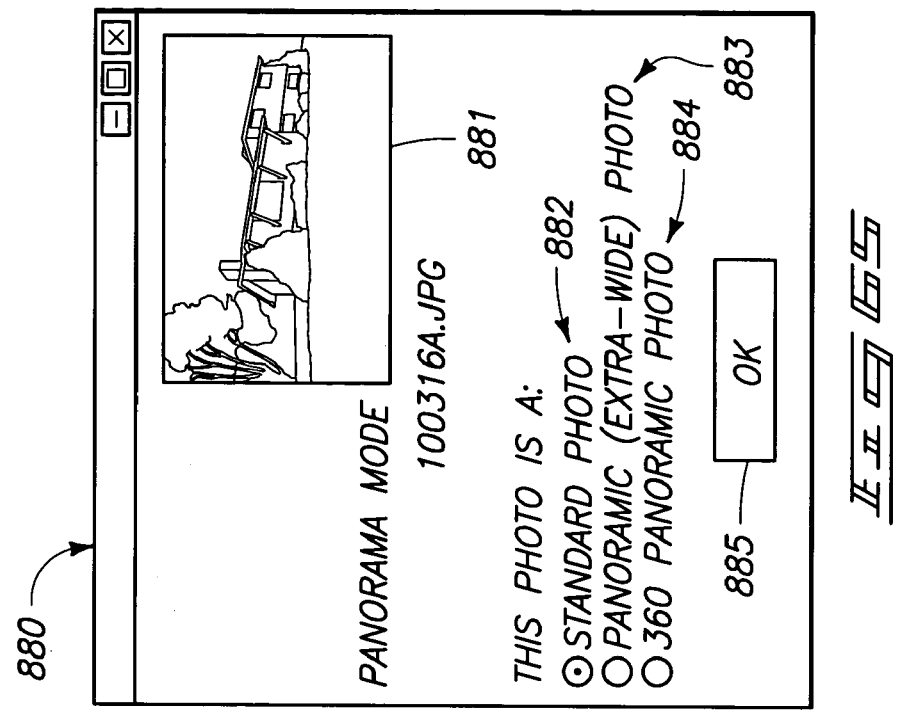
FIG. 65 is a pop-up window screen display of a Panorama Mode page wherein the affiliate must identify the nature of the photograph selected.

Once the affiliate selects one of the e-mailed photographs, the pop-up window 880 reflected in FIG. 65 will be displayed, showing the selected photograph 881, along with its name, and selection options for the affiliate to identify whether the photograph is a standard photograph 882, a panoramic (extra-wide) photograph 883 or a 360 degree panoramic photograph 884. Once the proper photograph is displayed and the type of photograph identified, the affiliate selects the OK button 885 and the photograph is copied from the web server to the one or more memory areas where the tour photographs are stored.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method in a computer system for providing an electronic template for inputting and providing a virtual tour of one or more real property units over a public communications network, comprising the following steps:
   a. making available to one or more affiliates independent from the computer system via the public communications network, a virtual tour template on one or more memory areas, said virtual tour template providing a framework for the one or more affiliates to directly input photographs and a data set to create a virtual tour of a real property unit;
   b. receiving from the one or more affiliates via the public communications network, at least one movable photograph of part or all of the real property unit, and storing the at least one movable photograph in one or more memory areas such that it is available to be included as part of the virtual tour;
   c. receiving from the one or more affiliates via the public communications network, the data set corresponding to the real property unit, and storing the data set in the one or more memory areas such that it is available to be included as part of the virtual tour; and
   d. making available to one or more clients via the public communications network, the virtual tour dynamically utilizing the at least one movable photograph and the data set in the virtual tour template.

2. A method in a computer system for providing an electronic template as recited in claim 1, and further comprising the step of making the virtual tour available via the public communications network, as a link from a website of the one or more affiliates.

3. A method in a computer system for providing an electronic template as recited in claim 2, and further comprising the step of returning the client viewing the virtual tour to the website of the one or more affiliates upon conclusion of the virtual tour.

4. A method in a computer system as recited in claim 1, and further comprising the following steps:
   a. receiving from the one or more affiliates via the public communications network at least one still photograph of the real property unit, and storing the at least one still photograph in the one or more memory areas such that the still photograph is available to be included in the virtual tour; and
   b. making available to one or more clients via the public communications network, the virtual tour which also dynamically includes the at least one still photograph as part of the virtual tour.

5. A method in a computer system as recited in claim 4, and further comprising the step of providing a brochure template of the real property unit on the one or more memory areas, the brochure template utilizing the at least one still photograph and data from the data set, to create an electronic real property unit brochure.

6. A method in a computer system for providing an electronic template for inputting and providing a virtual tour of one or more real property units over a public communications network, comprising the following steps:
   a. making available to one or more affiliates independent from the computer system via the public communications network, a virtual tour template on one or more memory areas, said virtual tour template providing a framework for the more or more affiliates to directly input photographs and a data set to create a virtual tour of a real property unit;
   b. said virtual tour template giving the one or more affiliates the option to input a movable photograph having a three hundred sixty degree range and a movable photograph having less than a three hunted sixty degree range;
   c. receiving from the one or more affiliates via the public communications network, at least one movable photograph of part or all of the real property unit, and storing the at least one movable photograph in one or more memory areas such that it is available to be included as part of the virtual tour;
   d. receiving from the one or more affiliates via the public communications network, the data set corresponding to the real property unit, and storing the data set in the one or more memory areas such that it is available to be included as part of the virtual tour; and
   e. making available to one or more clients via the public communications network, the virtual tour dynamically utilizing the at least one movable photograph and the data set in the virtual tour template.

7. A method in a computer system for providing an electronic template for inputting and providing a virtual tour of one or more real property units over a public communications network, as recited in claim 6, and wherein the virtual tour template additionally gives the one or more affiliates the option of inputting a still photograph.

8. A computer-readable medium containing instructions for controlling a computer system, for providing an electronic template for inputting and providing a virtual tour of one or more real property units over a public communications network, comprising the following steps:
   a. making available to one or more affiliates independent of the computer system via the public communications network, a virtual tour template on one or more memory areas, said virtual tour template providing a framework for affiliates to directly input photographs and a data set to create a virtual tour of a real property unit;
   b. receiving from the one or more affiliates via the public communications network, at least one movable photograph of part or all of the real property unit, and storing the at least one movable photograph in one or more memory areas such that it is available to be included as part of the virtual tour;
   c. receiving from the one or more affiliates via the public communications network, the data set corresponding to the real property unit, and storing the data set in the one or more memory areas such that it is available to be included as part of the virtual tour; and
   d. making available to one or more clients via the public communications network, the virtual tour dynamically utilizing the at least one movable photograph and the data set in the virtual tour template.

9. A method in a computer system for displaying an affiliate input system to enable an affiliate independent from the computer system to directly input at least one movable photograph and at least one data set pertaining to a real property unit into a real property unit virtual tour template via a public communications network, to create or edit a dynamic virtual tour of the real property unit, comprising the following steps:
   a. displaying a data set input template via a public communications network which allows an affiliate independent from the computer system to directly enter a data set pertaining to the real property unit such that the data set is made available for use in the dynamic virtual tour;
   b. displaying a photograph input template via the public communications network which allows the affiliate to directly upload at least one movable photograph, such that the photograph is available for use in the dynamic virtual tour; and c. making available for display via the public communications network, a display of the virtual tour which includes part or all of the data set and includes the at least one movable photograph.

10. A method in a computer system as recited in claim 9, and further comprising the step of making the virtual tour available via the public communications network as a link from a website of the one or more affiliates.

11. A method in a computer system as recited in claim 9, wherein the step of displaying the data input template and the displaying of the photograph input window are contained on the same screen display.

12. A method in a computer system as recited in claim 9, and further comprising the following steps:

a. displaying a photograph input template which allows the affiliate to directly upload at least one still photograph, such that the still photograph is available for use in the dynamic virtual tour; and b. making available for display via the public communications network, a display of the virtual tour which includes the at least one still photograph.

* * * * *

UNITED STATES PATENT AND TRADEMARK OFFICE
CERTIFICATE OF CORRECTION

PATENT NO. : 7,392,208 B2  Page 1 of 1
APPLICATION NO. : 10/984378
DATED : June 24, 2008
INVENTOR(S) : Stacy J. Morse et al.

It is certified that error appears in the above-identified patent and that said Letters Patent is hereby corrected as shown below:

Column 24, line 4, "hunted" should be -- hundred --.

Signed and Sealed this

Thirtieth Day of September, 2008

JON W. DUDAS
*Director of the United States Patent and Trademark Office*